United States Patent [19]

Harris et al.

[11] Patent Number: 5,151,489

[45] Date of Patent: * Sep. 29, 1992

[54] COPOLYMERS CONTAINING POLYBENZOXAZOLE, POLYBENZOTHIAZOLE AND POLYBENZIMIDAZOLE MOIETIES

[75] Inventors: William J. Harris; Wen-Fang Hwang, both of Midland, Mich.

[73] Assignee: The Dow Chemical Company, Midland, Mich.

[*] Notice: The portion of the term of this patent subsequent to Mar. 24, 2009 has been disclaimed.

[21] Appl. No.: 407,973

[22] Filed: Sep. 15, 1989

Related U.S. Application Data

[63] Continuation-in-part of Ser. No. 378,360, Jul. 7, 1989, which is a continuation of Ser. No. 327,925, Mar. 23, 1989, Pat. No. 5,030,706, which is a continuation-in-part of Ser. No. 256,338, Oct. 12, 1988, Pat. No. 5,089,568.

[51] Int. Cl.$^5$ .............................. C08G 75/32
[52] U.S. Cl. ............................... 528/183; 528/128; 525/410; 525/411; 525/413; 525/415; 525/424; 525/425; 525/434
[58] Field of Search ............... 528/128, 183; 525/410, 525/411, 413, 415, 424, 425, 434

[56] References Cited

U.S. PATENT DOCUMENTS

| | | | |
|---|---|---|---|
| 4,229,566 | 10/1980 | Evers et al. | 528/172 |
| 4,533,692 | 8/1985 | Wolfe et al. | 524/417 |
| 4,533,693 | 8/1985 | Wolfe | 524/417 |
| 4,533,724 | 8/1985 | Wolfe et al. | 524/417 |
| 4,544,713 | 10/1985 | Tsai et al. | 525/432 |
| 4,578,432 | 3/1986 | Tsai et al. | 528/183 |
| 4,631,318 | 12/1986 | Hwang et al. | 525/432 |
| 4,703,103 | 10/1987 | Wolfe et al. | 528/179 |
| 4,772,678 | 9/1988 | Sybert et al. | 528/179 |

FOREIGN PATENT DOCUMENTS

WO/86/023-68 4/1986 PCT Int'l Appl.
WO89/07617 8/1989 PCT Int'l Appl.

OTHER PUBLICATIONS

Gordon et al., "Synthesis and Characterization of Segmented Block Copolybenzimidazoles Containing Rigid Rod and Flexible Coil Segments" 28(2) *Polymers Preprints* 308 (1987).
Gordon et al., "Thermally Stable Block Copolymers," 26(1) *Polymer Preprints* 146 (1985).
Tsai et al., "High Strength Modulus ABA Block Copolymers," 26(1) *Polymer Preprints* 144 (1985).
Krause et al., "Morphology and Mechanical Properties of a Phase Separated and Molecular Composite 30% PBT/70% ABPBI triblock copolymer," 29 *Polymer* 195 (1988).
Gordon et al., "Thermally Stable Block Copolymers," 27(1) *Polymer Preprints* 311 (1986).
Tsai et al., "High Strength/High Modulus Aromatic Heterocyclic ABA Block Copolymers," Report AFWAL-TR-87-4072 (May 1987).
Evers, "Graft Copolymers of Rod-like Poly(p--phenylenebenzobisimidazole)," 29(1) *Polymer Preprints* 244 (1988).
Evers et al., "Articulated All-Para Polymers with 2,6--Benzobisoxazole, 2,6-Benzobisthiazole, and 2,6-Benzobisimidazole Units in the Backbone," 14 *Macromolecules* 925 (1981).
Hwang et al., "Phase Relationships of Rigid Rod Polymer/Flexible Coil Polymer/Solvent Ternary Systems," 23 Polymer Eng. & Sci. 789 (1983).
Hwang et al., "Solution Processing and Properties of Molecular Composite Fibers and Films," 23 *Polymers Eng. & Sci.* 784 (1983).
Hwang et al., "Composites on a Molecular Level: Phase Relationships, Processing and Properties," B22 *J. Macromol. Sci.-Phys.* 231 (1983).
Bianchi et al., "Nematogenic Block Copolymers of Rigid and Flexible Aromatic Units. III," 20 *Polymer J.* 83 (1988).
Krigbaum et al., "Nematogenic Block Copolymers of Rigid and Flexible Aromatic Units. III," 25 *J. Poly Sci.* 653 (1987).
Moore et al., "Molecular Composites via In Situ Polymerization: Poly(Phenylene Tehephthalimide)-Nylon 3," 32 *J. Applied Polymer Sci.* 6299 (1986).
Takayanagi et al., "Polymer Composites of Rigid and Flexible Molecules: System of Wholly Aromatic and Aliphatic Polyamides," B17(4) *J. Macromol. Sci.-Phys.* 591 (1980).
Takayanagi, "Polymer Composites of Rigid and Flexible Molecules," 55 *Pure & Applied Chem.* 819 (1983).
Ueda et al., "Synthesis of Polyketones by Direct Polycondensation of Dicarboxylic Acids with Diaryl Compounds using Phosphorus Pentoxide/Methanesulfonic Acid as Condensing Agent and Solvent," 5 Makromol. Chem., Rapid Commun. 833-6 (1985).
Ueda, "Synthesis of Poly(phenylene ether sulfone) by direct self-polycondensation of Sodium 4-Phenoxybenzenesulfonate using Phosphorus Pentoxide/Methanesulfonic Acid as Condensing Agent and Solvent," 6 Makromol. Chem., Rapid Commun. 271-74 (1985).

*Primary Examiner*—Veronica P. Hoke

[57] ABSTRACT

Block copolymers can be formed from heterocyclic polymers such as PBO and thermoplastic polymers such as polyamide or poly(aromatic ether ketone). The block copolymer compositions are thermoplastic and do not experience substantial phase separation, even at about their glass transition temperature. The block copolymer compositions can be formed into fibers, films and laminate or compression-molded articles. PBO, PBI and PBT polymers terminated by active aromatic rings or acylating groups are particularly useful for making the block copolymers.

48 Claims, No Drawings

1

COPOLYMERS CONTAINING POLYBENZOXAZOLE, POLYBENZOTHIAZOLE AND POLYBENZIMIDAZOLE MOIETIES

STATEMENT OF GOVERNMENT INTEREST

This invention was made with Government support under contract F33615-86-C-5068 awarded by the Department of the Air Force. The Government has certain rights in this invention.

CROSS-REFERENCE TO COPENDING APPLICATION

This application is a continuation-in-part of copending application Ser. No. 378,360, filed Jul. 7, 1989, which is a continuation-in-part of copending application Ser. No. 327,925, filed Mar. 23, 1989, now U.S. Pat. No. 5030906 which is a continuation-in-part of copending application Ser. No. 256,338, filed Oct. 12, 1988 now U.S. Pat. No. 5089568.

BACKGROUND OF THE INVENTION

The present invention relates to the art of polybenzazole (PBZ) polymers and polymer compositions containing blocks of those polymers.

PBZ polymers, i.e., polybenzoxazole, polybenzothiazole and polybenzimidazole, and their synthesis are described in great detail in the following patents which are incorporated by reference: Wolfe et al., *Liquid Crystalline Polymer Compositions, Process and Products*, U.S. Pat. No. 4,703,103 (Oct. 27, 1987); Wolfe et al., *Liquid Crystalline Polymer Compositions, Process and Products*, U.S. Pat. No. 4,533,692 (Aug. 6, 1985); Wolfe et al., *Liquid Crystalline Poly(2,6-Benzothiazole) Compositions, Process and Products*, U.S. Pat. No. 4,533,724 (Aug. 6, 1985); Wolfe, *Liquid Crystalline Polymer Compositions, Process and Products*, U.S. Pat. No. 4,533,693 (Aug. 6, 1985); Evers, *Thermoxadatively Stable Articulated p-Benzobisoxazole and p-Benzobisthiazole Polymers*, U.S. Pat. No. 4,359,567 (Nov. 6, 1982); Tsai et al., *Method for Making Heterocyclic Block Copolymer*, U.S. Pat. No. 4,578,432 (Mar. 25, 1986) and 11 Ency. Poly. Sci. & Eng., *Polybenzothiazoles and Polybenzoxazoles*, 601 (J. Wiley & Sons 1988).

Polybenzazole polymers, and particularly "rigid rod" PBZ polymers, are noted for high tensile strength, high tensile modulus and high thermal stability. Rigid rod PBZ polymers are either intrinsic rigid rods, in which case polymer molecules are essentially rectilinear, or they are articulated rigid rods, in which case they comprise two or more essentially rectilinear polymer moieties linked by a small number of non-linear mer units.

Rigid rod PBZ polymers are difficult to fabricate into useful articles. They do not have glass transition temperatures at any temperature at which they are stable. The polymers are ordinarily dissolved in a solvent acid to form liquid crystal compositions which are then spun to form fibers or processed to form films. Fibers can act as reinforcement within a thermosetting matrix, such as epoxy resins, to form strong light fabricated articles.

To improve processability, rigid rod PBZ polymers can be incorporated into molecular composites with flexible polymers Hwang et al., "Solution Processing and Properties of Molecular Composite Fibers and Films," 23 *Polymer Eng. & Sci.* 784 (1983); Hwang et al., "Phase Relationships of Rigid Rod Polymer/Flexible Coil Polymer/Solvent Ternary Systems," 23 *Polymer Eng. & Sci.* 789 (1983); and Hwang et al., "Composites on a Molecular Level: Phase Relationships, Processing and Properties," B22 *J. Macromol. Sci.-Phys.* 231 (1983), which are incorporated herein by reference.

Due to the low compatibility of PBZ polymers with thermoplastic or flexible polymers, such composites often experience phase separation and a resulting loss of strength, clarity or other desirable properties, particularly if heated above the glass transition temperature of the thermoplastic polymer. To improve the compatibility of PBZ polymers, they have been formed in block copolymers with AB-PBO, -PBT or -PBI polymers, a non-thermoplastic flexible coil variant of the PBZ polymer. Tsai, *Method for Making Heterocyclic Block Copolymer*, U.S. Pat. No. 4,544,713 (Oct. 1, 1985); Gordon et al., "Synthesis and Characterization of Segmented Block Copolybenzimidazoles Containing Rigid Rod and Flexible Coil Segments," 28(2) *Polymer Preprints* 308 (1987); Gordon et al., "Thermally Stable Block Copolymers," 26(1) *Polymer Preprints* 146 (1985); Tsai et al., "High Strength Modulus ABA Block Copolymers," 26(1) *Polymer Preprints* 144 (1985); Krause et al., "Morphology and Mechanical Properties of a Phase Separated and a Molecular Composite 30% PBT/70% ABPBI Triblock Copolymer," 29 *Polymer* 195 (1988); Evers, "Graft Copolymers of Rodlike Poly(p-phenylenebenzobisimidazole)," 29(1) *Polymer Preprints* 244 (1988); and Gordon et al., "Thermally Stable Block Copolymers," 27(1) *Polymer Preprints* 311 (1986). However, it is not yet reported that any composition containing rigid rod PBZ polymer has a glass transition temperature to which it can be heated without experiencing substantial phase separation.

New polymers and compositions containing PBZ moieties are needed, and particularly those which are thermoplastic and do not experience substantial phase separation even after being heated and shaped at their glass transition temperature or above.

SUMMARY OF THE INVENTION

A first aspect of the present invention is a PBZ polymer terminated by an active acylation reactive group, which polymer comprises:
 (1) a rigid rod PBZ block;
 (2) a decoupling group linked to the rigid rod PBZ block; and
 (3) an acylation reactive group linked to said decoupling group.

A second aspect of the present invention is a process for making a rigid rod PBZ polymer terminated by an acylation reactive group, said process comprising the step of contacting a rigid rod PBZ polymer terminated by an azole-forming moiety with a terminating monomer having
 (1) an azole-forming moiety capable of reacting with the azole-forming moiety on the PBZ polymer;
 (2) a decoupling group linked to said azole-forming moiety; and
 (3) an acylation reactive group bonded to said decoupling group,
in a solvent acid under conditions such that a PBZ polymer terminated by an acylation reactive group is produced.

A third aspect of the present invention is a process for forming a block copolymer comprising the step of contacting a PBZ polymer terminated by an active end group, in solvent acid capable of dissolving it, with either (1) a thermoplastic polymer containing a polyamide, polyimide, polyquinoxaline, polyquinoline, poly(aromatic ketone), poly(aromatic sulfone) or poly(aromatic ether) or a copolymer of one of those polymers, which thermoplastic polymer is soluble in the solvent acid and can react to form a link with the active end group of the PBZ polymer or (2) at least one monomer which can react in the solvent acid to form a link with the PBZ polymer and to form a thermoplastic polymer containing poly(aromatic ketone), poly(aromatic sulfone) or poly(aromatic ether) or a copolymer of one of those polymers, under conditions such that a copolymer having a PBZ polymer block and thermoplastic polymer block is formed.

A fourth aspect of the present invention is a block copolymer comprising:

(1) a PBZ block having at least ten mer units; and
(2) a thermoplastic block linked to said PBZ block containing a polyamide, polyimide, polyquinoxaline, polyquinoline, poly(aromatic ketone), poly(aromatic sulfone) or poly(aromatic ether) or a copolymer of one of those polymers.

A fifth aspect of the present invention is a thermoplastic composition comprising PBZ blocks linked to thermoplastic blocks containing a polyamide, polyimide, polyquinoxaline, polyquinoline, poly(aromatic ketone), poly(aromatic sulfone) or poly(aromatic ether) or a copolymer of one of those polymers, which composition has a glass transition temperature of no more than about 400° C., is not substantially phase separated, and can be heated to its glass transition temperature without substantial phase separation.

A sixth aspect of the present invention is a dope comprising solvent acid and a block copolymer or polymer composition of the present invention. A seventh aspect of the present invention is a shaped article comprising a block copolymer or polymer composition of the present invention.

Functionally terminated PBZ polymers which form the first aspect of the second invention are synthesized by the process of the second aspect of the invention. The functionally terminated PBZ polymers can be formed into useful fibers and films as described in U.S. Pat. No. 4,533,693 at columns 82–85; but are more useful as reagents in the process which forms the third aspect of the present invention.

The process which forms the third aspect of the present invention makes a dope, which forms the sixth aspect of the present invention and contains block copolymers which are the fourth aspect of the present invention and polymer compositions which are the fifth aspect of the present invention. Those block copolymers and polymer compositions can be coagulated out of the dope into useful shaped articles, such as fibers and films by processes described in U.S. Pat. No. 4,533,693 at columns 82–85 and in Hwang et al., "Solution Processing and Properties of Molecular Composite Fibers and Films," 23 *Polymer Eng. & Sci.* 784, 785 (1983), which are previously incorporated by reference.

Fibers and films have high tensile strength and modulus and can be used to form articles as described in U.S. Pat. No. 4,533,693 at columns 82–85. Furthermore, within preferred embodiments, fibers and films are thermoplastic and can be heated above their glass transition temperature without experiencing substantial phase separation. Therefore, the fibers and films can be compression molded at or above their glass transition temperature to make useful shaped articles of high strength, such as compression molded laminates.

DETAILED DESCRIPTION OF THE INVENTION DEFINITIONS

The following terms, which are used repeatedly throughout this application, have the meanings and preferred embodiments set out hereinafter unless otherwise specified.

AA/BB-Polybenzazole (AA/BB-PBZ)—a polybenzazole polymer characterized by mer units having a first aromatic group (Ar1), a first and a second azole ring fused with said first aromatic group, and a divalent linking moiety (DL) bonded by a single bond to the 2-carbon of the second azole ring. The divalent linking moiety (DL) is inert under conditions suitable to synthesize PBZ polymers; it is preferably a second aromatic group (Ar2). Mer units are preferably linked by a bond from the divalent linking group (DL) to the 2-carbon of the first azole ring in an adjacent mer unit. Mer units suitable for AA/BB-PBZ polymers are preferably represented by Formula 1:

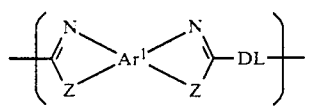

wherein Z is as defined for azole rings subsequently and all other characters have the meaning and preferred embodiments previously given.

AB-Polybenzazole (AB-PBZ)—a polybenzazole polymer characterized by mer units having a first aromatic group and a single azole ring fused with said first aromatic group. The units are linked by a bond from the 2-carbon of the azole ring in one mer unit to the aromatic group of an adjacent mer unit. Mer units suitable for AB-PBZ polymers are preferably represented by Formula 2:

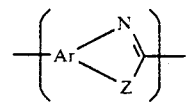

wherein Z is as defined for azole rings subsequently and all other characters have the meaning and preferred embodiments previously given.

Acid group (AG)—a carboxylic acid, a sulfonic acid or a derivative of such an acid, such as a halide or ester, which can react in solvent acid with an aromatic group to form an aromatic ketone or sulfone moiety. Acid groups are preferably the acid or acid halide and more preferably a carboxylic acid or carboxylic acid chloride.

Acylation reactive group (AC)—either
(1) an acid group as previously defined or
(2) an aromatic group,
which is capable of reacting with another acylation reactive group in the presence of an acylation catalyst such as aluminum chloride or a solvent acid to form an aromatic ketone or sulfone. The aromatic group must not contain a deactivating moiety, such as a carbonyl or sulfonyl group, unless the deactivating group is sufficiently decoupled from the reactive site of the acylation reactive group for the reaction to occur.

o-Amino-basic moiety—a moiety, which is bonded to an aromatic group, consisting of
(1) a primary amine group bonded to the aromatic group and
(2) a hydroxy, thiol or primary or secondary amine group bonded to the aromatic group ortho to said primary amine group.

It preferably comprises a hydroxy, thiol or primary amine moiety, more preferably comprises a hydroxy or thiol moiety, and most preferably comprises a hydroxy moiety. Secondary amine groups comprise an aromatic or an aliphatic group and preferably an alkyl group. The secondary amine group preferably comprises no more than about 6 carbon atoms, more preferably no more than about 4 carbon atoms and most preferably no more than about 1 carbon atom.

Aromatic group (Ar)—any aromatic ring or ring system. Size is not critical as long as the aromatic group is not so big that it prevents further reactions of the moiety in which it is incorporated. Each aromatic group independently preferably comprises no more than about 18 carbon atoms, more preferably no more than about 12 carbon atoms and most preferably no more than about 6 carbon atoms. Each may be heterocyclic but is preferably carbocyclic and more preferably hydrocarbyl. If the aromatic group is heterocyclic, the heteroatom is preferably nitrogen.

Unless otherwise specified, each aromatic group may comprise a single aromatic ring, a fused ring system or an unfused ring system containing two or more aromatic moieties joined by bonds or by divalent moieties which are inert under polymerization conditions. Suitable divalent moieties comprise, for example, a carbonyl group, a sulfonyl group, an oxygen atom, a sulfur atom, an alkyl group and/or a perfluorinated alkyl group. Each aromatic group is preferably a single six-membered ring. When the aromatic group is an acylation reactive group, the divalent moiety may not contain deactivating groups, such as carbonyl or sulfonyl groups, unless they are sufficiently removed or decoupled from the reactive site for aromatic electrophilic substitution to occur.

Each aromatic group may contain substituents which are stable in solvent acid, do not interfere with further reactions of the moiety which the aromatic group is part of, and do not undergo undesirable side reactions. Examples of preferred substituents include halogens, alkoxy moieties or alkyl groups. More preferred substituents are either an alkyl group having no more than about 6 carbon atoms or a halogen. Most preferably, each aromatic group contains only those substituents specifically called for hereinafter.

Azole ring - an oxazole, thiazole or imidazole ring. The carbon atom bonded to both the nitrogen atom and the oxygen, sulfur or second nitrogen atom is the 2-carbon, as depicted in Formula 3

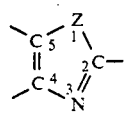

3 wherein Z is —O—, —S— or —NR—; and R is hydrogen, an aromatic or an aliphatic group, preferably hydrogen or an alkyl group, and most preferably hydrogen. R preferably comprises no more than about 6 carbon atoms, more preferably no more than about 4 and most preferably no more than about 1. Each azole ring is independently preferably oxazole or thiazole and more preferably oxazole. In PBZ polymers, the 4- and 5-carbon of each azole ring is ordinarily fused with an aromatic group.

Azole-forming moiety—an "o-amino-basic moiety" or "electron-deficient carbon group," as those terms are defined herein.

Benzazole moiety—a moiety containing one or more mer units which each individually comprise:
(1) an aromatic group (Ar¹); and
(2) a first azole ring fused with said aromatic group (Ar¹);
and preferably further comprise:
(³) a second azole ring fused with said aromatic group.

Examples of suitable benzazole moieties include those represented by Formulae 4(a)–(c)

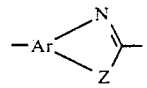

4a

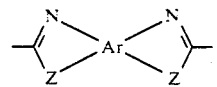

4b

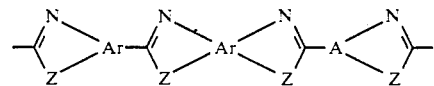

4c

Pluralities of benzazole units as illustrated in 4(b)–(c) are preferably linked by divalent linking moieties (DL), as illustrated in describing AA/BB-PBZ. Pluralities of benzazole moieties as illustrated in 4(a) are preferably linked as illustrated in describing AB-PBZ.

Except in PBZ blocks, benzazole moieties used in the present invention comprise, on average, less than 10 mer units each, preferably no more than about 5 mer units each, more preferably no more than about 3 mer units each and most preferably no more than about 1 mer unit each. Mer units are preferably linked by a bond from the 2-carbon of an azole ring in one mer unit to either the aromatic group or the divalent organic moiety of an adjacent unit.

Decoupling group (D) —a divalent moiety which links an acylation reaction group to a deactivating group, such as an azole ring, a carbonyl group or a sulfonyl group, and which, due to its composition, structure or both, shields the acylation reactive group from the deactivating influence of the deactivating group sufficiently for the acylation reactive group to react with another acylation reactive group in solvent acid. Decoupling groups may comprise, for example, an ether group, a thio group, an aliphatic group, a plurality of aromatic groups and/or sometimes an m-aromatic group. Each decoupling group independently, preferably comprises a plurality of aromatic groups and more preferably further comprises an oxygen or sulfur atom. Each oxygen or sulfur atom is independently preferably an oxygen atom.

If the acylation reactive group is an acid group, then the decoupling group most preferably consists essentially of two aromatic groups linked by an oxygen or sulfur atom.

If the acylation reactive group is an aromatic group, then the decoupling group more preferably comprises two aromatic groups and an oxygen or sulfur atom which either links the two aromatic groups of the decoupling group or links the acylation reactive group to an aromatic group of the decoupling group. The decoupling group most preferably comprises two aromatic groups, a first oxygen or sulfur atom linking the two aromatic groups, and a second oxygen or sulfur atom linking one of the aromatic groups to the acylation reactive group. For instance, the decoupling group and acylation reactive group preferably conform to Formula 5(a):

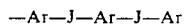 (5a)

wherein each Ar is an aromatic group, and each J is an oxygen atom, a sulfur atom or a bond, chosen such that at least one J is an oxygen atom or a sulfur atom. More preferably, each J is an oxygen or sulfur atom. Most preferably, each J is an oxygen atom.

Other examples of suitable decoupling groups include:

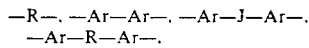 (5b)

wherein each R is an aliphatic moiety, each Ar is an aromatic group, and each J is an oxygen or sulfur atom. Decoupling and suitable decoupling groups are discussed in Colquhoun, "Synthesis of Polyether Ketones in Trifluoromethane Sulfonic Acid," 25 (2) Polymer Preprints 17-18 & Table II (1984); and Colquhoun et al., "Synthesis of Aromatic Polyether Ketones in Trifluoromethane Sulfonic Acid," 29 Polymer 1902 (1988), which are incorporated herein by reference.

Electron-deficient carbon group (Q)—any group containing a carbon atom which can react in the solvent acid with an o-amino-basic moiety to form an azole ring, such as the groups listed in column 24, lines 59-66 of the U.S. Pat. No. 4,533,693, which is incorporated herein by reference, plus ortho esters, metal carboxylate salts, cyano groups and trihalomethyl groups. Preferred electron-deficient carbon groups are carboxylic acids and acid halides. Halogens in electron-deficient carbon groups are preferably chlorine, bromine or iodine and more preferably chlorine.

Solvent acid—any non-oxidizing liquid acid capable of dissolving PBZ polymers, such as sulfuric acid, methanesulfonic acid, trifluoromethylsulfonio acid, polyphosphoric acid and mixtures thereof, which is suitable for carrying out azole-ring formation or acylation or sulfonation reactions used in the present invention. It must be sufficiently non-oxidizing that it does not substantially oxidize AB- and BB-PBZ monomers which are dissolved therein. Solvent acids are preferably dehydrating acids, such as polyphosphoric acid or a mixture of methanesulfonic acid and phosphorus pentoxide and/or polyphosphoric acid. Polyphosphoric acid preferably has a $P_2O_5$ content by weight of at least about 75 percent, more preferably at least about 78 percent and preferably has a $P_2O_5$ content of at most about 90 percent, more preferably at most about 85 percent. The ratio of methanesulfonic acid to phosphorus pentoxide in mixtures of those compounds is preferably no more than about 20:1 by weight; and preferably no less than about 1:1, more preferably no less than about 5:1 by weight. However, certain solvent acids, such as trifluoromethanesulfonic acid, are suitable for carrying out acylation or sulfonation reactions even though they do not contain a dehydrating component, such as phosphorus pentoxide.

Polybenzazole (PBZ) polymer—A polymer from the group of polybenzoxazoles and polybenzobisoxazoles (PBO), polybenzothiazoles and polybenzobisthiazoles (PBT) and polybenzimidazoles or polybenzobisimidazoles (PBI). For the purposes of this application, the term "polybenzoxazole (PBO)" refers broadly to polymers in which each unit contains an oxazole ring bonded to an aromatic group, which need not necessarily be a benzene ring. The term "polybenzoxazole (PBO)" also refers broadly to poly(phenylene-benzobis-oxazole)s and other polymers wherein each unit comprises a plurality of oxazole rings fused to an aromatic group. The same understandings shall apply to the terms polybenzothiazole (PBT) and polybenzimidazole (PBI). Polybenzazole polymers used in the present invention are preferably polybenzoxazole or polybenzothiazole, and more preferably polybenzoxazole.

Rigid Rod PBZ polymer—An "intrinsic" or "articulated" rigid rod PBZ polymer as the terms "intrinsic" and "articulated" are defined in the Hwang, "Processing, Structure and Properties of Liquid Crystalline PBT Polymer", Kansai Committee of the Society of Fiber Science and Technology, Japan, Post Symposium on Formation, Structure and Properties of High Modulus and High Tenacity Fibers 23-26 (Aug. 26, 1985); Evers et al, "Articulated All-Para Polymers with 2,6-Benzobisoxazole, 2,6-Benzobisthiazole, and 2,6-Benzobisimidazole Units in the Backbone," 14 Macromolecules 925 (1981); Evers, "Thermoxadatively Stable Articulated Benzobisoxazole and Benzobisthiazole Polymers," 24 J. Poly. Sci. Part A 1863 (1986) and Evers et al., *Articulated Para-Ordered Aromatic Heterocyclic Polymers Containing Diphenoxybenzene Structures.* U.S. Pat. No. 4,229,566 (Oct. 21, 1980).

Intrinsic rigid rod polymers are essentially rectilinear and are theorized to have a persistence length comparable to their contour length. Articulated rigid rod polymers comprise a plurality of essentially rectilinear moieties joined by a relatively small number of non-linear moieties Rigid rod PBZ polymers used in the present invention are preferably intrinsic rigid rod polymers. If articulated, they preferably comprise on average no more than about 1 non-linear mer unit for each 9 essentially rectilinear mer units.

Description of Certain Useful Monomers

Certain monomers useful to synthesize PBZ polymers and/or poly(aromatic ketone or sulfone) polymers may be useful in the present invention. Such monomers are described here for convenience. Each such monomer comprises two functional moieties chosen from the group consisting of azole-forming moieties and acylation reactive groups.

Following the terminology convention established in Dahl et al., *Aromatic Poly(Ether Ketones) Having Imide, Amide, Ester, Azo, Quinoxaline, Benzimidazole. Benzoxazole or Benzothiazole Groups and Method of Preparation.* PCT Publication 86/02368 (Apr. 24, 1986), which is incorporated herein by reference, the presence of an acid group which serves as an acylation reactive group in a monomer is denoted by using the letter "E-" as a prefix to the monomer name, and the presence of an aromatic group which serves as an acylation reactive group is denoted by using the letter "N-" as a prefix to the monomer name. For instance, an EE-monomer has two acid groups, an NN-monomer has two aromatic groups, and an EN-monomer has an acid group and an aromatic group.

Following the terminology convention established in 11 Ency. Poly. Sci. & Eng., *Polybenzothiazoles and Polybenzoxazoles.* 601 (J. Wiley & Sons 1988), which is incorporated herein by reference, the presence of an electron-deficient carbon group in a monomer is denoted by the prefix "A-", and the presence of an o-amino-basic moiety is denoted by the prefix "B-". For instance, BB-monomers contain two o-amino-basic moieties, AA-monomers contain two electron-deficient carbon groups, and AB-monomers contain an electron-deficient carbon group and an o-amino-basic moiety Carboxylic acid and acid halides are highly preferred as both acid groups and electron-deficient carbon groups. Therefore, certain monomers can react in different fashions with different monomers. For instance, bis-(4-benzoic acid), oxy-bis-(4-benzoic acid) and their halides can serve as AA-monomers, EE-monomers and/or AE-monomers, depending upon the reagents with which they are reacted. This dual or triple action of some monomers may introduce random structural variations into the polymers and copolymers where such monomers are used.

Examples of monomers useful in the practice of the invention include: AA-, BB-, AB-, EE-, NN-, EN-, AE-, AN-, BE- and BN-monomers Functional moieties in NN-, EN-, AE-, AN-, BE- and BN-monomers are preferably isolated from each other by decoupling groups. Acid groups, ketone or sulfone groups, and azole rings have a deactivating influence on acylation reactive groups which may prevent development of high molecular weight polymer unless mutually deactivating moieties in the monomers are decoupled. Decoupling is discussed in Colquhoun, "Synthesis of Polyether Ketones in Trifluoromethane Sulfonic Acid," 25 (2) Polymer Preprints 17-18 & Table II (1984): and Colquhoun et al., "Synthesis of Aromatic Polyether Ketones in Trifluoromethane Sulfonic Acid," 29 Polymer 1902 (1988), which are incorporated herein by reference.

AE-monomers—comprise an acid group and an electron-deficient carbon group. They preferably comprise:
1. an electron-deficient carbon group;
2. a decoupling group linked to said electron-deficient carbon group: and
3. an acid group bonded to said decoupling group in a position wherein it is capable of reacting with an aromatic group to form an aromatic ketone or sulfone moiety in solvent acid.

The electron-deficient carbon group has the description and preferred embodiments previously defined. It is most preferably a carboxylic acid or acid halide. The acid group has the description and preferred embodiments previously defined. It is highly preferably a carboxylic acid, a sulfonic acid or an acid halide thereof. The electron-deficient carbon group and the acid group are linked by a decoupling group having the description and preferred embodiments previously defined Each decoupling group individually preferably comprises two aromatic moieties and more preferably further comprises an ether or thioether moiety linking the two aromatic groups.

The AE-monomer preferably conforms to Formula 6(*a*):

$$Q-D-AG \qquad (6a)$$

wherein Q is an electron-deficient carbon group, D is a decoupling group, and AG is an acid group, as each of those moieties is previously described. The AE-monomer more preferably conforms to Formula 6(*b*):

$$Q-Ar-J-Ar-AG \qquad (6b)$$

wherein each Ar is independently an aromatic group, and J is an oxygen atom, a sulfur atom or a bond, as those moieties are previously described, and Q and AG have the meaning previously given. Examples of suitable AE-monomers include bis-(4-benzoic acid), oxy-bis-(4-benzoic acid), 1-(4-carboxylic acid phenoxy)-4-(4-sulfonic acid phenoxy)benzene and the acid halide or esters thereof.

AN-monomers—comprise an electron-deficient carbon group and an aromatic group which acts as an acylation reactive group. AN-monomers preferably comprise:
1. an electron-deficient carbon group:
2. a decoupling group linked to said electron-deficient carbon group: and
3. an aromatic group bonded to said decoupling group in a position where it is sufficiently active to react with an acid group in solvent acid.

The electron-deficient carbon group, decoupling group and aromatic group have the meaning and preferred embodiments previously defined. The decoupling group highly preferably comprises two aromatic groups and one ether or thioether moiety. It more highly preferably further comprises a second ether or thioether moiety. Each AN-monomer preferably conforms to Formula 7(*a*):

$$Q-D-Ar \qquad (7a)$$

and more preferably conforms to Formula 7(*b*)

$$Q-Ar-J-Ar-J-Ar \qquad (7b)$$

wherein each character has the meaning previously assigned and wherein at least one J is an ether or thioether moiety. Examples of suitable AN-monomers include 4-phenoxyphenoxybenzoic acid, 4-phenylphenoxybenzoic acid and acid halides or esters thereof.

BE-Monomers comprise an o-amino-basic moiety and an acid group. BE-monomers preferably comprise:
1. a first aromatic group:
2. an o-amino-basic group bonded to said aromatic group: and
3. an acid group linked to said aromatic group such that it is capable of reacting with an aromatic group in solvent acid.

The aromatic group, the o-amino-basic group, and the acid group all have the definitions and preferred embodiments previously defined. BE-monomers preferably further comprise a decoupling group linking the acid group to the aromatic moiety. The decoupling group highly preferably comprises a second aromatic group and more highly preferably comprises an oxygen or sulfur atom linking the first and second aromatic groups. BE-monomers preferably conform to Formula 8(*a*)

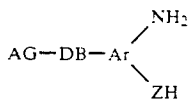  8a and more preferably conform to Formula 8(b):

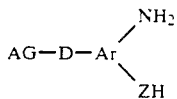  8b and most preferably conform to Formula 8(c): wherein Z has the meaning previously given in defining azole rings, DB is either a decoupling group or a bond, and all other characters have the meaning and preferred embodiments previously given.

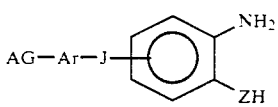  8c

Examples of BE-monomers are found in Table 8, columns 33-35 of U.S. Pat. No. 4,533,693, which is incorporated herein by reference. More decoupled monomers, for instance 4-(3-amino-4-hydroxyphenoxy)benzoic acid and variations thereof, can be synthesized by substitution of reagents into the processes described therein.

BN-monomers comprise an o-amino-basic moiety and an aromatic group that functions as an acylation reactive group. BN-monomers preferably comprise:
1. a first aromatic group:
2. an o-amino-basic moiety bonded to said aromatic group: and
3. a second aromatic group linked to said first aromatic group by a bond or a decoupling moiety such that it is capable of reacting with an acid group in solvent acid.

The first and second aromatic groups and the o-amino-basic moiety have the description and preferred embodiments previously given. The decoupling group has the broad description previously given but preferably comprises an aliphatic moiety, an ether moiety or a thioether moiety; more preferably comprises an ether moiety or a thioether moiety: and most preferably consists of an ether moiety. BN-monomers preferably conform to Formula 9(a)

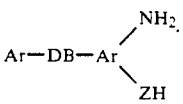  9a and more preferably conform to Formula 9(b):

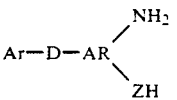  9b and most preferably conform to Fomula 9(c):

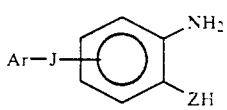  9c wherein J is an oxygen atom, a sulfur atom or a bond and all other characters have the meaning and preferred embodiments previously given.

AA-monomers contain two electron-deficient carbon groups linked by a divalent linking moiety which is inert under reaction conditions. Electron-deficient carbon groups conform to the definitions and preferred embodiments previously set out. The divalent linking moiety preferably comprises a saturated aliphatic moiety or an aromatic group, more preferably comprises an aromatic moiety, and most preferably comprises an aromatic moiety having the electron-deficient carbon groups in para positions with respect to each other. Examples of suitable AA-monomers are set out in U.S. Pat. No. 4,533,693, columns 25-32, Tables 4-6, which are incorporated herein by reference. Highly preferred AA-monomers include bis-(4-benzoic acid), terephthalic acid and acid halides or esters thereof. AA-monomers preferably conform with formula 10(a):

$$Q-DL-Q \qquad (10a)$$

wherein DL is a divalent moiety as previously described in defining benzazole moieties and Q is an electron-deficient carbon group.

BB-monomers comprise:
1. an aromatic group
2. a first o-amino-basic moiety bonded to said aromatic group: and
3. a second o-amino-basic moiety bonded to said aromatic group.

The aromatic group and o-amino-basic moieties have the meaning and preferred embodiments previously defined. The BB-monomer preferably complies with Formula 11:

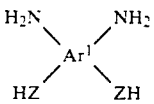  11 wherein:
Ar¹ is an aromatic moiety as previously described: and
each Z conforms to the definition and preferred embodiments previously given in describing azole rings.

The aromatic group may comprise a plurality of fused and unfused rings, such as a tetravalent naphthyl, biphenyl, diphenyl ether or diphenyl sulfone moiety, but preferably is a six-membered ring, such as a tetravalent phenylene or pyridinylene ring. Suitable examples of BB-monomers are described in U.S. Pat. No. 4,533,693, columns 19-24, Tables 1-3. Highly preferred monomers include 4,6-diaminoresorcinol, 2,5-diaminohydroquinone, 1,4-dithio-2,5-diaminobenzene and acid salts thereof.

AB-monomers preferably comprise:
1. an aromatic group
2. a first o-amino-basic moiety bonded to said aromatic group; and 3. an electron-deficient carbon group linked to said aromatic group.

The electron-deficient carbon group may be bonded directly to the aromatic group in the monomer or may be linked to the aromatic group by a moiety such as an aliphatic or aromatic moiety which is inert with respect to all reagents under reaction conditions. AB-monomers preferably conform with Formula 12(a):

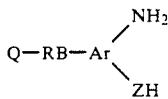 (12a)

and more preferably conform with Formula 12(b):

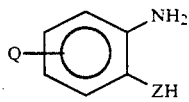 (12b)

wherein RB is either a bond or an aliphatic or aromatic moiety which is inert under polymerization conditions, and all characters have the meaning and preferred embodiments previously given Examples of suitable AB-monomers are shown in U.S. Pat. No. 4,533,693, column 32–35, Tables 7–8. Preferred examples include 3-amino-4-hydroxybenzoic acid, 3-hydroxy-4-aminobenzoic 3-mercapto-4-aminobenzoic acid, and the acid halides or esters thereof.

EE-monomers preferably comprise two acid groups linked by a decoupling group. The acid groups and the decoupling group each independently have the meanings and preferred embodiments previously defined. EE-monomers preferably comply with Formula 13(a):

AG—D—AG  (13a)

and more preferably comply with Formula 13(b):

AG—Ar—J—A—AG  (13b)

wherein all characters have the meanings and preferred embodiments previously assigned. Preferred EE-monomers include bis-(4-benzoic acid), oxy-bis-(4benzoic acid) and the acid halides of those monomers.

NN-monomers comprise two aromatic groups linked by a decoupling group. The aromatic groups have the meaning and preferred embodiments previously given. The decoupling group has the broad definition previously given. The decoupling group preferably comprises an aromatic group and at least one ether or thioether moiety. It more preferably comprises an aromatic group and two ether or thioether moieties and most preferably comprises an aromatic group and two ether moieties. Suitable NN-monomers preferably comply with Formula 14(a):

Ar—D—Ar  (14a)

wherein each J is independently an oxygen atom, a sulfur atom or a bond, and x is a number of repeating units and all other characters have the meaning and preferred embodiments previously defined. Preferably, x averages at least about 1 and preferably averages no more than about 6, more preferably no more than about 2 and most preferably no more than about 1. Examples of preferred NN-monomers include m-diphenoxybenzene, p-diphenoxybenzene, p-phenoxybiphenyl and 4,4'-diphenoxybiphenyl.

EN-monomers comprise an acid group and an aromatic group linked by a decoupling group. The acid group, the aromatic group and the decoupling group all have the meanings and preferred embodiments previously defined. The acid group and the aromatic group should be bonded to the decoupling group in a position where they remain sufficiently active to react in solvent acid to form a polymer. EN-monomers preferably conform with Formula 15(a):

AG—D—Ar  (15a)

and more preferably conform with Formula 15(b):

AG—Ar—(J—Ar)$_x$—J—Ar  (15b)

wherein each character has the meaning and preferred embodiments previously described and at least one J is an oxygen or sulfur atom. Examples of suitable EN-monomers include 4-phenoxyphenoxybenzoic acid, 4-phenylphenoxybenzoic acid, 4-phenoxyphenoxybenzenesulfonic acid, 4-phenylphenoxybenzenesulfonic acid, and acid halides or esters thereof.

The monomers are either known and commercially available or can be synthesized by known methods. Diphenoxybenzene, bis-(4-benzoic acid) and oxy-bis-(4-benzoic acid) are commercially available.

EE-, NN- and EN-monomers can be synthesized by obvious variations on known reactions, such as are taught in the Colquhoun references and in Sutherlin et al., "Rigid-Rod Polyquinolines with Extended Aryl Ether Pendent Groups," 18 *Macromolecules* 2669, 2670, 673–74 (1985), which is incorporated herein by reference. The same processes and obvious variations may be used to synthesize AE- and AN-monomers. In the Sutherlin reference, a benzoate ester having a hydroxyl group bonded to the benzene ring is reacted with a halogenated aromatic moiety in the presence of an alkali metal alkoxide to form the corresponding aromatic ether having an ester moiety. The ester can be converted to an acid, acid halide or cyano moiety by known processes.

Sources and synthesis for AA-, BB- and AB-monomers are given in U.S. Pat. No. 4,533,693, columns 19–35, Tables 1–8; in Lysenko, *High Purity Process for the Preparation of* 4,6-Diamino-1,3-Benzenediol, U.S. Pat. No. 4,766,244 (Aug. 23, 1988): in Lysenko, *Preparation of* 3-Amino-4-Hydroxybenzoic Acids, U.S. Pat. No. 4,835,306 (May 30, 1989); and in Inbasekaran, *Preparation of Diamino- and Dialkylaminobenzenediols.* U.S. Pat. No. 4,806,688 (Feb. 21, 1989), which are incorporated herein by reference. The same reactions and obvious variations thereof can be used to synthesize BE- and BN-monomers.

(For the purpose of this application, when the amine groups and Z moieties of a monomer are depicted as bonded to an aromatic group without indicating their position, as in the illustrations of AB-, BB-, BE-, and BN-monomers previously, it shall be understood that:
  (1) each amine group is ortho to one Z moiety; and
  (2) if the monomer has two o-amino-basic moieties, one primary amine group and Z moiety may be in either cis position or trans position with respect to the other amine group and Z moiety, as illustrated in Formulae 16a)–(b) and as described in 11 Ency. Poly. Sci. & Eng., supra, at 602, which is incorporated herein by reference.

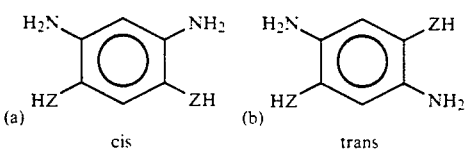

cis — (a) ; trans — (b)

The same understandings apply with respect to nitrogen atoms and Z moieties in an azole ring fused to an aromatic moiety, as illustrated in 11 Ency. Poly. Sci. & Eng., supra, at 602, which is incorporated herein by reference.)

PBZ Blocks and Their Synthesis

Useful intermediates for making block copolymers of the present invention are PBZ polymers comprising: (1) a PBZ block containing on average at least about 10 PBZ mer units and (2) at least one reactive moiety linked to said PBZ block which can form a linkage with a thermoplastic polymer. The reactive moieties are preferably azole-forming moieties or acylation reactive sites. The PBZ block is preferably a rigid rod PBZ block, as previously defined and as further described hereinafter. The basic properties and synthesis of PBZ polymers are discussed in detail in the Wolfe and Tsai patents previously incorporated by reference. Any PBZ polymer defined therein can form a PBZ block in the practice of the present invention.

PBZ blocks are preferably synthesized by the reaction in solvent acid of AB-monomers and/or AA- and BB-monomers. The reaction mixture preferably comprises at least some AA- and BB-monomers. Each AA- and BB-monomer is individually preferably a "linear" AA- or BB-monomer, chosen such that the PBZ block is an articulated or intrinsic rigid rod.

Linear BB-monomers have the definition and preferred embodiments previously given, but comply with the following additional limitations:

(1) the first aromatic moiety is a single ring or a fused ring system, and more preferably a single ring; and (2) each group in the first o-amino-basic moiety is para with respect to a group in the second o-amino-basic moiety, i.e., groups in the first o-amino-basic moiety are in 1 and 2 position and groups in the second o-amino-basic moiety are in 4 and 5 position on a single ring: groups in the first o-amino-basic moiety are in 2 and 3 position and groups in the second o-amino-basic moiety are in 6 and 7 position on a system of two fused rings: and so on.

For example, the linear BB-monomer may comply with Formula 11 wherein $Ar^1$ is chosen from the moieties depicted in Formulae 17(a)-(g):

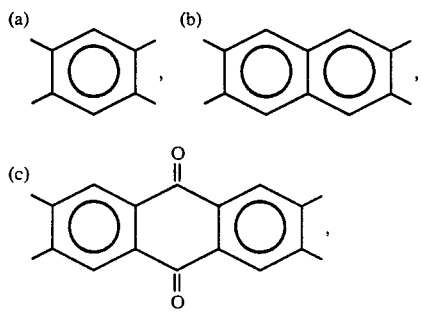

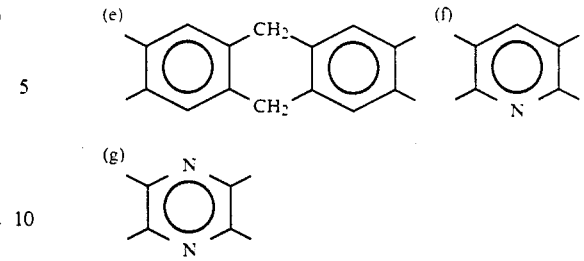

or substitute-bearing variations and heterocyclic variations thereof. $Ar^1$ is preferably a six-membered ring as depicted in Formulae 17(a), (f) or (g).

Examples of linear BB-monomers are found in U.S. Pat. No. 4,533,693, Table 1, columns 19–21, in Lysenko, *High Purity Process for the Preparation of* 4,6-*Diamino-1,3-Benzenediol*, U.S. Pat. No. 4,766,244 (Aug. 23, 1988) and in Inbasekaran, *Preparation of Diamino- and Dialkylaminobenzenediols*, U.S. Pat. No. 4,806,688 (Feb. 21, 1989). Linear BB-monomers more preferably comply with either Formula 18(a) or (b). The most preferred linear BB-monomers are 4,6-diaminoresorcinol and 2,5-diaminohydroquinone.

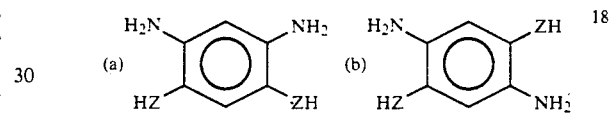

Linear AA-monomers have the definition and preferred embodiments previously given for AA-monomers, but conform to the following guidelines;

(1) the divalent linking group (DL) is a second aromatic group; and (2) the first and second electron-deficient carbon groups are bonded to the second aromatic group in para position with respect to each other.

For example, linear AA-monomers may comply with Formula 10, wherein DL is a bond or a second aromatic group depicted in Formulae 19(a)-(c)

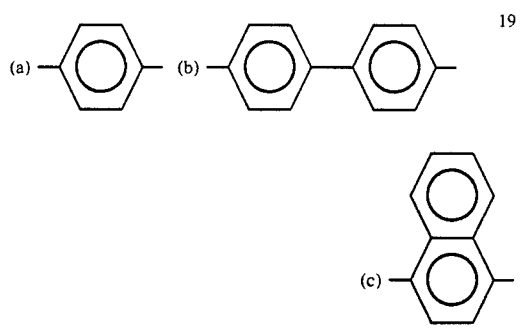

or a substitute-bearing variation or heterocyclic variation thereof. The linking moiety (DL) is preferably a six-membered ring or an unfused pair of six-membered rings linked by a single bond which is para to the electron-deficient carbon groups. It is more preferably either a 1,4-phenylene or a 4,4'-biphenylene group and most preferably a 1,4-phenylene group. Examples of linear AA-monomers are found in U.S. Pat. No. 4,533,693, Table 4 (all shown except 2e-2h) and Table 5(2 aa and bb), columns 25–29. Linear AA-monomers are most preferably terephthalic acid or terephthaloyl chloride.

Some or all of the monomers polymerized may also be "non-linear" monomers. Examples of non-linear BB-monomers and references to their synthesis are found in U.S. Pat. No. 4,533,693, Tables 2 and 3, columns 21-22 and 23-24. Examples of non-linear AA-monomers and references to their synthesis are found in U.S. Pat. No. 4,533,693 Table 4(2e-2h) and Tables 5 (except for 2 aa and bb) and 6, columns 26 and 29-32. All of the above are incorporated by reference.

Reaction conditions for polymerizing for AB-monomers and/or AA- and BB-monomers are similar and are discussed at length in 11 Ency. Poly. Sci. & Eng., supra, at 611-19 and in U.S. Pat. Nos. 4,703,103; 4,533,724; 4,533,692; 4,533,693 and 4,578,432 (Mar. 25, 1986) which are incorporated by reference. The reaction takes place in a solvent acid as previously defined. If a PBZ block of high molecular weight is desired in a liquid crystalline solution, the phosphorus pentoxide content of the polyphosphoric acid solvent may be controlled as described in U.S. Pat. No. 4,533,693 from column 42, line 61 to column 45, line 62, which is incorporated herein by reference. If only low molecular weight PBZ block is desired or if polymerization in a dilute solution is desired, such control is not necessary but is preferred.

The reaction is performed under an inert atmosphere, such as under nitrogen, argon or helium, or under vacuum. The pressure of the reaction is not critical as long as the solvent acid remains in liquid form. The pressure is conveniently between vacuum and ambient pressure.

The reaction is preferably commenced at a relatively low temperature, such as between about 40° C. and about 60° C., for two reasons. First, AB- and BB-monomers are ordinarily stored as hydrogen halide salts to hinder or prevent air oxidation of the monomer. The hydrogen halide must be removed from the monomer by a dehydrohalogenation step while the monomer is in the solvent acid prior to substantive polymerization. Dehydrohalogenation preferably takes place at a relatively low temperature sufficient to drive off the hydrogen halide in a solution of low enough viscosity and under low enough concentrations that foaming is minimized. Second, it is preferable to form oligomers at a lower temperature before achieving maximum reaction temperature, in order to avoid sublimation of certain AA-monomers such as terephthaloyl chloride and in order to avoid thermal decomposition of some BB-monomers such as 4,6-diaminoresorcinol. The temperature for dehydrohalogenation/oligomerization is preferably about 50° C.

The temperature is preferably raised after the dehydrohalogenation/oligomerization step. The maximum temperature achieved during the reaction is preferably at least about 70° C., more preferably at least about 95° C., more highly preferably at least about 150° C. and most preferably at least about 190° C. The maximum temperature of the reaction may go up to any point at which the polymer and solvent are stable. The maximum temperature is preferably no more than about 240° C., more preferably no more than about 225° C. and most preferably no more than about 210° C.

The reaction is continued for any time necessary to obtain the desired degree of polymerization. That time may vary widely depending upon the reagents and temperatures used, in a manner familiar to persons skilled in the art. The reaction preferably proceeds at between about 190° C. and 210° C. for at least about 0.5 hour.

Known variations on preferred syntheses may be necessary to make certain known variations for PBZ polymers. For instance, PBZ polymers containing perfluorinated moieties can be synthesized by the processes described in Evers, *Perfluoroalkylene Ether Bibenzoxazole Polymers*, U.S. Pat. No. 4,064,109 (Dec. 20, 1977); Evers, *Perfluoroalkylene Ether Bibenzoxazole Polymers*, U.S. Pat. No. 4,115,367 (Sep. 19, 1978); Evers, *Fluorocarbon Ether Bibenzoxazole Oligomers Containing Reactive Acetylenic Terminal Groups*, U.S. Pat. No. 4,147,858 (Apr. 3, 1979); and Murayama et al., "Synthesis and Properties of Fluorine-Containing Aromatic Polybenzoxazoles from Bis(o-aminophenols) and Aromatic Diacid Chlorides by the Silylation Method," 21(8) *Macromolecules* 2305 (1988), which are incorporated herein by reference.

A stoichiometric excess of BB-monomer over AA-monomer will shorten the polymer chain in a manner familiar to persons skilled in the art. Stoichiometric excess of AA-monomer has a somewhat similar effect in non-linear AA-monomers, but does not ordinarily substantially affect the polymer molecular weight when the AA-monomer is a linear AA-monomer and especially when the polymerization is performed at concentrations that result in liquid crystalline solutions. When PBZ blocks are synthesized for use in the present invention, preferably, neither the BB- nor the AA-monomer is in more than about a 10 percent molar excess; more preferably, the BB-monomer is in at least about a 1 percent excess; and most preferably the BB-monomer is in at least about a 5 percent excess. Among the AA- and BB-monomers, at least about 70 percent are preferably linear monomers, more preferably at least about 90 percent, more highly preferably at least about 97 percent and most preferably about 100 percent.

The concentration of monomer in solvent is not critical as long as the solvent can dissolve the resulting polymer or oligomer. The concentration of monomer in solvent is preferably at least about 1.5 weight percent and more preferably at least about 5 weight percent. Many monomers, such as terephthalic acid and 4,4'-bis(-benzoic acid) are only poorly soluble in solvent acids, so that vigorous stirring is required throughout the reaction Such monomers are preferably micronized.

Linear and non-linear BB- and AA-monomers and AB-monomers react to form PBZ mer units as exemplified in Equations 20(a)-(f), wherein DM is a bond or divalent moiety (as defined in the definition of aromatic groups) and all other moieties have the definitions previously given.

(a)

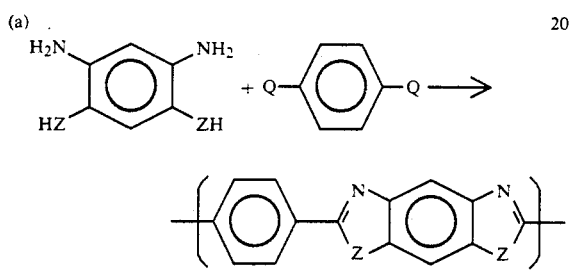

-continued

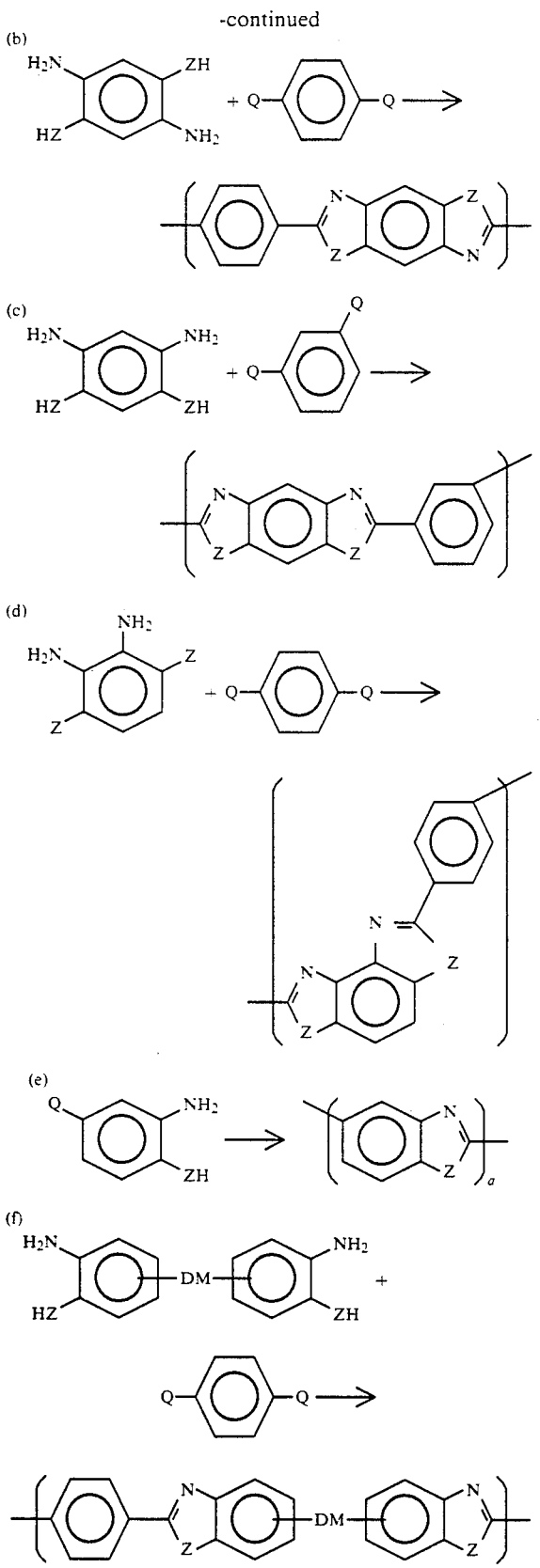

The reaction forms blocks of PBZ mer units. Each block should contain on average at least about 10 PBZ mer units. The AB-PBZ and AA/BB-PBZ mer units previously defined are suitable for PBZ blocks of the present invention. Each mer unit is independently preferably an AA/BB-mer unit.

PBZ blocks used in the present invention comprise on average at least about 10 PBZ mer units and preferably at least about 20 PBZ mer units. The PBZ blocks used in the present invention preferably comprise on average no more than about 150 repeating mer units, and more preferably no more than about 100 mer units, and most preferably no more than about 50 mer units. When the PBZ block is a rigid rod PBO or PBT, its inherent viscosity in methanesulfonic acid at 25° C. and a concentration of about 0.05 g/dL prior to incorporation into the block copolymer is preferably at least about 1 dL/g, more preferably at least about 5 dL/g and most preferably at least about 6 dL/g: and is preferably at most about 30 dL/g, more preferably at most about 12 dL/g and most preferably at most about 7 dL/g. Rigid rod PBZ most preferably has an inherent viscosity of about 6 dL/g.

Although PBZ blocks used in the present invention may be "flexible coil" PBZ blocks, each is highly preferably a rigid rod block and most preferably an intrinsic rigid rod block. When the PBZ block is an articulated rigid rod, "linear PBZ mer units" make up at least about 90 percent of the PBZ mer units and more preferably at least about 97 percent. In articulated rigid rod PBZ blocks, the non-linear PBZ mer units may be AB-PBZ mer units or non-linear AA/BB-PBZ mer units.

Linear PBZ mer units are AA/BB-PBZ mer units, wherein the first aromatic group (Ar1) is a first aromatic group as described for linear BB-monomers and the divalent linking group (DL) is a bond or a second aromatic group as described in describing linear AA-monomers. The divalent linking group (DL) is preferably a second aromatic group (Ar2) Linear PBZ mer units preferably comply with Formula 1 shown previously wherein:

(1) $Ar^1$ conforms to one of Formulae 17(a)-(g) or a substituted variation thereof; and
(2) DL is a bond or a second aromatic moiety ($Ar^2$) which conforms to one of Formulae 19(a)-(c) or a substituted or heterocyclic variation thereof.

The first aromatic group ($Ar^1$) is preferably a tetravalent six-membered ring (Formulae 17(a), (f) or (g)) and more preferably a tetravalent benzene ring (Formula 17(a)). The divalent organic moiety is preferably a second aromatic group ($Ar^2$), is more preferably 1,4 -phenylene or 4,4'-biphenylene (Formulae 19(a) or (b)) and is most preferably 1,4-phenylene (Formula 19(a)).

Linear PBZ mer units most preferably conform with one of Formulae 21(a)-(d).

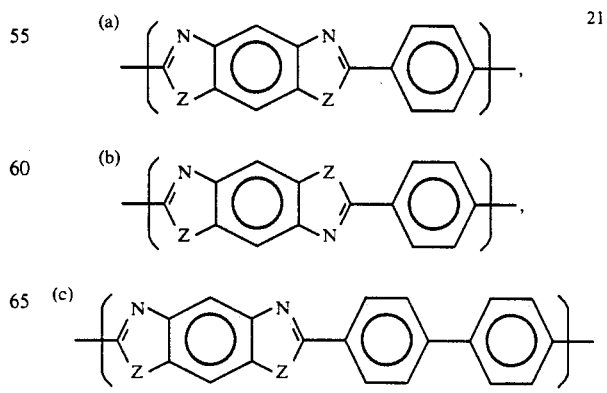

and (d) 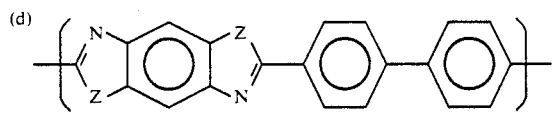

Examples of suitable non-linear PBZ mer units include those depicted in Formula 22(a)-(h) below, and substituted or heterocyclic variations thereof, and isomers of Formulae 22 (a) and (b) wherein positions of the nitrogen atom and Z moiety are reversed or isomers of 22 (c)-(g) wherein the nitrogen atoms and Z moieties are in trans position.

(a) 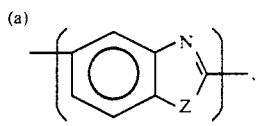

(b) 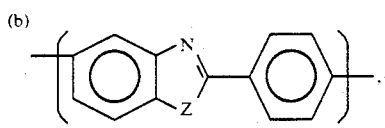

(c) 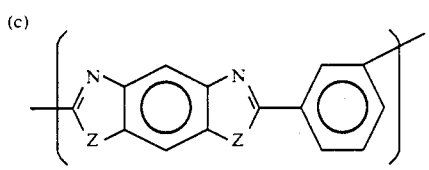

(d) 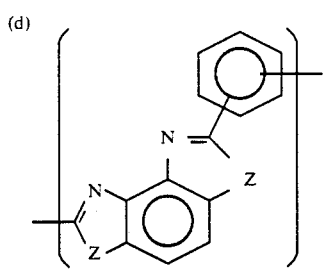

(e) 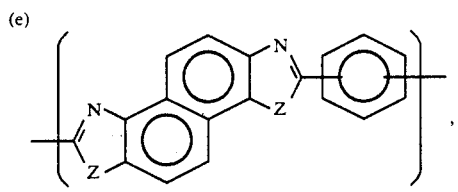

(f) 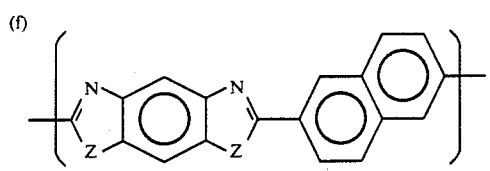

(g) 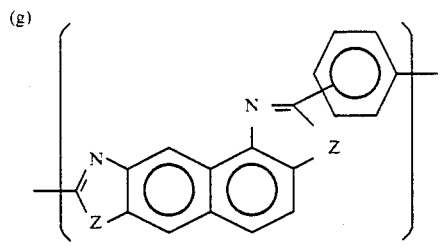

or (h) 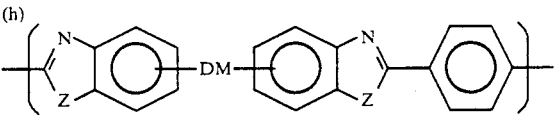

PBZ blocks used in connection with the present invention may contain obvious variations familiar to persons of ordinary skill in the art. For instance, mixtures of BB- and/or AB-monomers may be polymerized to form random PBO, PBT and/or PBI copolymers. Some AB-monomer may be polymerized with a mixture of AA- and BB-monomer to form a random copolymer containing both AA/BB- and AB-PBZ mer units.

Functional Termination of PBZ Blocks

PBZ polymers used in the present invention also comprise reactive end groups linked to the PBZ block, which end groups can react to form a bond with a thermoplastic polymer or with a monomer which forms a thermoplastic polymer. Such reactive end groups are preferably either azole-forming moieties or acylation reactive groups. They are more preferably acylation reactive groups and most preferably acid groups.

PBZ blocks prepared by the standard syntheses previously described will inherently be terminated at each end by azole-forming moieties. Preferably, at least one azole-forming moiety is an o-amino-basic moiety: more preferably, both are o-amino-basic moieties. AA/BB-PBZ blocks terminated by o-amino-basic moieties can be synthesized in a manner familiar to persons skilled in the art by adding a slight excess of the BB-monomer. PBZ polymers terminated by o-amino-basic moieties are preferably synthesized by the process illustrated in Formula 23

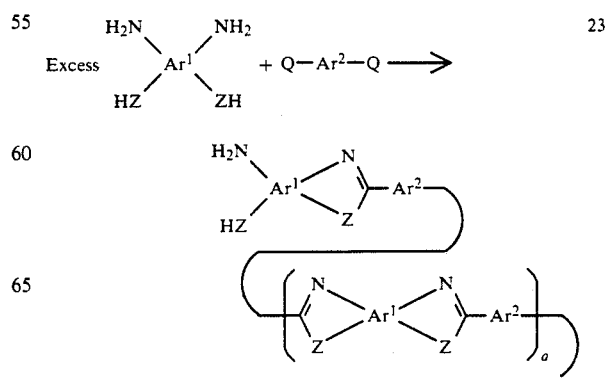

-continued

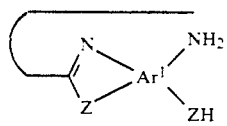

wherein a is a number of repeating units at least equal to about 10 on average and all other characters have the limits and preferred embodiments previously assigned.

Synthesis of PBZ blocks terminated by acylation reactive groups is more complex. A PBZ block terminated by o-amino-basic moieties can react with an AE- or AN-monomer or a PBZ block terminated by electron-deficient carbon groups can react with a BE- or BN-monomer to synthesize a PBZ polymer terminated by an acylation reactive group. However, azole rings deactivate acylation reactive groups with respect to acylation in solvent acid, unless the acylation reactive group is decoupled from the azole ring. Therefore, the terminating monomer which reacts with the PBZ polymer preferably comprises:

(1) an azole-forming moiety which can react with an azole-forming moiety on the rigid rod polymer;
(2) a decoupling group bonded to the azole-forming moiety of the terminating monomer; and
(3) an acylation reactive group bonded to the decoupling group.

The azole-forming moiety on the terminating monomer is preferably an electron-deficient carbon group, so that the terminating monomer is an AE- or AN-monomer. The acylation reactive group is preferably an acid group, so that the terminating monomer is an AE- or BE-monomer. The terminating monomer is most preferably an AE-monomer. The decoupling group has the definition and preferred embodiments previously given. Bonds throughout the terminating monomer are preferably in meta or para position and more preferably in para position. The terminating monomer may be, for example, p-phenoxybenzoic acid, 4-phenoxyphenoxybenzoic acid, 4,4'-oxy-bis(benzoic acid), 4,4'-bis(benzoic acid) or 4,4'-bis(benzoic acid) sulfide or an acid halide thereof The reaction takes place under the same conditions as those for synthesizing the PBZ block. The mole ratio of terminating monomer to PBZ block is preferably at least about 1:1 for both AB- and AA/BB-PBZ polymer, and is more preferably at least about 2:1 for AA/BB-PBZ polymer blocks.

The PBZ polymer terminated by an acylation reactive group preferably comprises:

(1) a block of repeating PBZ mer units as previously described;
(2) a decoupling group, as previously defined, bonded to the PBZ block; and
(3) an acylation reactive group, as previously defined, bonded to the decoupling group.

The PBZ polymer terminated by acylation reactive groups preferably comprises two decoupling groups linked to the PBZ block and two acylation reactive groups, one being bonded to each decoupling group. Each acylation reactive group is preferably an acid group as previously defined.

The PBZ polymer preferably complies with Formula 24(a)

24(a) AC—D—(PBZ)—D—AC  24(a)

wherein:
(PBZ) represents a PBZ block as previously defined;
each D is a decoupling group as previously described; and
each AC is an acylation reactive group as previously described.

More preferably, the PBZ polymer terminated by acylation reactive groups complies with Formula 24(b)

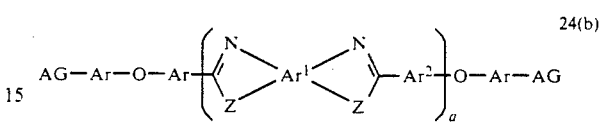

wherein AG is an acid group as previously defined and all other characters have the meanings and preferred embodiments previously given. Most preferably, the PBZ polymer terminated by acylation reactive groups complies with Formula 24(c)

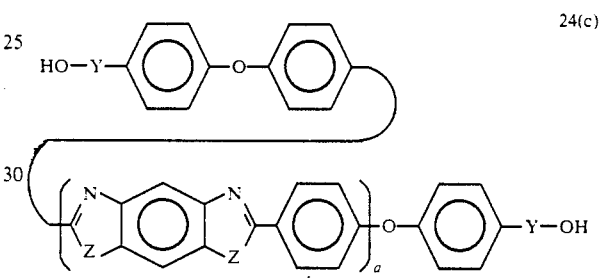

wherein Y is a sulfonyl or carbonyl group and all other characters have the meanings and preferred embodiments previously given, or the acid chloride thereof or the variation of the acid or acid chloride wherein the nitrogen atoms and the Z groups are in trans position.

Thermoplastic Polymers Useful in the Practice of the Present Invention

Block copolymers of the present invention also comprise a thermoplastic block containing polyamide, polyimide, polyquinoxaline, polyquinoline, poly(aromatic ketone or sulfone), or a thermoplastic copolymer containing structures which are characteristic of at least one of those polymers, which is substantially stable and inert in solvent acid up to at least about 50° C. The thermoplastic block has either a plurality of repeating mer units or a formula weight of at least about 800. For most polymers, a block with a formula weight of at least 800 also comprises at least a plurality of repeating units. However, a single repeating unit of some copolymers, such as polybenzazole/poly(aromatic ether ketone) copolymer, may have a formula weight greater than 800. The thermoplastic block preferably comprises on average at least about 10 repeating mer units and more preferably at least about 25 mer units. The thermoplastic block preferably comprises on average at most about 100 mer units and more preferably at most about 50 mer units.

Certain thermoplastic polymer and copolymer blocks may be synthesized in situ in a dope containing a solvent acid solution and a polybenzazole block terminated by an active end group. Other thermoplastic polymer and copolymer blocks must be synthesized in a separate reaction and added to a dope containing a solvent acid solution and a polybenzazole block terminated by an active end group. In either case, the thermoplastic polymer must be synthesized in such a way that it contains an active end group which is capable of reacting with the active end group on the polybenzazole block. Active end groups preferably comprise acylation reactive groups or azole-forming groups. This section will first describe thermoplastic blocks which are synthesized in a separate medium. This section will second examine thermoplastic blocks which can be synthesized in situ in a solvent acid solution.

The thermoplastic block or its monomers must be sufficiently soluble in a solvent acid to permit a reaction with a functionally-terminated PBZ block such as those previously described. Persons skilled in the art will recognize that solubility depends upon a number of factors, such as polymer structure, solvent and temperature. Polymers and copolymers which contain a protonatable amine moiety are ordinarily sufficiently soluble in polyphosphoric acid and/or methanesulfonic acid. Thermoplastic blocks containing amide moieties, benzazole moieties and/or aromatic ketone moieties are frequently sufficiently soluble. On the other hand, thermoplastic blocks containing imide and/or aromatic sulfone moieties and their monomers are frequently less soluble, and may require the presence of solubilizing moieties, such as an amide containing moiety.

Polymers Ordinarily Synthesized in Separate Media
Polyamides

Polyamides are a well-known class of thermoplastic polymers which are ordinarily stable in solvent acid. Polyamide polymers used in the present invention contain a plurality of units which comprise:
(1) a first divalent organic moiety ($A^1$) which is stable in solvent acid up to about 50° C.: and
(2) a first amide moiety having the carbonyl group bonded to the first divalent organic moiety.
Polyamide polymer units preferably further comprise:
(3) a second divalent organic moiety ($A^2$) bonded to the nitrogen of the first amide moiety; and
(4) a second amide moiety having the nitrogen bonded to the second divalent organic moiety.
Polyamides preferably comply with Formula 25(a) or 25(b) and more preferably with Formula 25(b):

25

(a) 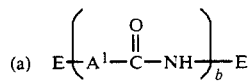

(b) 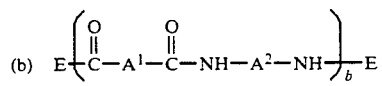

wherein $A^1$ and $A^2$ are independently divalent organic moieties as previously described, each E is an end group which comprises the remnant of a monomer or an active end group as previously described, and b is a number of units in excess of one which has the preferred embodiments set out previously for the number of units in the thermoplastic polymer.

The divalent organic moieties ($A^1$ and $A^2$) must be stable in solvent acid solutions up to at least about 50° C. Each may comprise aromatic groups. For example, the divalent organic moieties may be phenylene groups, pyridine groups, diphenyl ether groups or diphenyl methane groups. Aromatic groups used in the divalent organic moieties are most preferably p- or m-phenylene moieties. Preferably at least one of the divalent organic moieties is aliphatic. Aliphatic divalent organic moieties preferably comprise no more than about 12 carbon atoms and more preferably no more than about 6. Aliphatic divalent organic moieties are preferably saturated and more preferably alkyl. Most preferably, the first divalent organic moiety ($A^1$) is aromatic, and the second ($A^2$) is aliphatic.

At least one end group (E) must be an active end group as previously described. Preferably the polyamide comprises two active end groups. The active end groups more preferably comprise an acylation reactive group or an electron-deficient carbon group. They more preferably comprise an acylation reactive group, and most preferably comprise an aromatic group which serves as an acylation reactive group.

Polyamide copolymers, such as poly(amide-imides), comprise structures associated with a polyamide polymer and also moieties associated with at least one different class of polymers, such as an imide moiety, a quinoline moiety, a quinoxaline moiety, a ketone moiety, a sulfone moiety, an ether moiety or a benzazole moiety. The moiety associated with a different class of polymer may be part of the first and/or second divalent moiety. For instance, a divalent organic moiety ($A^1$ or $A^2$) may consist essentially of two aromatic groups linked by such a divalent imide, quinoxaline, ketone, sulfone, ether or benzazole moiety. The copolymer is preferably a poly(amide-imide) or a poly(amide-ether), in which at least some divalent organic moieties ($A^1$ or $A^2$) comprise an imide group or an ether group.

Polyamides and their copolymers are prepared by a number of processes familiar to persons of ordinary skill in the art, such as by the reaction of an amine-bearing monomer with a monomer bearing an acid group, or by the reaction of a carboxylic acid-bearing monomer and an isocyanate-bearing monomer, or by the reaction of formaldehyde with a dinitrile. Such syntheses are of Poly. Sci. and Eng., *Polyamides*, 319 et seq. (John Wiley & Sons 1988): 18 Kirk-Othmer Encyclopedia of Chem. Tech., *Polyamides*, 328, 350-53 (John Wiley & Sons 1982): and U.S. Pat. Nos. 4,017,459: 4,061,622: 4,061,623: 4,065,441: 4,072,665: 4,087,481: 4,094,564: 4,094,866: 4,098,775; 4,115,372; 4,129,715: 4,156,065; 4,420,602; 4,420,603: and 4,467,083, which are incorporated herein by reference. Benzazole-containing diamines useful for synthesizing PBZ/polyamide copolymers, and PBZ/polyimide copolymers, are disclosed in U.S. Pat. No. 4,087,409 and 5 J. Heterocyclic Chem 269 (1968).

Methods for preparing polyamide terminated by an active end group are obvious to one of ordinary skill in the art. Polyamide terminated by an acid group, which is also an electron-deficient carbon group, can be synthesized by processes involving the reaction of a carboxylic acid or acid halide using a slight excess of the acid or acid halide-containing monomer. If additional decoupling is needed for the acid group, the polyamide can be synthesized with a decoupled diacid, such as 4,4'-bis(benzoic acid), or can be synthesized with a slight excess of diamine monomer and then contacted with a stoichiometric amount of decoupled diacid under reaction conditions. Polyamide terminated by an active aromatic group can be synthesized by incorporating an appropriate terminator, such as p-phenoxyaniline or p-phenoxyphenoxybenzoyl chloride, into the reaction mixture.

Polyimides

Polyimides are a known class of polymers familiar to persons of ordinary skill in the art. Polyimide mer units preferably comprise:
(1) a first aromatic group ($Ar^3$), and
(2) a first imide ring fused with the first aromatic group.

They more preferably further comprise:
(3) a second imide ring fused to the first aromatic group, and
(4) a divalent organic moiety ($A^3$) linked by a single bond to the nitrogen of the second imide ring.

For example, polyimides may be represented by Formula 26:

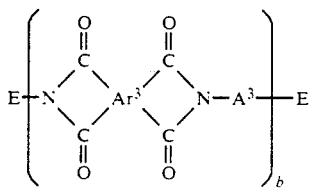

26 wherein $Ar^3$ is a first aromatic group, $A^3$ is a divalent organic moiety, b is a number of repeating units, and each E independently comprises the remnant of a monomer or an active end group as previously defined. The divalent organic moiety ($A^3$) must be stable up to at least about 50° C. in solvent acid. It may be aromatic or aliphatic. If the divalent organic moiety is aromatic, it has the description and preferred embodiments previously given for aromatic groups. If it is aliphatic, then it is preferably saturated and more preferably alkyl, and it preferably comprises no more than about 12 carbon atoms, more preferably no more than about 6 carbon atoms. Reactive end groups in polyimides are more preferably acylation reactive groups or electron-deficient carbon groups and are most preferably electron-deficient carbon groups.

Polyimides as a group often have poor solubility in many solvents, including solvent acids. This may be attributable at least in part to cross-linking of amic acid which may occur during synthesis of the polyimide, so that care to minimize the cross-linking should be exercised during synthesis of imide-containing polymers. It is frequently preferable to use a copolymer containing both imide moieties and moieties which enhance the solubility of the imide that are associated with another type of polymer.

Suitable solubilizing moieties in the polyimide copolymer may include an amide moiety, a quinoline moiety, a quinoxaline moiety, a ketone moiety, an ether moiety, a benzazole moiety, an oxadiazole moiety and-/or a hexafluoroisopropylidene moiety. The copolymer is preferably a poly(amide-imide) or a poly(ether-imide). The solubilizing moiety may be incorporated into the first aromatic group ($Ar^3$) or the divalent organic moiety ($A^3$): for instance, one of those moieties may be a diphenylene ether or diphenylene amide moiety. Alternatively, the solubilizing moiety may serve to link a first aromatic group and a divalent organic moiety, as illustrated in Formula 27 for poly(amide-imides):

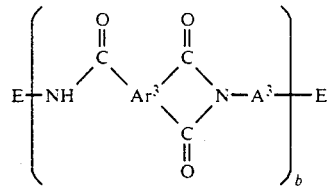

27 wherein all characters have the meaning previously defined

Polyimides and their copolymers can be synthesized by several methods familiar to persons of ordinary skill in the art, such as by the reaction of a di(acid anhydride) monomer with either a diamine monomer or a diisocyanate monomer. Possible syntheses are described in Kirk-Othmer Encyclopedia of Chemical Technology, Polyimides. 704 et seq. (John Wiley & Sons 1982); and U.S. Pat. Nos. 4,061,622; 4,156,065; 4,017,459; 4,061,623; 4,098,775; 4,115,372; 4,467,083; 4,837,299; and 4,837,300, which are incorporated herein by reference. They are preferably synthesized by the reaction of a di(acid anhydride) monomer and a diamine monomer. Monomers appropriate to make copolymers can be synthesized by known techniques, such as obvious variations on the polymerization reactions described herein.

Polyimide terminated by an active end group can be synthesized by methods obvious to a person of ordinary skill in the art. Polyimide terminated by an acid anhydride moiety can be converted to polyimide terminated by an acid group suitable to serve as an electron deficient carbon group either by hydrolyzing the anhydride or by contacting it with an amino acid such as p-aminobenzoic acid under reaction conditions. Polyimide terminated by an active aromatic group is synthesized by contacting anhydride-terminated polyimide with a monomer comprising an amine group and two decoupled aromatic groups, such as phenoxyaniline.

Polyquinoxalines

Polyquinoxalines are a known class of thermoplastic polymers which are stable in solvent acid. Polyquinoxalines preferably contain a plurality of units, each of which comprises:
(1) a first quinoxaline moiety;
(2) a second quinoxaline moiety;
(3) a bond or a divalent organic moiety linking the carboxylic rings of the first and second quinoxaline moiety; and
(4) an aromatic group (Ar5) bonded to the nitrogen-containing ring of the second quinoxaline moiety.

Polyquinoxalines more preferably further comprise an aromatic group bonded ortho to one nitrogen atom in each quinoxaline moiety.

Polyquinoxalines preferably comply with the formula in Formula 28:

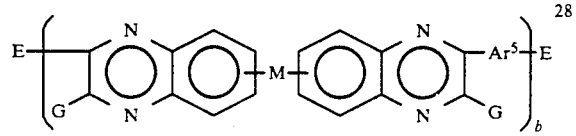

28 wherein each G is either a hydrogen atom or an aromatic group, $Ar^5$ is an aromatic group, each E independently comprises an active end group as previously described or the remnant of a monomer, b is a number of repeating units greater than 1 and having the preferred embodiments previously described and M is a bond or a divalent organic moiety such as oxygen, sulfur, 1,1,1,3,3,3-hexafluoroisopropylene or methylene. Preferably, there is no divalent organic moiety and M is a bond. If there is a divalent organic moiety (M), it is preferably an aromatic group. The aromatic group $Ar^5$ is preferably a diphenoxybenzene moiety. Preferably, each G is an aromatic group.

Polyquinoxalines are prepared by known and well reported reactions, such as the reaction of an aromatic bis-(o-diamine) monomer with an aromatic bisglyoxal hydrate or a bis(phenyl-α-diketone) in a solvent such as m-cresol. Such reactions and useful polymers made thereby are described in 7 Encyclopedia of Poly. Sci. & Eng., *Heat-Resistant Polymers,* 652-654 (John Wiley & Sons 1987), which is incorporated herein by reference.

Active end groups (E) preferably comprise o-diamine moieties, which can serve as o-amino-basic groups. Polyquinoxalines terminated by o-diamine moieties can be synthesized by the reactions described previously using a slight excess of aromatic bis-(o-diamine) monomer. Polyquinolines terminated by reactive aromatic groups can be synthesized by adding to the polymerization mixture a functional terminator such as a 1,2-diamino-4 -phenoxybenzene (A BN-monomer) or a terminator illustrated in Formula 29:

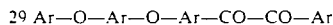

29  Ar—O—Ar—O—Ar—CO—CO—Ar

Polyquinoxalines terminated by an electron-deficient carbon group, an acid group, or an aromatic group can also be synthesized by contacting the polyquinoxaline terminated by o-diamine moieties under PBZ polymerizing conditions with a stoichiometric amount of AA-, AE- or AN-monomer, such as terephthalic acid, 4,4'-oxy-bis(benzoic acid), or p-(4-phenoxyphenoxy)-benzoic acid.

Polyquinolines

Polyquinolines are a known class of solvent-acid-stable polymers containing repeating units which comprise quinoline moieties Each polyquinoline mer unit preferably comprises:

(1) a first quinoline moiety;
(2) a first aromatic group (Ar6) bonded to the first quinoline moiety in a position para to the quinoline nitrogen atom;
(3) a second quinoline moiety bonded to the first aromatic group (Ar6), said bond being in a position para to the quinoline nitrogen atom: and
(4) a second aromatic group (Ar7) bonded to the second quinoline moiety in a position ortho to the quinoline nitrogen.

Mer units are preferably joined by a bond from the second aromatic group of one mer unit to the first quinoline moiety of an adjacent mer unit, said bond being to the ortho position with respect to the quinoline nitrogen. The first and second aromatic groups each preferably independently comprise a diphenylene ether moiety.

Polyquinolines preferably comply with Formula 30:

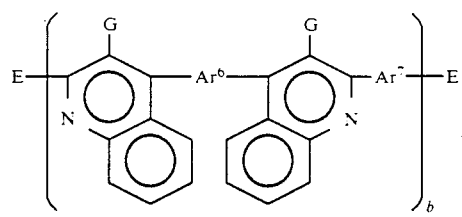

wherein G' is either a hydrogen atom or an aromatic group, each E independently comprises the remnant of a monomer or an active end group, $Ar^6$ is a first aromatic moiety as previously described, $Ar^7$ is a second aromatic moiety as previously described, and b is a number of repeating units greater than 1 having the preferred embodiments set out previously.

Polyquinolines are synthesized by known reactions such as the reaction of a di(phenyl acetyl) monomer and a bis(o-aminoketone) monomer in a mixture of m-cresol and polyphosphoric acid or phosphorus pentoxide. Such reactions and useful polyquinolines produced by them are described in 7 Encyclopedia of Poly. Sci. & Eng., *Heat-Resistant Polymers,* 654-655 (John Wiley & Sons, 1987) and Wolfe et al., "The Synthesis and Solution Properties of Aromatic Polymers Containing 2,4-Quinoline Units in the Main Chain", J. Macromolecules 489 (1976), which is incorporated herein by reference.

Active end groups on the polyquinoline preferably comprise a carboxylic acid halide moiety or an aromatic moiety which serves as an acylation reactive group. Polyquinolines terminated by an aromatic amine moiety can be synthesized by ordinary processes using a slight excess of bis-(o-aminoketone) monomer. The amine-terminated polyquinoline can be contacted with a diacid chloride monomer as described for forming polyamide under conditions appropriate to form an amide linkage, thereby forming an acid chloride-terminated polymer. Other end groups can be attached to the acid chloride-terminated polymer as previously described. Furthermore, the polyquinoline terminated by an aromatic group which serves as an acylation reactive group can be synthesized by adding an appropriate terminator, such as 4-(2-aminobenzoyl)phenyl phenyl ether or 4-(2-aminobenzoyl)phenoxy-1-phenoxy-benzene.

Poly(aromatic ketones) and poly(aromatic sulfones) and poly(aromatic ethers)

Poly(aromatic ketones), poly(aromatic sulfones) and poly(aromatic ethers) are well-known classes of related thermoplastic polymers familiar to persons of ordinary skill in the art. The polymers contain a plurality of aromatic ketone and/or sulfone moieties, which are preferably linked by decoupling groups. In poly(aromatic ethers), at least some of the decoupling groups comprise ether moieties and preferably about all of the decoupling groups comprise ether moieties.

The poly(aromatic ketones) and poly(aromatic sulfones) contain a plurality of mer units which preferably comprise:

(1) a first plurality of aromatic groups;
(2) a number of decoupling groups sufficient to link the first plurality of aromatic groups: and
(3) a first carbonyl or sulfonyl group bonded to one of the aromatic groups, and more preferably further comprise:

(4) a divalent organic moiety (T) bonded to the first carbonyl or sulfonyl group; and (5) a second carbonyl or sulfonyl group bonded to the divalent organic moiety.

Individual mer units are linked by bonds from a carbonyl or sulfonyl group of one mer unit to an aromatic group in an adjacent mer unit.

Each divalent organic moiety (T) must be stable in solvent acid, preferably up to at least about 50° C., more preferably up to at least about 100° C. and most preferably up to at least about 200° C. Each divalent organic moiety (T) independently preferably comprises an aromatic group and more preferably consists essentially of an aromatic group or a plurality of aromatic groups linked by sulfur or oxygen atoms.

The first plurality of aromatic groups linked by decoupling groups preferably comprises 3 aromatic groups. The maximum number is not critical and is limited only by the ability to construct and react corresponding monomers. The first plurality of aromatic groups conveniently comprises no more than about 4 aromatic groups.

Poly(aromatic ketones) and poly(aromatic sulfones) preferably comply with one of Formulae 31(a) or E-(Ar-D-Ar-Y)b-E    31(a)

E-(Ar-D-Ar-Y-T-Y)b-E    31(b)

wherein each E independently comprises the remnant of a monomer or an active end group moiety as previously described.

each D independently is a decoupling group as previously defined.

each Ar is independently an aromatic group as previously defined, each Y is independently a sulfonyl or carbonyl group as previously defined.

T is a divalent organic moiety as previously defined, and b is a number of repeating mer units greater than 1 and having the preferred embodiments set out previously.

Poly(aromatic ketones or sulfones) are more preferably represented by one of Formulae 31(c) or (d):

E-((Ar-J)n-Ar-Y)b-E    31(c)

E-((Ar-J)n-Ar-Y-T-Y)b-E    31(d)

wherein n is a number of repeating units equal to 1 or more and each J is individually an oxygen atom, a sulfur atom or a bond chosen such that at least one J is an oxygen or a sulfur atom. Each J is more preferably an oxygen atom or a bond chosen such that at least one J is an oxygen atom. n Is more preferably at least 2.

Poly(aromatic ketones), poly(aromatic sulfones) and poly(aromatic ethers) are commercially available. They can also be synthesized by numerous processes familiar to persons of ordinary skill in the art. Examples of those processes are described in 18 Kirk-Othmer Encyclopedia of Chemical Technology, *Polyethers,* 605–610 (1982); Mullins et al., "The Synthesis and Properties of Poly(aromatic Ketones)," 27 JMS-Rev. Macromol. Chem. Phys. 313–335 (1987), and U.S. Pat. Nos. 4,794,155; 4,654,410; 4,711,945; 3,886,121; 4,232,142; 4,239,884; 4,550,140; 4,716,211; 3,264,536; 4,065,437; 4,474,932; 4,229,564; 4,704,448; 3,953,400 and 3,065,205, which are incorporated herein by reference. For example, poly(aromatic ketone) and poly(aromatic sulfone) can be synthesized by the condensation of an EN-monomer and/or an EE- and an NN-monomer, as those monomers are previously described in the presence of a Friedel-Crafts acylation catalyst such as aluminum chloride.

The present invention can also employ thermoplastic copolymers of poly(aromatic ketones), poly(aromatic sulfones) and poly(aromatic ethers) comprising aromatic ketone or sulfone moieties, ether or other decoupling moieties, and divalent moieties which are ordinarily associated with other polymers that are stable in solvent acid up to at least about 50° C. Suitable divalent moieties which might be incorporated into copolymers include amide moieties, imide moieties, quinoxaline moieties, quinoline moieties and benzazole moieties. They are more preferably amide, imide or benzazole moieties. Such divalent moieties may be part of the divalent organic moiety (T). Alternatively, the divalent moiety may link two or more aromatic groups in the plurality of aromatic groups. The two aromatic groups are preferably linked to the divalent moiety by decoupling groups.

Copolymers of poly(aromatic ketones), poly(aromatic sulfones) and poly(aromatic ethers) can be synthesized in the same manner as previously described for synthesizing poly(aromatic ether), etc. by simply incorporating an appropriate divalent moiety into at least some EE-, NN- and/or EN-monomers. For instance, the EE-monomer may comprise two aromatic groups linked by an amide or a benzazole moiety. Alternatively, an NN-monomer may comprise aromatic groups linked by a structure which comprises at least one benzazole or amide moiety. Suitable monomers, copolymers, and their synthesis are described in Raychem Corp., *Aromatic Polyether Ketones Having Imide, Amide, Ester, Azo, Quinoxaline, Benzimidazole, Benzoxazole or Benzothiazole Groups and a Method of Preparation,* International (PCT) application WO86/02368 (published Apr. 24, 1986), which is incorporated herein by reference. Other suitable monomers may include the sulfone variations of monomers described in the Raychem Application.

Poly(aromatic ketone), poly(aromatic sulfone) poly(aromatic ether) and copolymer blocks used in the present invention are preferably terminated by active end groups comprising an acid group, an aromatic group which functions as an acylation reactive group, or an electron-deficient carbon group. Poly(aromatic ether) etc., terminated by an acid group can be synthesized by using excess EE-monomer, and that terminated by an aromatic group can be synthesized by using excess NN-monomer. Preferably, monomer is chosen such that the acid group or aromatic moiety which terminates the polymer is linked to the polymer chain by a decoupling group.

Monomers Polymerizable in Solvent Acid

Certain monomers can polymerize in a solvent acid solution to form thermoplastic polymer or copolymer and simultaneously link with active end groups on polybenzazole polymers. These thermoplastic polymers may also be useful as thermoplastic blocks in block copolymers of the present invention. Preferred thermoplastic polymers which can be synthesized in solvent acid include poly(aromatic ketone), poly(aromatic sulfone) and poly(aromatic ether) polymers and copolymers of those polymers containing amide, imide, quinoxaline, quinoline and/or polybenzazole moieties. The most preferred thermoplastic block is polybenzazole/-poly(aromatic ether) copolymer.

The synthesis of poly(aromatic ethers) in solvent acid is described in Ueda et al., "Synthesis of Polyketones by Direct Polycondensation of Dicarboxylic Acids with Diaryl Compounds using Phosphorus Pentoxide/Methanesulfonic Acid as Condensing Agent and Solvent," 5 Makromol. Chem., Rapid Commun. 833–36 (1985) and Ueda et al., "Synthesis of Poly(phenylene ether sulfone) by direct self-polycondensation of Sodium 4-Phenoxybenzene sulfonate using Phosphorus Pentoxide/Methanesulfonic Acid as Condensing Agent and Solvent," 6 Makromol. Chem., Rapid Commun. 271–74 (1985), which are incorporated herein by reference.

The monomers are EE-, EN- and NN-monomers which have the broad limits previously described. However, solvent acids are not ordinarily as effective catalysts as are Lewis acids for Friedel-Crafts-type polymerization Therefore, monomers for polymerization in solvent acid preferably have more extensive decoupling, in the form of a decoupling group, linking the acylation reactive groups within the monomer. The importance of decoupling and several appropriate decoupled monomers are discussed in Colquhoun, "Synthesis of Polyetherketones in Trifluoromethanesulfonic Acid," 25(2) Polymer Preprints 17–18 & Table 2 (1984) and Colquhoun et al., "Synthesis of Aromatic Polyetherketones in Trifluoromethanesulfonic Acid," 29 Polymer 1902 (1988), which are incorporated by reference.

In EE-monomers used for solvent acid catalyzed condensations, for instance, the divalent organic moiety (T) preferably comprises a decoupling group containing 2 aromatic groups. The two aromatic groups in the decoupling group are more preferably linked by an oxygen atom. The divalent organic moiety (T) may alternatively comprise an aliphatic group which functions to decouple the acid groups, but it preferably does not. EE-monomers may be, for example, 4,4'-bis(benzoic acid), 4,4'-oxy-bis(benzoic acid), p-bis(4-oxybenzoic acid)benzene or the acid chloride of those acids. Terephthaloyl chloride and terephthalic acid ordinarily form only low-molecular weight polymer in solvent acid.

EE-monomers preferably conform to Formula 31:

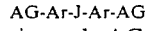

wherein each AG is independently an acid group as previously defined, each Ar is independently an aromatic group as previously defined, and J is either a bond, an oxygen atom or a sulfur atom. J is more preferably an oxygen atom or a bond and most preferably an oxygen atom.

Although NN-monomers consisting of 2 phenyl rings linked by an oxygen atom are known to react in solvent acid under some conditions to form low molecular weight polymer, NN-monomers used in solvent-acid-catalyzed condensations ordinarily require additional decoupling. NN-monomers preferably comprise three aromatic groups, at least two of which are linked by a moiety such as an oxygen atom or sulfur atom. The NN-monomer more preferably comprises three aromatic groups, at least two of which are linked by oxygen atoms, and most preferably comprises three aromatic rings linked by two oxygen atoms. The monomer may be, for example, p-phenoxybiphenyl, p-diphenoxybenzene or 4,4'-diphenoxybiphenyl.

EN-monomers used in solvent-acid-catalyzed synthesis of poly(aromatic ethers) and related polymers likewise preferably comprise a decoupling group, having two aromatic groups and two ether linkages, which links the active aromatic group to the acid group. For instance, the EN-monomer may be, p-(4-phenoxyphenyl) benzoic acid, p-(4-phenoxyphenoxy)benzoic acid or their acid chlorides.

Copolymers of the solvent-acid-synthesized poly(aromatic ethers) etc., can be synthesized by utilizing an EE-, NN- and/or EN-monomer which contains divalent amide, imide, quinoxaline, quinoline or benzazole moieties, as previously described. Because amide, imide and benzazole moieties tend to deactivate aromatic groups, and to a lesser extent acid groups, those divalent moieties are preferably linked to the acylation reactive groups by decoupling groups. For instance, a polyamide-poly(aromatic ether) copolymer can be synthesized using an NN-monomer which results from the reaction of p-phenoxyphenoxybenzoyl chloride with an aliphatic diamine. The aliphatic diamine is preferably alkyl and preferably comprises no more than about 12 carbon atoms, more preferably no more than about 6 carbon atoms.

The polymerization in solvent acid is carried out under any conditions at which the aromatic electrophilic substitution occurs and the reagents and products are stable. The temperature is preferably at least about 20° C., more preferably at least about 40° C. and most preferably at least about 45° C. The temperature is preferably at most about 150° C., more preferably at most about 70° C. and most preferably at most about 55° C. Pressure is not critical, and is conveniently atmospheric pressure. The reaction is highly preferably carried out under inert atmosphere, for example under nitrogen, helium or argon. The solvent acid is highly preferably a dehydrating solvent acid and most preferably a mixture of methanesulfonic acid and phosphorus pentoxide, although certain non-dehydrating acids such as trifluoromethanesulfonic acid may also be effective to a greater or lesser extent.

Polybenzazole/Poly(Aromatic Ketone or Sulfone) Random or Sequential Copolymers Useful as Thermoplastic Blocks Copolymers containing benzazole moieties and aromatic ketone and/or aromatic sulfone moieties merit special attention both because they are the most preferred thermoplastic polymers for use in the present invention and because they may be conveniently synthesized with a tremendous number of variations from simple monomers in a mineral acid via a one-pot reaction, preferably in the presence of functionally terminated PBZ blocks, such that they establish linkages with those blocks in the same reaction.

One reaction is an aromatic electrophilic substitution, in which acid groups in the monomers react with aromatic groups in the monomers to form aromatic ketone or sulfone moieties linking the monomers. Conditions for the reaction and appropriate references detailing those conditions are set out in describing the synthesis of poly(aromatic ketone or sulfone) in a solvent acid. Azole rings in the monomers tend to deactivate acylation reactive groups with respect to aromatic electrophilic substitution in solvent acid. Therefore, acylation reactive groups in the monomers are preferably linked to azole rings and to azole-forming moieties by decoupling groups.

In the other reaction, o-amino-basic moieties and electron-deficient carbon groups on the monomers react to form azole rings linking the monomers. Reaction conditions for carrying out such azole ring formation in non-oxidizing dehydrating solvent acid are described in U.S. Pat. Nos. 4,772,678; 4,703,103; 4,533,692; 4,533,724; 4,533,693; 4,359,567; 4,578,432 and 4,847,350, which are incorporated herein by reference. The reaction may be carried out under any conditions at which azole rings are formed and the reagents and products are stable. The reaction temperatures are preferably moderate. The reaction temperature is preferably at least about 20° C., more preferably at least about 45° C., more highly preferably at least about 70° C. and most preferably at least about 90° C. Although the reaction may occur as high as 220° C. or more, it is preferably no more than about 150° C., more preferably no more than about 120° C., and most preferably no more than about 100° C. It is often preferable to commence the reaction at a relatively low temperature and increase the temperature as the reaction proceeds. The reaction is highly preferably carried out under vacuum or a non-oxidizing atmosphere, such as nitrogen, helium or argon. If the reaction is carried out under a non-oxidizing atmosphere, the pressure is not critical, but is conveniently about atmospheric pressure or less.

The two reactions may be carried out simultaneously or in either order sequentially, depending upon the monomers chosen and the order in which they are contacted. The reaction to form azole rings is preferably carried out first, and the reaction to form aromatic ketone or sulfone moieties is preferably carried out second, because azole rings are most easily formed at temperatures which may be too high for the aromatic ketone or sulfone moieties and because o-amino-basic moieties may undergo undesirable side reactions with aromatic ketone moieties.

At least two primary monomers are used in the process, and each primary monomer contains at least two functional moieties chosen from the group consisting of azole-forming moieties and acylation reactive groups. At least two of the primary monomers must contain azole-forming moieties which can react to form an azole ring. At least two of the primary monomers must contain acylation reactive groups which can react to form an aromatic ketone or sulfone moiety. At least one of the primary monomers must contain a first functional moiety which can react as an azole-forming moiety and a second functional moiety which can react as an acylation reactive group. All three criteria can be met using as few as two primary monomers since a single primary monomer can contain one of the azole-forming groups called for by the first criterion and one of the acylation reactive groups called for by the second criterion and can thereby fulfill the third criterion.

Suitable primary monomers are preferably chosen from AA-, BB-, AB-, EE-, NN-, EN- AE- AN-, BE- and BN-monomers. At least one primary monomer must be an AE-, AN-, BE- or BN-monomer. When a one-step polymerization is used, then the reaction essentially proceeds directly from the primary monomers to the resulting copolymer. When a two-step polymerization is used, then a plurality of primary monomers are reacted to form one or more intermediate monomers, which are condensed to form a copolymer by addition of an additional monomer.

The previously described primary monomers are copolymerized under the conditions previously described by condensing azole-forming moieties to form azole rings linking the monomers and by condensing acylation reactive groups to form aromatic ketone or sulfone moieties linking the monomers. The reaction takes place in a non-oxidizing and dehydrating solvent acid which is preferably polyphosphoric acid or a mixture of methanesulfonic acid and phosphorus pentoxide and/or polyphosphoric acid. The acid is more preferably a mixture of methanesulfonic acid and phosphorus pentoxide and/or polyphosphoric acid.

The monomers are chosen such that they form a copolymer containing both azole rings and aromatic ketone and/or sulfone moieties. At least some monomers must be AE-, AN-, BE- or BN-monomers. The monomers preferably contain about equimolar quantities of o-amino-basic moieties and electron-deficient carbon groups and about equimolar quantities of acid groups and reactive aromatic groups. The decoupling groups and/or divalent organic moieties of the monomers may contain units ordinarily associated with other polymers, such as amide, imide or other moieties which are stable in the acid and do not interfere with the condensation of the monomers.

Copolymerizations may optionally be carried out using only two monomers. Suitable two monomer reactions comprise the reaction of AN-monomer and BE-monomer or the reaction of AE-monomer and BN-monomer. The two monomer reactions preferably conform to one of Formula 33(a)-(b):

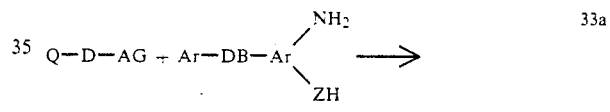

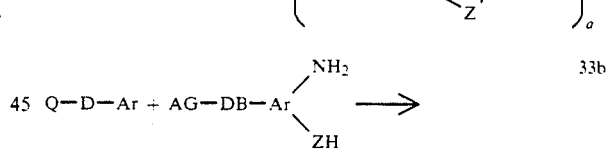

and more preferably conform to one of Formula 33(c)-(d):

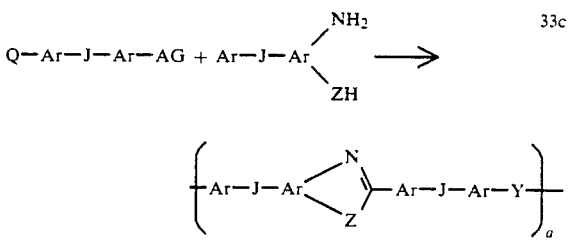

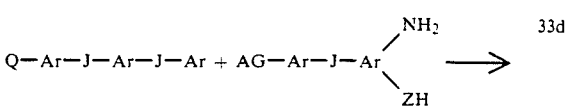

-continued

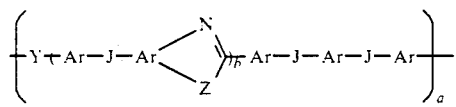

wherein each Y is individually a carbonyl moiety or a sulfonyl moiety, each a is a number of repeating units in excess of 1, each b is a number of units averaging more than 0 and less than 10, and all other characters have the meaning and preferred embodiments previously given. The variation in b from unit to unit exemplifies the point made previously that carboxylic acid and its acid halides can act as electron-deficient carbon groups or acid groups, causing some random placement of moieties within the structure of the copolymer. Both monomers in Formulae 33(b) and 33(d) can self-polymerize if Q and AG are carboxylic acid or an acid halide. Therefore, the copolymer may have several benzazole moieties in a row without intervening aromatic ketone moieties, or several aromatic ketone or sulfone moieties without intervening benzazole moieties.

The reactions of AN- and BE-monomers or AE- and BN-monomers are usually one-step reactions in which azole ring formation and aromatic electrophilic substitution proceed essentially simultaneously. Such copolymerization is not ordinarily as effective as sequential copolymerization for making high molecular weight copolymer. The reaction temperature is preferably near the high end of what is preferred for aromatic electrophilic substitution and near the low end of what is preferred for azole ring formation.

The copolymerization can also be carried out using three or more monomers. The copolymerizations may be carried out by simultaneously forming azole rings and aromatic ketone or sulfone moieties form the copolymer. The azole rings and aromatic ketone or sulfone moieties are preferably formed sequentially by first reacting at least two monomers to form dimers or oligomers containing one of those moieties but not both, and second adding at least one more monomer which links those dimers or oligomers by reacting to form the other moiety.

The copolymerization preferably uses three different types of primary monomer. Examples include the copolymerization of AE-, BE- and NN-monomers as in Formula 34(a):

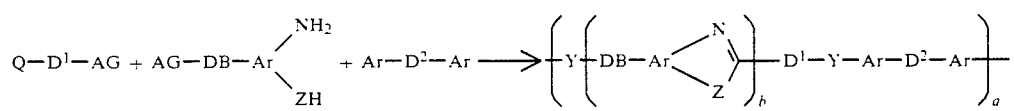

34a the copolymerization of AE-, BB-, and NN-monomers as in Formula 34(b):

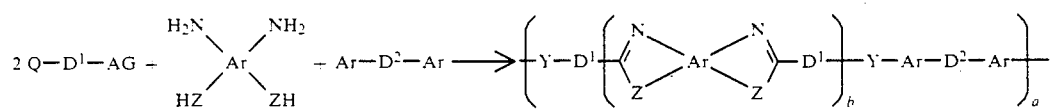

34b the copolymerization of AN-, BN- and EE-monomers as illustrated in Formula 34(c):

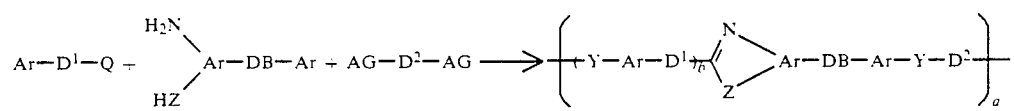

34c the copolymerization of AN-, BB- and EE-monomers as illustrated in Formula 34(d):

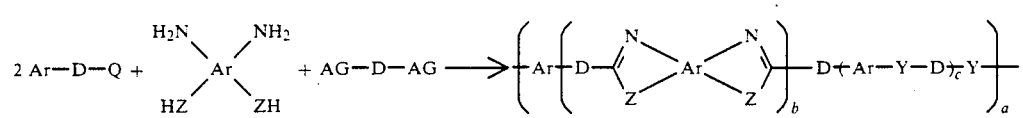

34d the copolymerization of AA-, BN- and BE-monomers, as illustrated in Formula 34(e):

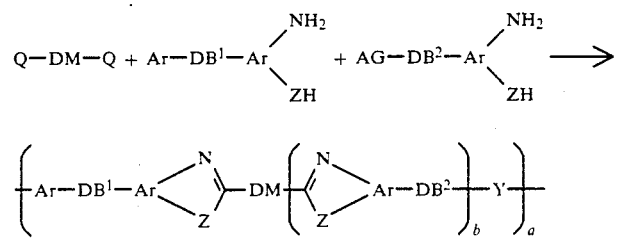

34e the copolymerization of AA-, BN- and EE-monomers as illustrated in Formula 34(f):

34f

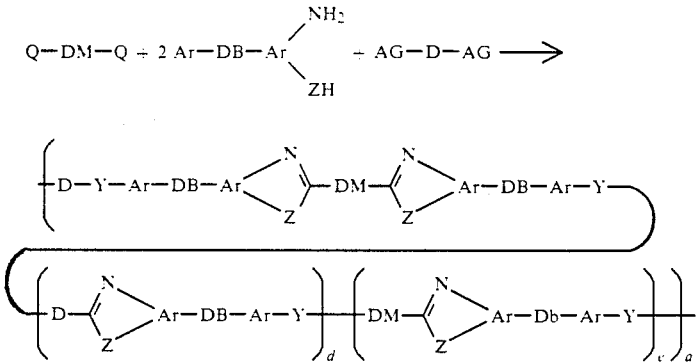

the copolymerization of AA-, BE- and NN-monomers as illustrated in Formula 34(g):

34g

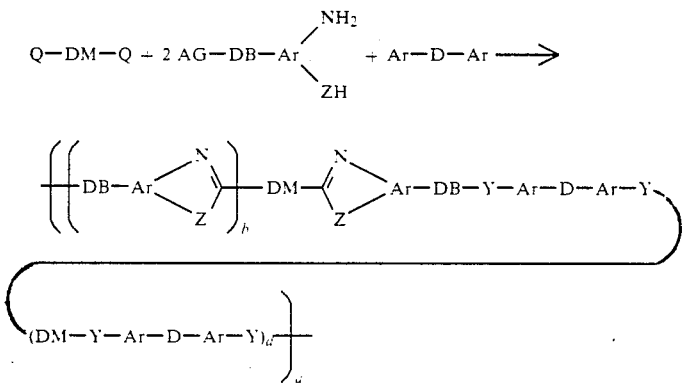

and the copolymerization of AE-, AN- and BB-monomers as illustrated in Formula 34(h):

34h

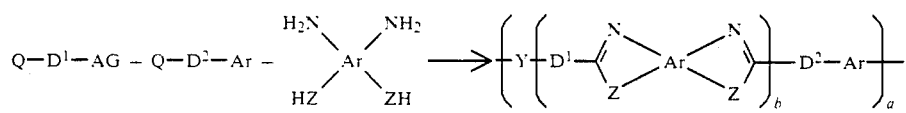

wherein each b and c is independently a number of repeating units averaging greater than 0 and less than 10, each d and e is independently a number of repeating units averaging from 0 to 10 and all other characters have the meaning and preferred embodiments previously given.

Each of the copolymer structures shown previously may have a great degree of randomness when the acid groups and/or electron-deficient carbon groups in the monomers are carboxylic acids or acid halides. The most common variations in structure are represented by varying b, c, d and e. b And o preferably average more than 0.1 and more preferably more than 0.5. b And c preferably average less than 5, more preferably less than 3. b And c most preferably average about 1. d And e preferably independently average at most about 5, more preferably at most about 0.5 and more highly preferably at most about 0.1. d And e most preferably average about 0. Persons of ordinary skill may recognize other random variations in structure which may occur that are not specifically reflected in the Formulae shown previously.

The copolymerization preferably utilizes reactions of AE-, BE- and NN-monomers as illustrated in Formula 34(a); AN-, BN- and EE-monomers as illustrated in Formula 34(c); or AN-, BB- and EE-monomers as illustrated in Formula 34(d). Preferred reactions more preferably conform to one of Formulae 35(a)–(d)

35a AE-, BE- and NN-

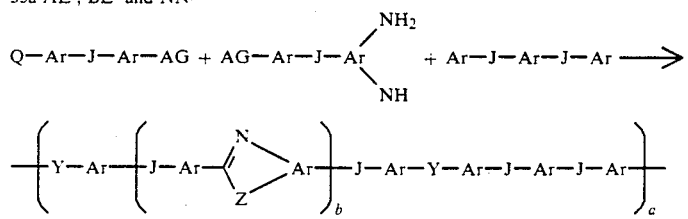

35b Ae-, BB- and NN-

-continued

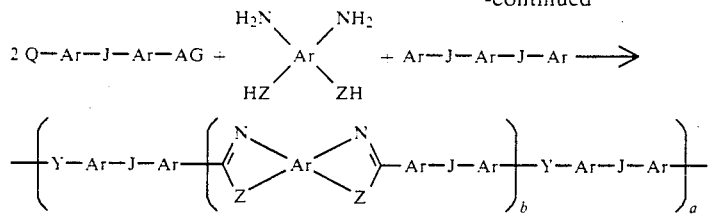

35c AN-, BN- and EE-

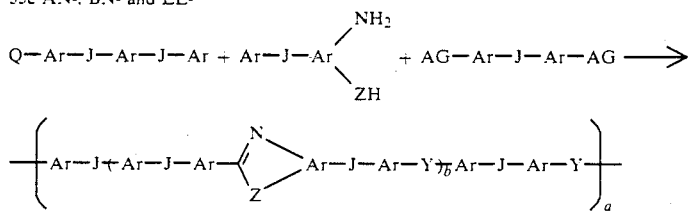

35d, AN-, BB- and EE-

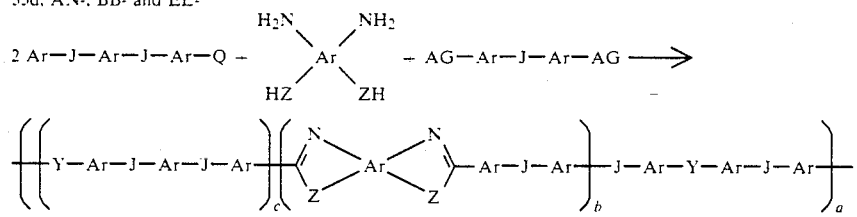

The most preferred copolymerization is that of AE-, Bb- and NN-monomers. It most preferably conforms to Formula 36:

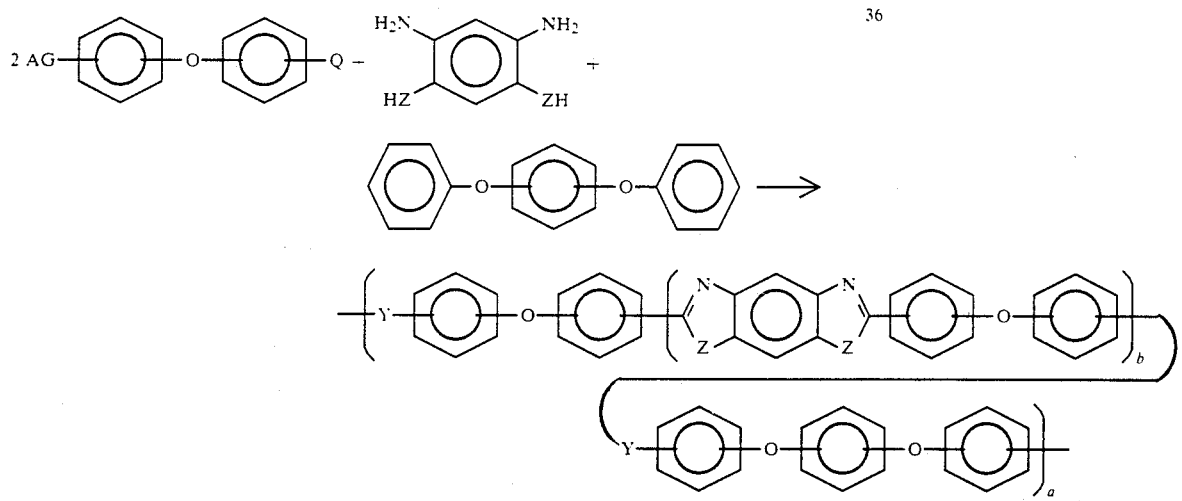

36 wherein b is a number of repeating units averaging less than 10 and greater than 0, each Q is a carboxylic acid or acid halide, and each AG is a carboxylic acid, sulfonic acid or acid halide, and all other characters have the meaning previously given. Bonds to aromatic groups are preferably in meta or para position, and more preferably in para position, with respect to each other. Acid groups are most preferably carboxylic acid or acid halide, and Y is most preferably a carbonyl group.

The previously described reactions of primary comonomers may be varied in ways obvious to persons of ordinary skill in the art to provide copolymers containing obvious variations. For instance, the azole ring content of the resulting copolymer may be increased by adding AB-monomer or AA- and/or BB-monomer. The poly(aromatic ketone or sulfone) content of the resulting copolymer may be increased by adding EN-monomer or EE and/or NN-monomer. The additional monomers preferably make up no more than 50 percent by weight of the monomer mixture, more preferably no more than about 10 percent by weight of the monomer mixture. Most preferably no additional primary monomers are added.

Mixtures of AB-, BB-, BE- and/or BN-monomers containing different o-amino-basic moieties may be copolymerized to form copolymers containing mixtures of benzoxazole, benzothiazole and/or benzimidazole moieties. Mixtures of AE-, BE-, EE- and EN-monomers containing different acid groups may be copolymerized to form copolymers containing both aromatic ketone and aromatic sulfone moieties. Monofunctional reagents may be copolymerized in small quantities with the monomers to serve as end-capping groups, as described in U.S. Pat. No. 4,703,103 and in PCT Publ. WO 86/02368 on Page 30-31, which are incorporated herein by reference. Molecular weight may also be controlled by adding an excess of one monomer.

The previous discussion has repeatedly pointed out that copolymers ordinarily have only an average structure containing local variation. This is because carboxylic acid and its derivatives can act as either electron-deficient carbon groups or acid groups. For instance, oxy-bis-(4-benzoic acid) can function as an AA-monomer, an AE-monomer or an EE-monomer. In the presence of two primary BB-monomers, four oxy-bis-(4-benzoic acid) molecules can react to form either the two intermediate structures illustrated in Formula 37(a):

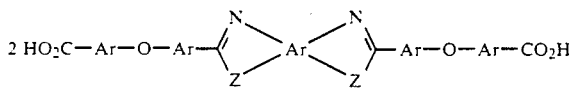

37a or the two intermediate structures illustrated in Formula 37(b):

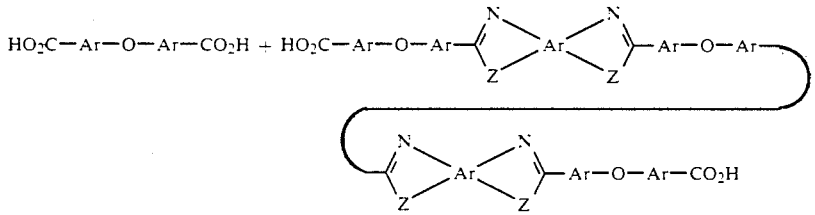

The stoichiometry of the reaction is not upset because the intermediates in both formulae 37(a) and 37(b) are two intermediates terminated with two acid groups each. Both the intermediates of Formula 37(a) and the intermediates of Formula 37(b) react with NN-monomers to provide the copolymer illustrated in Formula 35(b) in which each J is an oxygen atom and b averages 1. However, the intermediates of Formula 37(a) provide two mer units in which b equals one, whereas the intermediates in Formula 37(b) provide a mer unit in which b is 0 and a mer unit in which b is 2.

Similar obvious structural variations may be discerned in other sets of monomers without undue experimentation, and similar obvious structural variations may cause the formation of intermediate oligomers having more than two repeating units. Furthermore, the stoichiometric ratio of comonomers may be adjusted to shift the average value of b up or down. For instance, oxy-bis-(4-benzoic acid) reacts with BB-monomer in a 2:1 molar ratio to form intermediates having the average structure shown in Formula 37(a) and copolymer having the structure of Formula 35(b) wherein b averages 1. If, on the other hand, the molar ratio is 3:2, then the intermediate has the average structure shown in Formula 37(c)

copolymer may average less than one benzazole unit per mer unit (b is on average less than 1).

Other monomers containing carboxylic acid or derivatives may also react using "non-stoichiometric" amounts to adjust the benzazole or aromatic ketone content of the copolymer. The average number of benzazole mer units (b) in the benzazole moiety of each copolymer unit should be less than 10 and is preferably at most about 5, more preferably at most about 3, more highly preferably at most about 2 and most preferably at most about 1. The average should be greater than 0 and is preferably at least about 0.5, more preferably at least about 0.75 and most preferably at least about 1.

Two-step copolymerization process utilizing intermediate AA-, BB-, EE- or NN-monomers The copolymerization is preferably carried out in a two-step fashion. In a first step, two primary monomers which can link predominantly by one of either azole condensation or aromatic electrophilic substitution are reacted to form an intermediate AA-, BB-, EE or NN-monomer. In a second step, the intermediate monomer is contacted with a compatible AA-, BB-, EE- or NN-monomer under conditions in which azole ring formation or aromatic electrophilic substitution occur, whereby a copolymer is formed.

In a less preferred embodiment, the first step comprises an aromatic electrophilic substitution step and produces an intermediate AA- or BB-monomer suitable for copolymerization by known processes for making polybenzazole polymers. For instance, AE-monomers can react with NN-monomers or AN-monomers to produce intermediate AA-monomers, as illustrated in Formulae 38(a)-(b):

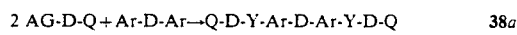  38a

  38b or BE-monomers can react with NN- or BN-monomers to produce intermediate BB-monomers, as illustrated in Formulae 39(a) and (b):

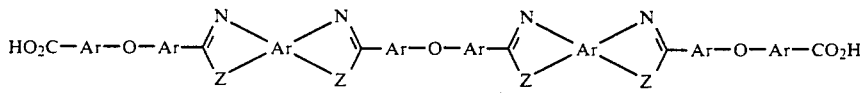

37c and the copolymer has the structure of Formula 35(b) wherein b averages 2. If the molar ratio of oxy-bis-(4-benzoic acid) to BB-monomer is greater than 2:1, the

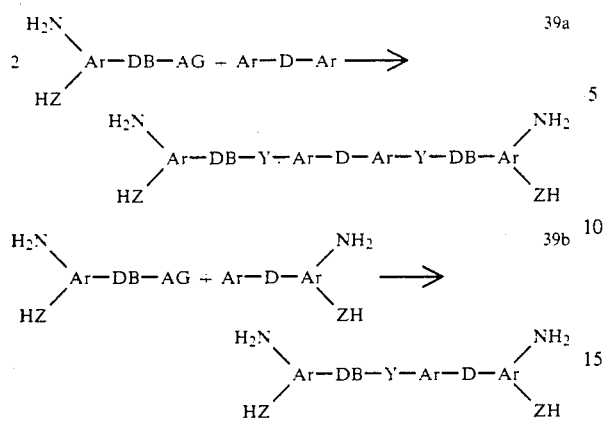

wherein all characters have the meaning and preferred embodiments previously described. As previously described, the monomer may also containing repeating AB-benzazole moieties if the acid group is carboxylic acid due to self-polymerization of the BE-monomer. Other examples of these reactions include the reaction of AN- or BN-monomers with EE-monomers.

The resulting intermediate monomer may be isolated and purified by known methods, but it is preferably reacted in situ with an AA- or BB-monomer under conditions suitable for the formation of azole rings. For instance, an intermediate BB-monomer can react with a primary or intermediate AA-monomer to provide an appropriate copolymer. The intermediate monomer is preferably an intermediate AA-monomer which reacts with a primary or intermediate BB-monomer. Intermediate monomers are preferably reacted with primary monomers. Due to potential instability in the aromatic ketone or sulfone moieties, the maximum temperature for the second (azole-forming step) has the maximum preferred temperature previously set out for aromatic electrophilic substitution.

Preferably, the azole ring is formed during the first step, such that an intermediate EE- or NN-monomer is formed. For instance, intermediate NN-monomers can be formed by the reaction of AN-monomers with BB-monomers, or AN-monomers with BN-monomers, or BN-monomers with Aa-monomers, as illustrated in Formulae 40(a)-(c):

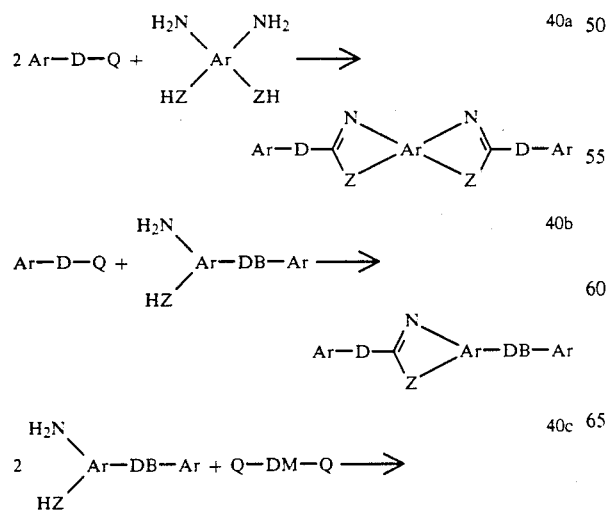

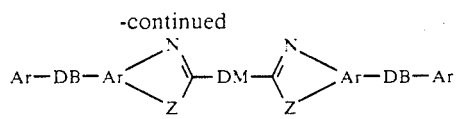

wherein all characters and monomers have the meanings and preferred embodiments previously given. Intermediate EE-monomers can be synthesized by the reaction of BE-monomers with AA-monomers, or by the reaction of BE-monomers with AE-monomers, or by the reaction of BB-monomers with AE-monomers, as illustrated in Formulae 41(a)-(c):

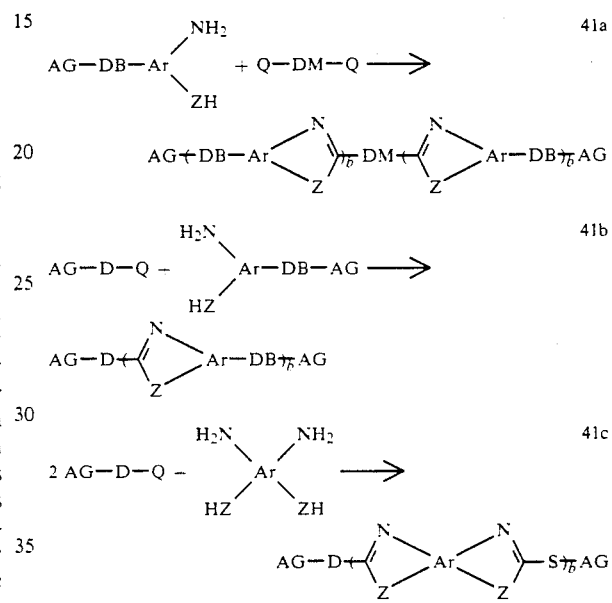

Each of the intermediate NN- or EE-monomers previously described may contain repeating benzazole or aromatic ketone mer units due to the dual action of carboxylic acid and its derivatives, as previously described.

Each intermediate NN-monomer preferably comprises:
  (1) a benzazole moiety containing:
    (a) at least one first aromatic group; and
    (b) at least one azole ring fused to each said first aromatic group;
  (2) at least one decoupling group linked to the 2-carbon of at least one azole ring in said benzazole moiety;
  (3) a second aromatic group linked to said decoupling group in a position wherein it is capable of reacting with an acid group in a solvent acid solution; and
  (4) a third aromatic group linked to the benzazole moiety either by a bond to a first aromatic group or by a second decoupling group which is linked to either the 2-carbon of an azole ring or to an aromatic group in the benzazole moiety.

Each intermediate EE-monomer preferably comprises:
  (1) a benzazole moiety as that term is previously defined:
  (2) at least on decoupling group linked to the 2-carbon of at least one azole ring in said benzazole moiety;

(3) a first acid group linked to said decoupling group in a position wherein it remains sufficiently active to react in a solvent acid solution; and (4) a second acid group linked to either a first aromatic group (AR¹) of said benzoxazole moiety or to a second decoupling group which is bonded to an azole ring of said benzoxazole moiety, in a position wherein it remains sufficiently active to react in a solvent acid solution.

Intermediate EE-monomers more preferably comprise:
(1) a benzazole moiety containing at least an AA/BB benzazole unit;
(2) a first and a second decoupling group, each of which comprises a first aromatic group bonded to the 2-carbon of an azole ring of said benzazole moiety and a second aromatic group linked to said first aromatic group;
(3) a first acid group bonded to the second aromatic group of said first decoupling group; and
(4) a second acid group bonded to the second aromatic group of said second decoupling group.

Each decoupling group more highly preferably comprises an oxygen atom, sulfur atom or bond linking the first and second aromatic groups, and most preferably comprises an oxygen atom linking the first and second aromatic groups.

Intermediate EE-monomers preferably independently conform to Formula 42(a)

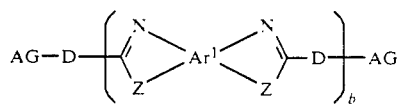

42a more preferably conform to Formula 42(b)

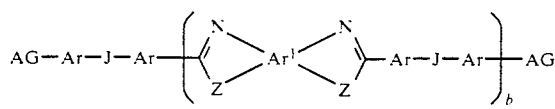

42b and most preferably conform to Formula 42(c)

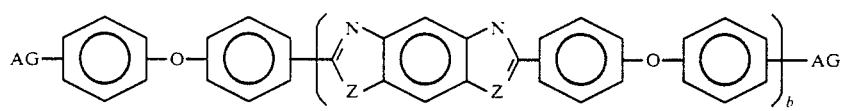

42c or the trans-PBZ variation thereof, wherein all characters have the meanings previously given. Bonds to aromatic groups, except for the first aromatic group (Ar1) are preferably in meta or para position with respect to each other and more preferably in para position with respect to each other.

The intermediate EE- and NN-monomers are copolymerized by aromatic electrophilic substitution in the manner and under conditions previously described. The monomers may be isolated, but are preferably reacted in situ. For instance, an intermediate EE-monomer of the present invention may be formed in a first reaction, and then a primary NN-monomer, such as diphenoxybenzene, may be added to react with that monomer and form copolymer in the second reaction.

Intermediate EE-monomers and intermediate NN-monomers may be copolymerized together, but preferably either the EE- or the NN-monomer is a primary monomer. More preferably, an intermediate EE-monomer is reacted with a stoichiometric amount of primary NN-monomer.

Of course, obvious variations of the condensation may be practiced to yield obvious variations in the resulting copolymer. Some EN-monomer, containing both an acid group and an aromatic group, may be copolymerized with essentially stoichiometric quantities of EE- and NN-monomer to form a random copolymer having units which reflect both EE/NN- and EN-monomer structure. Examples of EN-monomers include phenoxyphenoxybenzoic acid, phenylphenoxybenzoic acid, and the acid halides or esters thereof. The benzazole moiety of a single monomer may contain both AB- and AA/BB-PBZ structures, or may contain mixtures of benzoxazole, benzothiazole and/or benzimidazole units. Mixtures of monomers may be used in which some monomers contain AB-PBZ units and others contain AA/BB-PBZ units.

Intermediate EE- and/or NN-monomers may react with primary EE-, NN- and/or EN-monomers which contain amide, imide, quinoline and/or quinoxaline linkages, such that copolymers are formed containing benzazole moieties, aromatic ketone or sulfone moieties, and amide, imide, quinoline and/or quinoxaline moieties. Primary monomers containing amide, imide, quinoline and/or quinoxaline moieties preferably contain amide moieties. They more preferably comprise two acid groups or two aromatic groups linked to a divalent organic moiety by amide moieties. The divalent organic moiety must be stable in a solvent acid. It may be an aromatic group, but is preferably aliphatic and more preferably alkyl. It preferably comprises no more than about 12 carbon atoms, more preferably no more than about 6. The acylation reactive groups are preferably linked to the amide moiety by decoupling groups.

The structure of the copolymers reflects the structure of the monomers which are used to synthesize it. The copolymer contains a plurality of mer units which comprise
(1) a benzazole moiety as previously described;
(2) at least one decoupling group linked to the 2-carbon of at least one azole ring in said benzazole moiety;
(3) a linking group bonded to said decoupling group, said linking group comprising an aromatic group and either a carbonyl moiety or a sulfonyl moiety; and (4) either a bond or a decoupling group linking said benzazole moiety to the linking group of an adjacent mer unit.

Each mer unit preferably comprises two decoupling groups. Within each linking group, the carbonyl or sulfonyl moiety is preferably bonded to the linking group which is bonded to the 2-carbon of an azole ring.

The copolymer may also contain mer units which do not contain a benzazole moiety. Preferably at least about 5 percent of the mer units contain a benzazole moiety, more preferably at least about 10 percent of the mer units contain a benzazole moiety, more highly preferably at least about 25 percent of the mer units contain a benzazole moiety, and most preferably at least about 50 percent of the mer units contain a benzazole moiety.

Polymers containing AA/BB-benzazole of the present invention preferably contain a plurality of mer units which comprise (1) an AA/BB-benzazole moiety as previously described;
(2) two decoupling groups, one bonded to the 2-carbon in each of two azole rings in the benzazole moiety;
(3) two linking groups, as previously described, one bonded to each decoupling group; and
(4) a decoupling group bonded to one of the linking groups.

Polymers synthesized by the reaction of an intermediate EE-monomer and a primary NN-monomer preferably conform to Formula 43(a)

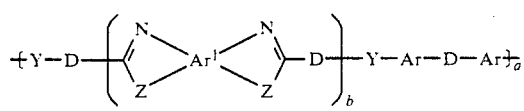

more preferably to Formula 43(b)

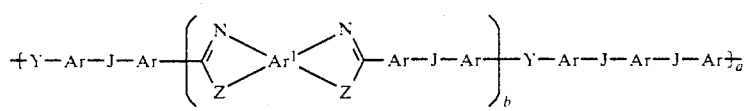

and most preferably to Formula 43(c)

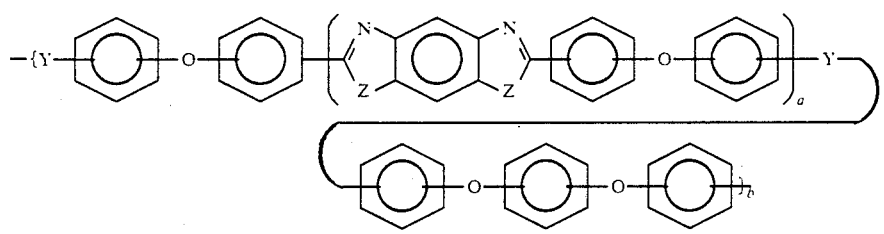

The average number of benzazole units within each mer unit is preferably at least about 0.1, more preferably at least about 0.5 and most preferably at least about 1. The average number of benzazole units within each mer unit should be less than 10, is preferably not more than 5, is more preferably no more than 3, is more highly preferably no more than 2 and is most preferably about 1.

wherein all characters have the meaning previously set out and each a is a number of benzazole units from 0 to 10 having an average value greater than 0 and less than 10, which is preferably at least about 0.1 and at most about 5, more preferably at least about 0.5 and at most about 3, and most preferably at least about 1 and at most about 2.

Polymers synthesized by the reaction of an intermediate NN-monomer and a primary EE-monomer preferably complies with Formula 44(a)

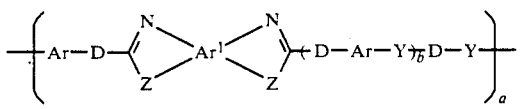

more preferably complies with Formula 44(b)

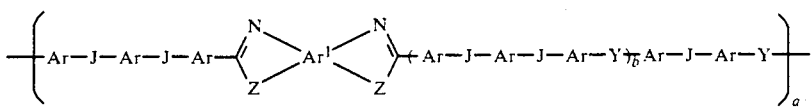

and most preferably complies with Formula 44(c)

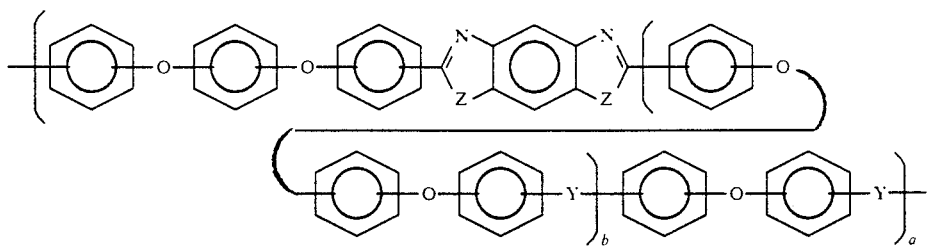

44c wherein all characters have the meaning previously assigned.

Polymers synthesized using intermediate EE- and intermediate NN-monomers preferably conform to Formula 45(a)

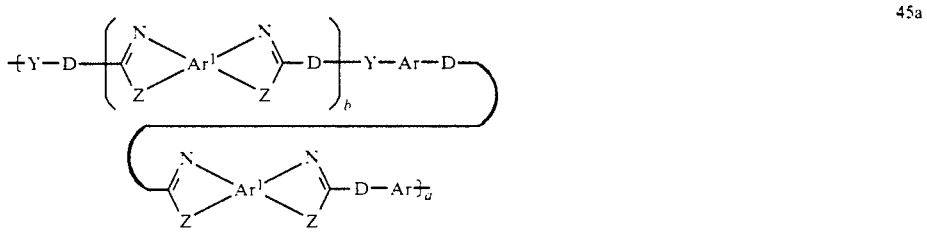

45a more preferably confirm to Formula 45(b)

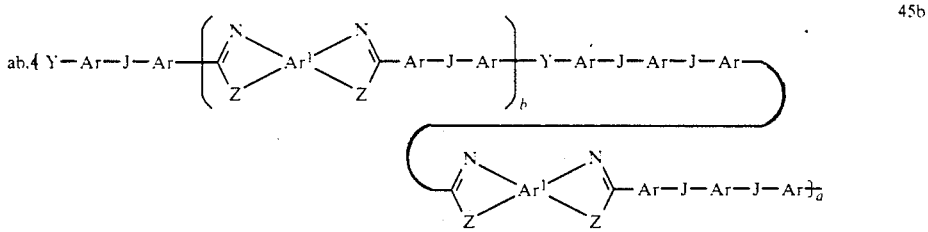

45b and most preferably conform to Formula 45(c)

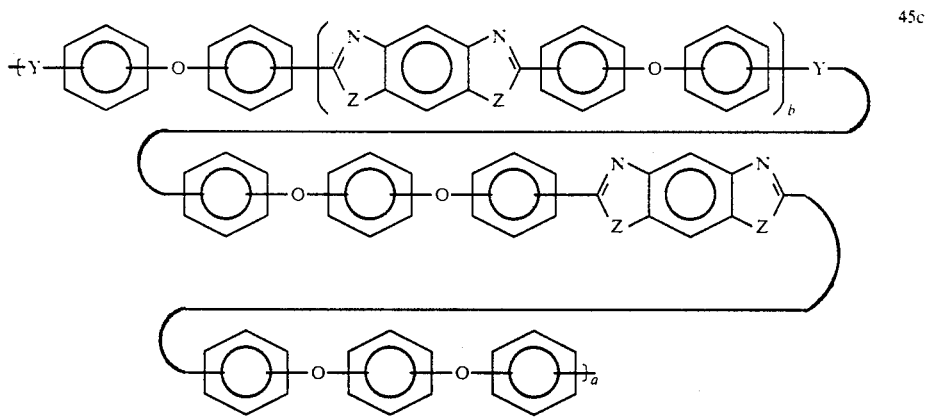

45c which is incorporated herein by reference. Without intending to be bound thereby, it is theorized that block copolymers of the present invention are substantially linear, as opposed to being graft copolymers.

Block copolymers of the present invention comprise:

(1) a block of PBZ polymer, as previously described; and (2) a block of thermoplastic polymer linked to the PBZ block and comprising polyamide, polyimide, polyquinoxaline, polyquinoline, poly(aromatic ketone), poly(aromatic sulfone), poly(aromatic ether) or a copolymer of one of those polymers.

PBZ blocks have the description and preferred embodiments previously given. They are most preferably rigid rod AA/BB-PBO. Thermoplastic blocks preferably

Block Copolymer Compositions

PBZ polymers and thermoplastic polymers which can be dissolved or synthesized in solvent acid an be incorporated into block copolymers of the present invention, such as diblock, triblock and multiblock copolymer compositions. The terms block copolymer, diblock, triblock and multiblock are well-known in the art of polymer chemistry and have the definition given in 2 Encyclopedia of Polymer Science and Engineering, *Block Copolymers*, 324–26 (John Wiley & Sons 1987), comprise polyamide, poly(aromatic ether) or a copolymer of such a polymer. Thermoplastic blocks more preferably comprise a poly(aromatic ether) or a PBZ/poly(aromatic ether) copolymer and most preferably comprise a PBZ/poly(aromatic ether) copolymer.

PBZ and thermoplastic blocks within the block copolymer are preferably linked by a linking group (L) which comprises
(1) the remnant of the active end group of the PBZ polymer, and
(2) the remnant of either
   an active end group of a thermoplastic polymer, or
   a monomer as previously described which polymerizes in solvent acid to form a thermoplastic poly(aromatic ketone), poly(aromatic sulfone) or poly(aromatic ether).

The linking group preferably comprises:
(1) a first decoupling group;
(2) a carbonyl or sulfonyl group bonded to the first decoupling group;
(3) a first aromatic group bonded to the carbonyl or sulfonyl group; and
(4) a second decoupling group bonded to the aromatic group.

The first decoupling group preferably comprises a second and a third aromatic group; more preferably further comprises an oxygen or sulfur atom linking the second and third aromatic groups; and most preferably comprises an oxygen atom linking the second and third aromatic groups. The carbonyl or sulfonyl group is preferably carbonyl. The first aromatic group has the preferred embodiments previously defined for aromatic groups. The second decoupling group preferably comprises a fourth and a fifth aromatic group; more preferably further comprises oxygen or sulfur atoms linking the first, fourth and fifth aromatic groups; and most preferably comprises oxygen atoms linking the first, fourth and fifth aromatic groups. Preferably, the first decoupling group is bonded to the PBZ block and the second decoupling group is bonded to the thermoplastic block.

Each linking group (L) individually preferably comprises a moiety which conforms to Formula 46(a).

-D-Y-Ar-D-     46(a)

wherein
  each D is individually a decoupling group as previously defined,
  each Y is a carbonyl or sulfonyl group, and
  each Ar is an aromatic group as previously defined.

Each linking group (L) more preferably comprises a moiety which conforms to Formula 46(b), -AR-D-AR-Y-AR-D-AR-D-AR-     30(b)

wherein each D is independently an oxygen, a sulfur atom, or a bond and each other character has the meaning previously given. Each linking group (L) most prefer comprises a moiety which conforms to Formula 46(c).

46(c)

$$-\bigcirc-O-\bigcirc-\overset{O}{\underset{\|}{C}}-\bigcirc-O-\bigcirc-O-\bigcirc-$$

Less preferred variations of L may comprise, for example, a moiety which conforms to either 46(d)-(f):

-D-Y-AR-(-O-AR-)-n-Y-D-     46(d)

-D-Ar-Y-D-Y-Ar-D-     46(e)

-D-Ar-Y-Ar-J-Ar-NH-Y-     46(f)

wherein n is a number of repeating units at least equal to one and preferably at least equal to 2, and all other characters have the meanings previously assigned.

When two moieties are bonded to an aromatic ring, other than within a benzoxazole, benzothiazole or benzimidazole moiety, they are most preferably in para position with respect to each other. This is particularly preferable in linking groups, poly(aromatic ethers), poly(aromatic ketons), poly(aromatic sulfones) and copolymers thereof.

The weight proportions of the PBZ polymer blocks and thermoplastic polymer blocks within the block copolymer may vary in any proportions from about 99 percent PBZ to about 99 percent thermoplastic. As the proportions of PBZ block decrease, the physical properties of the block copolymer become less like those of the PBZ polymer and more like those of the thermoplastic polymer, in a manner familiar to persons skilled in the art of block copolymer chemistry. For instance, as the proportions of rigid rod PBZ decrease, the tensile modulus of the polymer decreases, but its glass transition temperature approaches that of the thermoplastic homopolymer and its solubility in various acids becomes more like that of the thermoplastic block.

The optimal proportions depend upon the desired levels of stiffness, strength and processability for the polymer. In most cases, however, it will be preferred that neither that PBZ blocks nor the thermoplastic blocks make up less than about 5 percent on average of the weight of the polymer. More preferably, neither makes up less than about 10 percent. More highly preferably, neither makes up less than about 20 percent. Most preferably, neither makes up less than about 30 percent.

Physical properties of the block copolymers are also dependent upon a number of other factors, such as the chemical structure of the PBZ blocks, the chemical structure of the thermoplastic blocks, the amount of homopolymer mixed in with the block copolymer, and the lengths of the PBZ and thermoplastic blocks. Preferred block lengths are already set out in describing the PBZ and thermoplastic polymers. If the PBZ blocks or thermoplastic blocks are too long, the block copolymer may have a greater tendency to phase separate.

Block copolymers of the present invention preferably comprise a moiety which complies with Formula 47

$(\text{(PBZ)}-L-\text{(thermoplastic)}-L)_c$     47 wherein
  the block marked (PBZ) represents a PBZ polymer as previously described;
  the block marked (thermoplastic) represents a thermoplastic polymer as previously described;
  the moiety L is a bond or a linking group as previously defined; and
  c is a number of units equal to or greater than one.

Each PBZ block preferably comprises at least 10 units chosen from those illustrated in the description of PBZ polymers, and more preferably comprises at least 10 units illustrated in Formula 1, 2, 20, 21 or 22(a)-(d). Each thermoplastic block preferably comprises one or more units such as those illustrated in describing thermoplastic polymers and copolymers previously, chosen such that the thermoplastic block contains on average at least about 2 mer units and/or has a formula weight of at least about 800. For example, the formula for mer units in the thermoplastic block may be any illustrated in one of Formulae 25-31, 33-36 and/or 43-45. Each L is preferably a linking group as previously described and is more preferably chosen from one of those illustrated in Formulae 46(a)-(e).

Block copolymers of the present invention more preferably comprise a moiety which complies with one of Formulae 48(a)-(f)

each $Ar^1$ is a first aromatic group in a PBZ mer unit as previously defined;
each $Ar^2$ is a second aromatic group in a PBZ mer unit as previously defined;
each Z is an oxygen atom, a sulfur atom, or a nitrogen atom bearing a hydrogen atom or organic substituent, which may be in cis or trans position on $Ar^1$;
D is a decoupling group as previously defined;
$A^1$ and $A^2$ respectively are first and second divalent organic moieties in a polyamide polymer as previously defined;
T is a divalent organic moiety as previously defined for poly(aromatic ketones), poly(aromatic sulfones) and poly(aromatic ethers) and copolymers thereof;

48

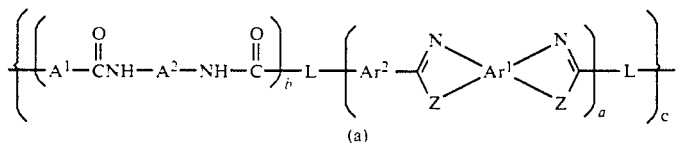
(a)

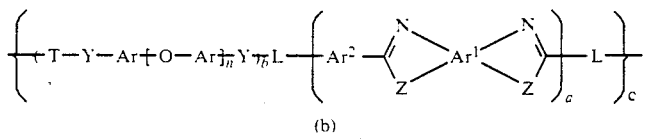
(b)

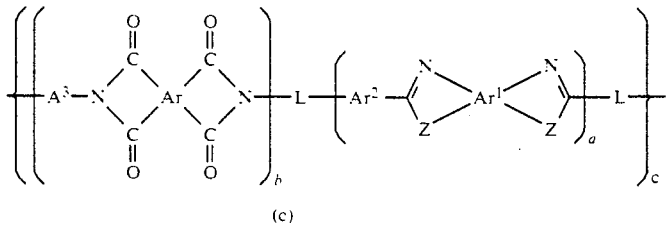
(c)

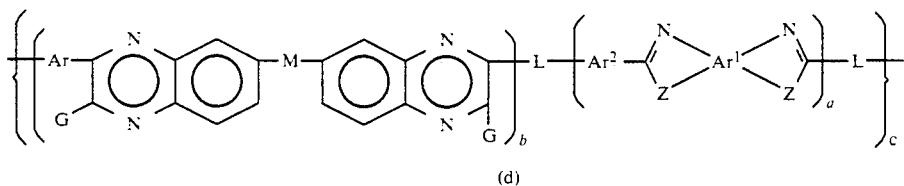
(d)

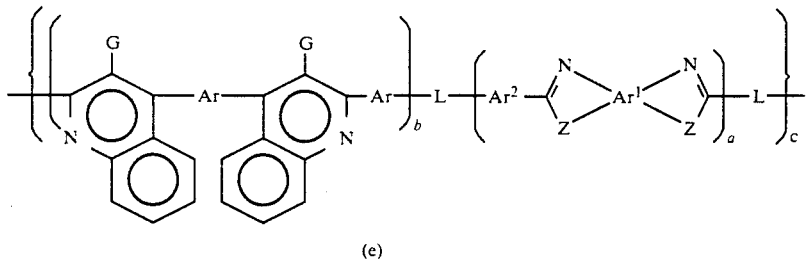
(e)

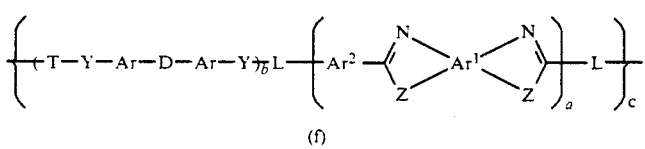
(f)

wherein:
each Ar is an aromatic group as previously defined;

M is a bond or a divalent organic moiety as previously defined for polyquinoxalines;

each G is independently hydrogen or n aromatic group:

each L is a bond or a linking group as previously illustrated in Formulae 46(a)–(e);

a is a number of repeating PBZ units as previously defined:

b is a number of repeating thermoplastic units as previously defined:

c is a number of units equal to one or more; and n is a number of repeating decoupled aromatic units as previously defined for poly(aromatic ketones), poly(aromatic sulfones) and poly(aromatic ethers) and copolymers thereof.

Block copolymers having a PBZ block and a PBZ/poly(aromatic ether) block preferably comprise a moiety which complies with the Formula 49(a):

tic polymer terminated by an active end group or a monomer which will react to form a thermoplastic polymer and will react to form a linkage with the active end group. The reaction is preferably either between a PBZ polymer and a thermoplastic polymer, both terminated by azole-forming groups; or between a PBZ polymer and a thermoplastic polymer, both terminated by acylation reactive groups; or between a PBZ polymer terminated by an active end-group and one or more monomers which react in solvent acid to form a thermoplastic polymer and to form a linkage with the active end group on the polymer.

The first process comprises the step of contacting:

(1) a PBZ polymer which is terminated by a first azole-forming group; and (2) a thermoplastic polymer comprising polyamide,

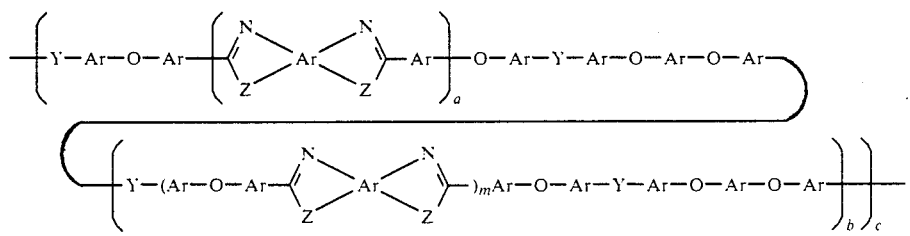

49(a)

each Y is independently a sulfonyl or carbonyl moiety:

each Ar is independently an aromatic group:

each a is independently a number of PBZ mer units equal on average to at least about 10:

each b is a number of thermoplastic mer units equal to at least 1:

each m is a number of PBZ mer unit within each thermoplastic mer unit and is equal on average to at most about 3: and c is a number of repeating PBZ and thermoplastic blocks equal to at least 1.

Block copolymers having a PBZ block and a PBZ/poly(aromatic ether) block most preferably comprise a moiety which complies on average with Formula 49(b)

polyimide, polyquinoxaline, polyquinoline, poly(aromatic ketone), poly(aromatic sulfone), poly(aromatic ether) or a copolymer of one of those polymers which is stable in solvent acid and which is terminated by a second azole-forming group capable of reacting with the first azole-forming group to form an azole ring, in a solvent acid solution under conditions such that the PBZ polymer and thermoplastic polymer react to form a block copolymer.

PBZ polymers and thermoplastic polymers terminated by azole-forming groups are previously described. The thermoplastic polymer is preferably polyamide, polyquinoxaline, poly(aromatic ether) or a copolymer thereof. It is more preferably polyamide or a

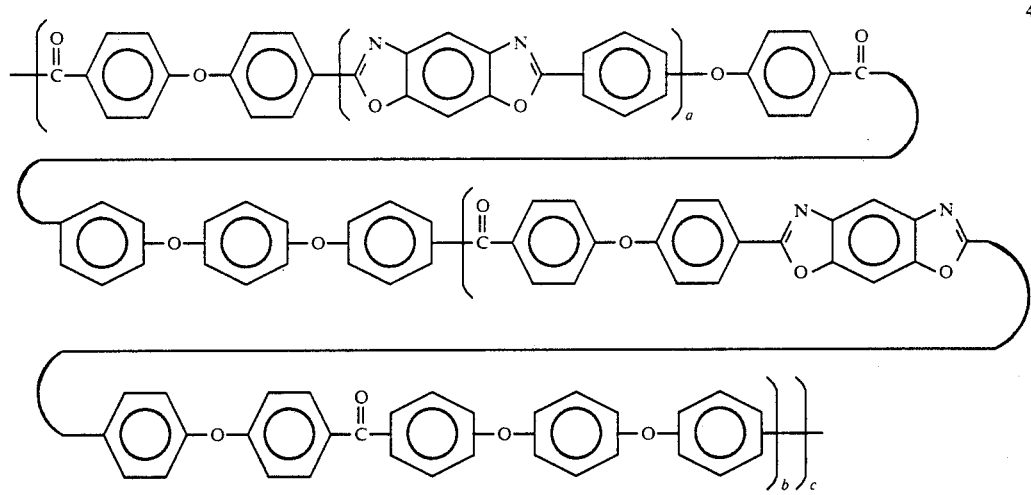

49(b)

wherein each character has the meaning and preferred embodiments previously set out.

Block copolymers of the present invention are preferably synthesized by contacting a PBZ polymer terminated by an active end group with either a thermoplascopolymer thereof. The weight ratio of polymers used in the reaction has the same limits and preferred embodiments as the weight ratio of thermoplastic blocks and PBZ blocks within the product block copolymer. More preferably, the molar quantities of the two polymers are such that substantially all PBZ polymer is part of a block copolymer. Most preferably, the two polymers are also used in equimolar quantities or the thermoplastic polymer is in a molar excess.

Preferably, one polymer is terminated by an o-aminobasic moiety and the other is terminated by an electron-deficient carbon group when the polymers are initially contacted. However, it is also within the scope of the present invention to contact two polymers terminated by electron-deficient carbon groups in the presence of a BB-monomer, or to contact two polymers terminated by o-amino-basic moieties in the presence of an AA-monomer. In either case, the monomer will react with one polymer or the other to terminate it with an appropriate azole-forming site. Appropriate monomers are described in the section on PBZ synthesis.

The reaction is carried out in solvent acid which can dissolve both polymers. The solvent acid is preferably polyphosphoric acid or a mixture of methanesulfonic acid and phosphorus pentoxide. The conditions are the same as those for the synthesis of PBZ polymer, except that the temperature of the reaction must remain at a level at which the thermoplastic polymer is stable in solvent acid. The maximum temperature varies for different thermoplastic polymer blocks, but is preferably less than about 200° C., more preferably less than 150° C. and most preferably no more than about 125° C.

In the reaction, the azole-forming group on the thermoplastic polymer and the azole-forming group on the PBZ polymer react to form an azole ring which links the two polymers. The remnants of the two active end groups form an additional PBZ unit which is attached to the PBZ polymer block. Therefore, the resulting polymer preferably comprises a moiety conforming to one of Formulae 48(a)–(f), wherein each L is a bond.

The second process comprises the step of contacting:
(1) a PBZ polymer that is terminated on at least one end by a decoupled acylation reactive group; and
(2) a thermoplastic polymer which is stable in solvent acid under reaction conditions and is terminated on at least one end group by a second acylation reactive group capable of reacting with the first acylation reactive group in a solvent acid solution under conditions such that they react to form a block copolymer.

PBZ polymers and thermoplastic polymers terminated by acylation reactive groups have previously been discussed. The thermoplastic polymer is preferably a polyamide, a poly(amide-imide), a poly(aromatic ether) or a PBZ/poly(aromatic ether) copolymer. The thermoplastic polymer is more preferably a poly(aromatic ether) or a PBZ/poly(aromatic ether) copolymer. The weight ratio of polymers employed in the reaction has the same limits and preferred embodiments as the weight ratio of thermoplastic blocks and PBZ blocks within the product block copolymer. More preferably, the molar quantities of the two polymers are such that substantially all PBZ polymer is part of a block copolymer. Most preferably, the two polymers are also used in equimolar quantities or the thermoplastic polymer is in a molar excess.

Preferably, one polymer is terminated by an acid group and the other by an active aromatic group when the polymers are initially contacted. However, it is also within the scope of the present invention to contact two polymers terminated by acid groups in the presence of an NN-monomer, or to contact two polymers terminated by active aromatic groups in the presence of an EE-monomer. In either case, the monomer will react with one polymer or the other to terminate it with an appropriate acylation reactive group. Examples of appropriate monomers are described previously.

The solvent acid preferably comprises polyphosphoric acid and/or methanesulfonic acid; more preferably comprises a mixture of methanesulfonic acid and either phosphorus pentoxide and/or polyphosphoric acid; and most preferably comprises a 10:1 mixture by weight of methanesulfonic acid and phosphorus pentoxide. The reaction conditions are similar to those for synthesizing poly(aromatic ethers) in solvent acids as described in the Ueda references which were incorporated by reference previously. The temperature of the reaction may be any at which it proceeds. The temperature is preferably more than about 0° C., more preferably at least about 25° C. and most preferably at least about 50° C. The temperature should not go above that at which the polymers are stable. Although that varies considerably between different thermoplastic polymers, the temperature is preferably less than about 150° C. and more preferably no more than about 125° C. Pressure is not critical as long as the solvent acid remains liquid. The reaction is preferably run under inert atmosphere, such as nitrogen, argon or helium and most preferably under nitrogen.

Polymers synthesized by the process comprise a linking group (L) which links the PBZ block and thermoplastic block as previously described. When the thermoplastic block is a poly(aromatic ether) or copolymer thereof, the linking group preferably comprises the same moieties as the thermoplastic block and may be indistinguishable from it. When the reaction is between two acid-terminated polymers and a diaromatic monomer, the linking group preferably conforms to Formula 46(d). When the reaction is between two aromatic-terminated polymers and a diacid monomer, the linking group preferably conforms to Formula 46(e). Otherwise, the linking group preferably conforms to one of Formulae 46(b) or 46(c).

The third process comprises the step of contacting:
(1) a PBZ polymer which is terminated on at least one end by an active end group; and
(2) one or more monomers which can react in the acid to form a thermoplastic polymer and to form a linkage with the active end group, in a solvent acid solution under conditions such that a block copolymer is formed. The active end group is preferably an acylation reactive group or an azole-forming group and is more preferably an acylation reactive group. The monomers are preferably those appropriate for forming poly(aromatic ketone or sulfone) or copolymers thereof. If the active end group is an acylation reactive group, then at least some must be AE-, AN-, BE- or BN-monomers. The third process is the most preferred process.

The weight ratios of PBZ polymer to monomer have the same limitations and preferred embodiments previously used to describe the weight ratio of PBZ block to thermoplastic block within the product block copolymer. The solvent acid solvent-catalyst and the reaction conditions are identical to those previously described for the second process. Like the polymers produced by the second process, polymers synthesized by the third process comprise a linking group (L) which may be indistinguishable from the thermoplastic poly(aromatic ether) or copolymer bonded to it.

The foregoing reaction takes place under the same conditions previously described for carrying out azole ring formation and/or aromatic electrophilic substitution in a solvent acid. The solvent acid is preferably dehydrating. The reaction preferably takes place either under inert atmosphere or a vacuum. Vigorous agitation is ordinarily necessary in order to form high molecular weight block copolymer. There must be sufficient shear to dissolve the blocks and monomers, if any, in the solvent acid so that the reaction between them may occur. Adequate agitation may sometimes be obtained using a conventional mechanical stirrer, but may also be obtained using a piston-agitated reactor, a single- or multiple-screw extruder, or other reactors described in U.S. Pat. No. 4,772,678 at column 44, line 40 to column 5, line 12.

Block copolymers of the present invention may contain variations which are obvious to persons of ordinary skill in the art. Reagents containing a single azole-forming group or acylation reactive group, such as benzoic acid, benzene, p-phenoxybenzophenone or o-aminophenol depending upon the reaction used, can be added as chain terminating agents to control the molecular weight of the block copolymer. Trifunctional monomers and higher functional monomers may be added to provide sites for branching and/or cross-linking, although that may render the resulting polymer non-thermoplastic. Two polymers may be reacted using a large excess of one polymer to form predominantly triblock copolymers.

The product of each method of synthesis is a dope comprising solvent acid and block copolymer. Block copolymers within the dope are theorized to be ordinarily a mixture of diblock, triblock and/or multiblock copolymers whose lengths and proportions vary, depending upon the reagents used and their relative proportions. It is further theorized that the dope ordinarily comprises some thermoplastic polymer which is not linked to a PBZ block. The dope may further comprise some PBZ homopolymer which is not linked to a thermoplastic block, but it preferably comprises essentially no PBZ homopolymer. Preferably, the proportions of thermoplastic and PBZ polymers outside of block copolymers in the composition are minimized. More preferably essentially all PBZ blocks in the dope are linked to a thermoplastic block and essentially all thermoplastic blocks are linked to a PBZ block. One or more additives as described in U.S. Pat. No. 4,533,693 at column 84, which is incorporated herein by reference, may also be added to the dope. The properties of the polymer composition will vary depending upon the polymers therein and their relative proportions.

The contents of the dope can be precipitated by diluting the solvent acid and/or dissolving it away from the polymer, for instance with water, to form polymer compositions of the present invention. Although the block copolymer may be synthesized in a dope having any concentration of polymer which is convenient, it should be coagulated from a dope which is in an optically isotropic (substantially non-liquid-crystalline) phase if a non-phase-separated coagulated product is desired. The phase is important because block copolymers precipitated from optically anisotropic dopes form phase-separated polymers. Phase-separation in precipitated polymers can not be reversed except by redissolving the polymer and precipitating from an optically isotropic solution. Of course, a phase separated product can be produced, if desired, by precipitating the block copolymer from an anisotropic solution.

Optical isotropy and anisotropy of the dope can be determined by a number of tests familiar to persons of ordinary skill in the art, such as those described in Hwang et al., "Composites on a Molecular Level: Phase Relationships, Processing, and Properties," B22(2) J. Macromol. Sci.-Phys. 231, 234-35 (1983), which is incorporated by reference. A simple method is to see if the solution exhibits birefringence when viewed under a microscope under cross-polar conditions. Within even optically isotropic solutions, some association of rigid rod blocks is inevitable on a molecular scale. However, in polymers precipitated from the optically isotropic phase., the level of phase-separation is small enough to provide a block copolymer or polymer composition which is essentially a molecular composite.

The point at which a given dope changes from optically isotropic to anisotropic phase and the reverse varies as a function of many factors, such as the concentration of the polymer, the solvent, the size and concentration of rigid rod PBZ blocks within the polymers in the dope, the temperature of the dope and other factors. The parameter most easily controlled is concentration of the block polymer and any homopolymer. As previously described, it is convenient to synthesize the block copolymer in a solution having a low enough concentration to avoid the anisotropic phase. If an anisotropic dope is formed, it may be diluted with solvent acid until an optically isotropic state is reached.

The preferred concentration of polymer in optically isotropic dopes of the present invention varies depending upon the portion of the polymer which is rigid rod PBZ. If the polymer in the dope contains only about 5 weight percent rigid rod PBZ block or less, then the concentration of polymer in the dope may be as high as the solvent acid can dissolve, such as at most about 15 weight percent. If the polymer contains about 30 weight percent rigid rod PBZ block, then the dope preferably comprises no more than about 12 weight percent polymer. If the polymer contains about 50 weight percent rigid rod PBZ block, then the dope preferably comprises no more than about 8 weight percent polymer. If the polymer comprises about 70 weight percent rigid rod PBZ block, then the dope preferably comprises no more than about 6 weight percent polymer and more preferably no more than about 4 weight percent polymer.

If the dope is to be extruded to form shaped products as described hereinafter, then it must contain sufficient polymer to be processable, i.e., to form the desired product consistently. The dope preferably contains at least about 0.05 percent polymer by weight, more preferably at least about 1 percent, more highly preferably at least about 2 percent and most preferably at least about 3 percent.

Block copolymers and polymer compositions precipitated from optically isotropic dopes are preferably not substantially phase-separated. As with the dopes, some phase-separation on a molecular level is inevitable. However, the domains of phase-separated polymer in the polymer compositions of the present invention are preferably on average not greater than about 1000 angstroms, highly preferably not greater than about 500 angstroms, more preferably not greater than about 200 angstroms, more highly preferably not greater than about 100 angstroms and most preferably not greater than about 50 angstroms.

The polymers and compositions of the present invention preferably do not exhibit physical characteristics of phase-separated systems, such as opacity, small-angle X-ray scattering or small-angle light scattering. Methods for measuring phase-separation in a system are discussed in Hwang et al., "Composites on a Molecular Level: Phase Relationships, Processing, and Properties," B22(2) J. Macromol. Sci.-Phys. 231, 234-35 (1983), which is incorporated by reference.

Of course, for some applications, such as those in which high uniaxial tensile properties are desired, higher levels of phase separation in the block copolymer and/or polymer composition may be desirable. Phase separation can be induced by choosing conditions and polymer characteristics previously described as leading to phase separation. For instance, the length of PBZ blocks in the block copolymer, the concentration of polymer in the dope and/or other factors can be adjusted to produce an anisotropic dope from which phase-separated polymers can be extruded. For most purposes, however, phase separation will be undesirable and should be avoided.

Block copolymers having substantial PBZ content can be isolated from compositions containing substantial thermoplastic homopolymer either by washing with or by precipitation from solvents which can effectively dissolve the thermoplastic homopolymer polymer, but not the PBZ homopolymer.

Polymer compositions or block copolymers of the present invention can be formed into powders by known methods, such as coagulation in a blender followed by grinding. Alternatively, they may be extruded as fibers and films, as described hereinafter. Isolated block copolymer can be added to homopolymer and mixtures thereof as a compatibilizing agent.

Fabrication and Physical Properties of Items Using Polymer Compositions of the Present Invention The present invention comprises a polymer composition containing PBZ polymer moieties and thermoplastic polymer moieties which can be formed into fibers, films and other shaped articles having a high tensile modulus. Fibers and films are preferably formed from isotropic dopes as previously described. The dopes may result from precipitating the polymer and redissolving it, but are conveniently the direct product of the block copolymer synthesis process. The dope is preferably first degassed under elevated temperature and/or reduced pressure, such as about 80° C. and about 0.4 in Hg.

Fibers are spun by known techniques familiar to persons of ordinary skill in the art. See, e.g., 11 Ency. Poly. Sci. & Eng., supra, at 625-28; U.S. Pat. No. 4,533,693 at columns 82-84; Hwang et al., "Solution Processing and Properties of Molecular Composite Fibers and Films," 23 Poly. Eng. & Sci. 784, 785 (1984); and Hwang et al., "Composites on a Molecular Level: Phase Relationships, Processing, and Properties," B22(2) J. Macromol. Sci.-Phys. 231, 234-35 (1983), which are incorporated by reference. The dope is forced by a piston or screw through a temperature-controlled spinnerette which passes the dope as a thin stream. The stream of dope passes into a bath which dilutes the acid in the dope and coagulates the spun fiber. The coagulation bath is preferably water. The fiber is then stretched under tension, for instance by spin-drawing, to a maximum elongation, and is washed to remove acid still in the fiber. The fiber is dried and preferably heat treated by subjecting it to temperatures at or above its glass transition temperature while it is under tension, for instance from spin-drawing. The fiber preferably undergoes a further elongation during heat treatment. The extent of elongation is not critical, but the fiber is preferably stretched to the maximum. The minimum elongation is frequently at least about 3 percent to about 10 percent, and is frequently at most about 200 percent to about 15 percent. Heat treatment may increase the tensile properties of the polymer by up to about 30 percent or more.

The physical properties of fibers of the present invention are dictated to a great extent by the chemical composition and relative proportions of PBZ and thermoplastic polymer in the fiber. Under similar processing conditions, polymer compositions comprising less PBZ component will have lower tensile modulus and lower glass transition temperatures than compositions comprising higher PBZ content.

Fibers comprising at least about 30 percent PBZ by weight preferably have a tensile strength before heat treatment of at least about 40 ksi, more preferably at least about 55 ksi, more highly preferably at least about 70 ksi and most preferably at least about 90 ksi. (1 ksi =1000 psi). Fibers comprising 30 percent PBZ by weight preferably have a tensile strength after heat treatment of at least about 50 ksi, more preferably at least about 75 ksi, more highly preferably at least about 100 ksi and most preferably at least about 110 ksi. The tensile modulus of the fiber before heat treatment is preferably at least about 2.0 Msi, more preferably at least about 2.5 Msi, more highly preferably at least about 3.5 Msi and most preferably 4.5 Msi. (1 Msi =1,000,000 psi) The tensile modulus of a heat-treated fiber is preferably at least about 3.5 Msi, more preferably at least about 4.5 Msi, more highly preferably at least about 6.0 Msi and most preferably at least about 7.5 Msi. The elongation to break prior to heat treating is preferably from about 1 percent to about 30 percent and is more preferably from about 10 percent to about 15 percent. The elongation to break of heat-treated fiber is preferably from about 6 percent to about 19 percent.

Fibers comprising at least about 50 percent PBZ by weight preferably have a tensile strength before heat treatment of at least about 58 ksi and more preferably at least about 79 ksi. Fibers comprising 50 percent PBZ by weight preferably have a tensile strength after heat treatment of at least about 70 ksi, more preferably at least about 85 ksi, more highly preferably at least about 100 ksi and most preferably at least about 130 ksi. The tensile modulus of the fiber before heat treatment is preferably at least about 3.0 Msi, more preferably at least about 3.8 Msi and most preferably about 7.1 Msi. The tensile modulus of a heat-treated fiber is preferably at least about 6.0 Msi, more preferably at least about 8.0 Msi, more highly preferably at least about 10 Msi and most preferably at least about 14 Msi. The elongation to break prior to heat treating is preferably from about 14 percent to about 18 percent. The elongation to break of heat-treated fiber is preferably from about 4.4 percent to about 15 percent.

Fibers comprising at least about 70 percent PBZ by weight preferably have a tensile strength after heat treatment of at least about 100 ksi, more preferably at least about 125 ksi and most preferably at least about 175 ksi. The tensile modulus of a heat-treated fiber is preferably at least about 12 Msi, more preferably at least about 20 Msi and most preferably at least about 25 Msi. The elongation to break of heat-treated fiber is preferably from about 1.6 percent to about 5 percent.

Polymer compositions of the present invention may also be formed into films. Processes for making films are reported in the same references previously incorporated in the description of fiber processing. For instance, the degassed dope is extruded through a die under controlled temperature onto a rotating drum which is partially submerged in a coagulating bath such as water. The bath coagulates the film, which is stretched, washed to remove acid within the film and dried. Films are not ordinarily heat-treated.

Films comprising at least about 30 percent PBZ by weight preferably have a tensile strength of at least about 20 ksi, more preferably at least about 25 ksi and most preferably at least about 50 ksi. The tensile modulus of the film is preferably at least about 1 Msi, more preferably at least about 2.5 Msi and most preferably at least about 4.3 Msi. The elongation to break of the film is preferably from about 5 percent to about 31 percent and more preferably from about 12 percent to about 20 percent.

Films comprising at least about 50 percent PBZ by weight preferably have a tensile strength of at least about 20 ksi, more preferably at least about 40 ksi and most preferably at least about 80 ksi. The tensile modulus of the film is preferably at least about 1 Msi, more preferably at least about 3.0 Msi and most preferably at least about 6.0 Msi. The elongation to break of the film is preferably from about 4 percent to about 40 percent.

Polymer compositions and block copolymers of the present invention and articles formed from them are preferably thermoplastic, although the glass transition temperature varies substantially depending upon the chemical composition of the block copolymer and the polymer composition. Desirable glass transition temperatures also vary depending upon the proposed use for the polymer. Under ordinary circumstances, the glass transition temperature is preferably no more than about 400° C., more preferably no more than about 350° C., more highly preferably no more than about 300° C. and most preferably no more than about 280° C. Under ordinary circumstances, the glass transition temperature is preferably at least about 100° C., more preferably at least about 200° C., and most preferably at least about 250° C.

Block copolymers and polymer compositions of the present invention and articles made from them preferably are not substantially phase separated. They preferably do not experience substantial phase separation even upon heating up to their glass transition temperature. They more preferably do not experience substantial phase separation when heated to at least about 25° C. beyond their glass transition temperature. However, fibers and films, particularly heat-treated fibers, may suffer some loss of tensile strength and modulus if heated for long periods above their glass-transition temperature without tension.

Films can be fabricated into laminates useful for making objects by methods known for making laminates out of thermoplastic films, such as compression molding at a temperature above the glass transition temperature of the film. Furthermore, powders of the polymer composition can be compression molded by known techniques at a temperature above the glass transition temperature of the polymer to make useful articles. Powders can be made by precipitating the polymer dope in a blender, washing out any remaining acid, drying the product and grinding the resulting product in a grinder.

Fibers of the present invention can be used as reinforcement in matrix composites as described in 11 Ency. Poly. Sci. & Eng., supra, at 625-30, which is incorporated herein by reference. Films can be used as dielectric films for capacitors, as drum winding for cryogenic tanks, in membrane applications or as cable wrapping. Laminates can be used as structural materials or as substrates for printed circuit boards. Block copolymers and polymer compositions of the present invention may also be used as protective coatings.

Illustrative Embodiments

The following examples are given to illustrate the invention and should not be interpreted as limiting it in any way. Unless stated otherwise, all parts and percentages are given by weight.

SYNTHESIS OF REAGENTS (not examples of the invention):

Example A

Synthesis of Methyl 4-(4-Phenoxyphenoxybenzoate): EN- or AN-monomer

Methyl 4-(4-phenoxyphenoxy)benzoate is synthesized as follows. A mixture of 15.00 g (80.6 mmoles) of -phenoxyphenol, 130 ml of N,N-dimethylformamide and 75 ml of toluene is agitated under nitrogen atmosphere. Potassium t-butoxide (9.32 g, 80.6 mmoles) is added with vigorous stirring and the mixture is heated to reflux. An azeotrope of t-butanol and toluene (85 ml) is collected at temperatures of 120° C. to 135° C. and is discarded. The mixture is cooled to ambient temperature, and a solution of 14.59 g (80.6 mmoles) of methyl 4-nitrobenzoate in 30 ml of N,N-dimethylformamide is added over a period of 15 minutes with cooling in a water bath. The mixture is heated at 100° C. for 14 hours, cooled to 20° C., and quenched with 1500 ml of ice water. The precipitate is filtered, dried in air and dissolved in 500 ml of acetone. The solution is filtered to remove insolubles, and the filtrate is concentrated by evaporation and cooled to precipitate methyl 4-(4-phenoxyphenoxy)benzoate. The recovered product weighs 1 23 g (82 percent yield) and has a melting point of 14° C. as determined by DSC.

Example B

Synthesis of 1-(4-Carboxylic Acid-phenoxy)-4-(4-sulfonic acid-phenoxy)benzene and acid chlorides thereof: AE-monomer or EE-monomer A solution of 9.00 g (28.1 mmoles) of methyl 4-(4-phenoxyphenoxy)benzoate in 150 ml of methylene chloride is cooled to 0° C. under nitrogen atmosphere with stirring. A solution of 1.87 ml (3.27 g, 28.1 mmoles) of chlorosulfonic acid in 50 ml of methylene chloride is added over a period of 15 minutes. The cooling bath is removed and the mixture is stirred for 14 hours. The precipitate is filtered, washed with 100 ml of methylene chloride and dried in air. It is mixed in slurry with 120 ml of methanol, 60 ml of water and 10.00 g of potassium hydroxide, and the slurry is refluxed for two hours The cooled solution is acidified with hydrochloric acid, filtered, washed with 100 ml of cold water and dried in air. The product is recrystallized from 600 ml of a 5-1 by volume methanol and water solution and dried at 100° C. under vacuum to yield 10.84 g (91 percent yield) of 1-(4-carboxylic acid-phenoxy)-4-(4-sulfonic acid-phenoxy)benzene. The acid chloride is prepared by refluxing with thionyl chloride.

Example C

Synthesis of 4-(4-Phenoxyphenoxy)benzoic Acid and the Chloride Thereof: EN- or AN-monomer A slurry of 5.00 g (15.6 mmoles) of methyl 4-(4-phenoxyphenoxy)benzoate from Example A, 0.28 g (50.0 mmoles) of potassium hydroxide, 50 ml of methanol and 50 ml of deionized water is refluxed for 48 hours. Methanol is added until the mixture is homogeneous. Aqueous hydrochloric acid is added until the solution is strongly acidified, and the slurry is cooled. The resulting precipitate is filtered, washed with 300 ml of deionized water and dried in air. It is recrystallized from a minimum volume of hot 2-1 by volume methanol and water solution to yield 4.40 g (92 percent yield) of 4-(4-phenoxyphenoxy)benzoic acid having a melting point of 185° C. as measured by DSC.

A slurry of 2.30 g (7.52 mmols) of 4-(4-phenoxyphenoxy)benzoic acid, 30 ml of thionyl chloride and 2 drops of N,N-dimethylformamide is refluxed under nitrogen atmosphere for 16 hours. Excess thionyl chloride is distilled off to yield an oil, and 200 ml of anhydrous n-hexane is added. The solution is cooled to −15° C., and the resulting precipitate is filtered and dried under nitrogen atmosphere. The precipitate is dissolved in a minimum volume of hot n-hexane, the solution is filtered, and the filtrate is cooled to −15° C. to yield 1.82 g (66 percent yield of 4-(4-phenoxyphenoxy)benzoyl chloride having a melting point of 85° C. to 89° C. by DSC measurement.

Example D

Synthesis of 1,4-Bis(4-sulfonic acid-phenoxy)benzene and the Dichloride Thereof: EE-monomer A mixture of 10.00 g (38.2 mmoles) of 1,4-diphenoxybenzene in 300 ml of methylene chloride is agitated under nitrogen atmosphere. A solution of 5.08 ml (8 90 g, 76.4 mmoles) of chlorosulfonic acid in 30 ml of methylene chloride is added over 30 minutes, and the mixture is stirred for 16 hours. The precipitated product is filtered, rinsed with 100 ml of methylene chloride, dried in air, recrystallized from hot water and dried at 100° C. under vacuum to yield 13.21 g (82 percent yield) of 1,4-bis(phenoxy-4-sulfonic acid)benzene.

A mixture of 5.00 g (11.8 mmoles) of 1,4-bis(phenoxy-4-sulfonic acid)benzene, 75 ml of thionyl chloride and 3 drops of N,N-dimethylformamide is refluxed for 16 hours under nitrogen atmosphere. The resulting mixture is cooled to 20° C., and 300 ml of n-hexane is added to precipitate the product. The precipitate is filtered, rinsed with n-hexane and dried under nitrogen atmosphere. The precipitate is stirred with 50 ml of methylene chloride, and the resulting slurry is filtered. The filtrate is diluted with 500 ml of n-hexane, sealed under nitrogen atmosphere and cooled to −15° C. The precipitate is dried under nitrogen atmosphere and yields 4.11 g of 1,4-bis-(phenoxy-4-sulfonyl chloride)benzene having a melting point of 198° C. as measured by DSC.

Example E

Synthesis of 4-(4-Sulfonic Acid-phenoxy)benzene Sulfonic acid and the Dichloride Thereof: EE-monomer A mixture of 10.00 g (58.8 mmoles) of diphenyl ether and 300 ml of methylene chloride is stirred under nitrogen atmosphere. A solution of 7.82 ml (13.71 g, 18 mmoles) of chlorosulfonic acid in 30 ml of methylene chloride is added over a period of 20 minutes, and the mixture is stirred for 16 hours. The resulting precipitate is filtered, rinsed with 100 ml of methylene chloride, recrystallized from hot water and dried at 100° C. under vacuum to yield 15.14 g (78 percent yield) of 4-(phenoxy-4-sulfonic acid)benzene sulfonic acid.

A mixture of 5.00 g (15.2 mmoles) of 4-(phenoxy-4-sulfonic acid)benzene sulfonic acid, 75 ml of thionyl chloride and 3 drops of N,N-methylformamide is refluxed for 16 hours under nitrogen atmosphere. The resulting mixture is cooled to 20° C. and 400 ml of n-hexane is added to precipitate the product. The precipitate is filtered, rinsed with 100 ml of n-hexane and dried under nitrogen atmosphere. The precipitate is stirred with 50 ml of methylene chloride, and the resulting slurry is filtered. The filtrate is diluted with 600 ml of n-hexane, sealed under nitrogen atmosphere and cooled to -15° C. The precipitate is dried under nitrogen atmosphere and yields 3.74 g (67 percent yield) of 4-(phenoxy-4-sulfonyl chloride)benzene sulfonyl chloride having a melting point of 128° C. by DSC.

Example 1

Synthesis of dope comprising cis-polybenzoxazole in polyphosphoric acid

In the amounts shown below in Table 1, 4,6-diaminoresorcinol dihydrochloride (DAHB) and terephthaloyl chloride (TC) are mixed in polyphosphoric acid (PPA) containing about 76 percent phosphorous pentoxide by weight under nitrogen atmosphere. The mixture is stirred vigorously and heated for 16 hours at 45° C. The temperature is raised to 95° C. and additional phosphorous pentoxide is added as shown in Table 1. The reaction is continued with stirring for 8 hours at 95° C., for 16 hours at 150° C. and for 24 hours at 190° C. The resulting dopes are stored sealed under nitrogen atmosphere until needed. The polymers synthesized comprise repeating units as illustrated in Formula 21(a) predominantly terminated by o-amino-basic moieties as illustrated in Formula 23 wherein Z is an oxygen atom.

To measure inherent viscosity ($\eta$), the polymer is isolated by coagulating a portion of the polymer in water, drying the polymer, grinding it to a fine powder, extracting impurities with water and drying under temperatures of about 170° C. and pressures of about 3 mm Hg. The isolated polymer is dissolved at room temperature in methanesulfonic acid in a concentration of about 0.05 g/dL. The inherent viscosity of the resulting solution at 25° C. is measured in a Schott-Gerate CT 150 bath in an Ubelhobde tube.

TABLE I

| Sample | DAHB (g) | DAHB (mmol) | TC (g) | TC (mmol) | PPA (g) | $P_2O_5$ Added (g) | $\eta$ (dL/g) |
|---|---|---|---|---|---|---|---|
| A | 7.5 | 35.2 | 6.93 | 34.1 | 31.4 | 17.9 | 6.42 |
| B | 75 | 352 | 69.3 | 341 | 314 | 179 | * |
| C | 7.5 | 35.2 | 6.82 | 33.6 | 31.4 | 17.9 | 9.96 |
| D | 100.00 | 469.4 | 90.52 | 445.9 | 414.4 | 244.2 | 5.08 |

TABLE I-continued

| Sample | DAHB (g) | DAHB (mmol) | TC (g) | TC (mmol) | PPA (g) | P2O5 Added (g) | η (dL/g) |
|---|---|---|---|---|---|---|---|
| E | 100.0 | 469.4 | 93.86 | 462.3 | 405.7 | 248.3 | 16.9 |
| F | 50.00 | 234.7 | 46.57 | 229.4 | 201.5 | 124.8 | 9.53 |
| G | 100.00 | 469.4 | 90.52 | 445.9 | 411.0 | 247.6 | 6.25 |
| H | 100.00 | 469.4 | 90.52 | 445.9 | 413.9 | 231.8 | 4.04 |
| I | 10.00 | 46.9 | 8.86 | 43.6 | 41.2 | 22.9 | 3.27 |
| J | 50.00 | 234.7 | 45.26 | 222.9 | 206.0 | 116.8 | 5.27 |
| K | 24.00 | 112.6 | 21.26 | 104.7 | 96.60 | 57.06 | 11.7 |
| L | 50.00 | 234.7 | 45.26 | 222.9 | 207.8 | 115.1 | 5.10 |
| M | 50.00 | 234.7 | 45.26 | 222.9 | 207 | 115.9 | 5.29 |
| N | 10.17 | 47.75 | 9.50 | 46.8 | 41.9 | 24.5 | 11.7 |

*not measured

Example 2

Synthesis of cis-PBO/polyamide block copolymer

A polyamide terminated by electron deficient carbon groups is synthesized. Terephthaloyl chloride (14.10 g, 69.45 mmoles) is dissolved in 400 ml of N-methylpyrrolidinone under nitrogen atmosphere with mechanical stirring. Bis-(4-aminophenyl) ether (13.49 g, 67.37 mmoles) and 4.29 g of calcium chloride are added to the solution and washed down with 100 ml of N-methylpyrrolidinone. After 1½ hours, 9.72 g of calcium chloride and 5.45 g of calcium oxide are added to the mixture and stirring is continued for about 10 hours. The polyamide is precipitated with water in a blender, collected by filtration and washed. Polyamide (20.49 g) is recovered. The inherent viscosity in concentrated sulfuric acid (concentration 0.5 g/dL) is measured as in Example 1 to be 0.388 dL/g.

Under nitrogen atmosphere, 3 g of the polyamide and 15.05 g of the dope from Example 1(B) are added with stirring to 84 g of 10-1 mixture of methanesulfonic acid and phosphorous pentoxide by weight (hereinafter referred to as 10-1 methanesulfonic acid solution). The mixture is heated with stirring for 16 hours at 70° C. and for 48 hours at 90° C. The resulting polymer conforms to Formula 48(a) wherein $A^1$ is a p-phenylene group, $A^2$ is a 4,4'-diphenylene ether group, each L is a bond, $Ar^2$ is a p-phenylene group, each Z is oxygen and $Ar^1$ is a 1,2,4,5-tetravalent benzene ring. An aliquot of the resulting dope is cast on a glass slide and coagulated with water to yield a clear, amber film. The remainder of the polymer is coagulated in water, washed, dried, ground, rewashed and redried. Its inherent viscosity in methanesulfonic acid is 4.07 dL/g.

Example 3

Synthesis of cis-PBO/polyamide block copolymer

A polyamide is prepared from isophthaloyl chloride and 4-chloro-1,3-diaminobenzene as described in Example 2. Under nitrogen atmosphere, 5.68 g of polyamide and 17.4 g of dope prepared in Example 1(D) are added with stirring to 83.0 g of a 10-1 solution of methanesulfonic acid and phosphorous pentoxide by weight. The mixture is heated for 16 hours at 50° C. 4,4'-Oxybis(benzoyl chloride) (0.083 g) is added and washed down with 6.8 g of 10-1 methanesulfonic acid solution. The solution is heated an additional 24 hours at 50° C. and 24 hours at 70° C. The polymer is coagulated with water and isolated as described in Example 2. Its inherent viscosity in methanesulfonic acid is 5.61 dL/g.

Example 4

Synthesis of cis-PBO/polyamide block copolymer

A polyamide is prepared as described in Example 2. Dope from Example 1(D) (12.4 g) is dissolved in 60 ml of a 10-1 methanesulfonic acid solution. The mixture is heated for 16 hours at 90° C. Polyamide (4.06 g) is added and heating is continued for 4 hours at 50° C. 4,4'-Oxybis(benzoyl chloride) (0.10 g) is added to the solution and washed down with 6 ml of 10-1 methanesulfonic acid and phosphorous pentoxide. Heating and stirring are continued for 20 hours at 50° C. and 80 hours at 70° C. The polymer is precipitated and isolated as described in Example 2.

Example 5

Synthesis of cis-PBO/polyamide block copolymer

A polyamide terminated by active aromatic groups is synthesized. Under nitrogen atmosphere, 193 ml of N-methylpyrrolidinone and 39 ml of pyridine are added with stirring and warming to 11.6 g of calcium chloride and 3.9 g of lithium chloride. m-Phenylenediamine (2.09 g, 19.3 mmoles), 2.92 g (17.6 mmoles) of isophthalic acid, 1.07 g (3.51 mmoles) of 4-phenoxyphenoxybenzoic acid, and 11.99 g (38.6 mmoles) of triphenylphosphite are added under nitrogen atmosphere to a reaction vessel. The N-methylpyrrolidinone and pyridine mixture is added to the reaction vessel with stirring. The contents are stirred for about 10 hours at 110° C. The functionally terminated polyamide is precipitated in a blender by a 1:1 solution of water and methanol. The polymer is washed twice with the precipitating solution and once with methanol. The polymer is dried in a vacuum oven. Its inherent viscosity in sulfuric acid (conc 0.5 g/dL) is 0.175 dL/g.

An acid terminated polybenzoxazole is synthesized. Dope from Example 1(G) (16.7 g) is mixed with g of 10-1 methanesulfonic acid solution under nitrogen atmosphere with stirring. Oxybis(benzoyl chloride) (0.59 g) is added to the solution and washed down with 5.9 g of 10-1 methanesulfonic acid solution. The mixture is heated with stirring for 16 hours at 90° C.

Polyamide (2.30 g) is added to the mixture and washed down with 16.8 g of 10-1 methanesulfonic acid solution. The solution is heated for 4 hours at 50° C. p-Diphenoxybenzene (0.20 g) is added and washed down with 13.3 g of 10-1 methanesulfonic acid solution. Heating is continued at 50° C. for 72 hours. The resulting polymer conforms predominantly to Formula 48(a) wherein $A^1$ is a m-phenylene group, A2 is an m-phenylene group, $Ar^2$ is a p-phenylene group, each Z is oxygen, $Ar^1$ is a 1,2,4,5-tetravalent benzene ring and each L complies with Formula 46(c) wherein the diphenoxycarbonyl moiety is bonded to PBZ polymer (When L is bonded to $Ar^2$, $Ar^2$ serves as one of the p-phenylene rings in Formula 46(c)).

A film is cast as described in Example 2 which is strong, amber-colored and clear. Viscosity in methanesulfonic acid is measured as described in Example 1. The inherent viscosity of the polymer is 9.23 dL/g.

Example 6

Synthesis of block copolymer using about 30 percent polybenzoxazole polymer and about 70 percent PBO/poly(aromatic ether ketone)-forming monomer by weight Under nitrogen atmosphere, 1.50 g (7.04 mmoles) of 4,6-diaminoresorcinol dihydrochloride and 4.25 g (14.40 mmoles) of 4,4'-oxybis(benzoyl chloride) are dissolved in 74 ml of 10-1 methanesulfonic acid and phosphorous pentoxide solution The solution is heated with stirring for 1 hour at 70° C. and for 24 hours at 90° C. PBO dope from Example 1(A) (17.50 g) is added and heating is continued for 24 hours at 90° C. The mixture is cooled to 50° C., and 1.93 g (7.36 mmoles) of p-diphenoxybenzene is added. Heating and stirring are continued at ° C for 48 hours. The block copolymer is isolated as described in Example 2. Its inherent viscosity in methanesulfonic acid is 12.4 dL/g.

Example 7

Synthesis of block copolymer using about 30 percent polybenzoxazole polymer and about 70 percent PBO/poly(aromatic ether ketone)-forming monomer by weight 4,6-Diaminoresorcinol dihydrochloride (15 g) and 42.5 g of 4,4'-oxybis(benzoyl chloride) are mixed with stirring in 500 ml of 10-1 methanesulfonic acid solution. The mixture is heated at 70° C. for 2 hours and at 90° C. for 24 hours. PBO dope from Example 1(B) (87.5 g) is added and heating is continued at 90° C. for 24 hours. A further 87.5 g of the same dope is added and heating is continued at 90° C. for an additional 24 hours. p-Diphenoxybenzene (19.30 g) is added to the solution with 220 ml of 10-1 methanesulfonic acid solution at 0° C. The mixture is heated at 50° C. for 64 hours. The polymer is isolated as described in Example 2.

Example 8

Synthesis of block copolymer using about 30 percent polybenzoxazole polymer and about 70 percent PBO/poly(aromatic ether ketone)-forming monomer by weight Under nitrogen atmosphere, 1.25 g (5.85 mmoles) of 4,6-diaminoresorcinol dihydrochloride and 3.25 g (12.6 mmoles) of 4,4'-oxybis(benzoic acid) are mechanically stirred with 100 g of 10-1 methanesulfonic acid solution. The mixture is heated with stirring for 24 hours at 90° C. PBO dope from Example 1(G) (14.74 g) is added and stirring is continued for 48 hours at 90° C. p-Diphenoxybenzene (1.65 g) is added and washed down with 37.3 g of 10-1 methanesulfonic acid solution. Stirring is continued for 72 hours at 50° C. The polymer is isolated as described in Example 2. Its inherent viscosity in methanesulfonic acid is 10.2 dL/g.

Example 9

Synthesis of block copolymer using about 30 percent polybenzoxazole polymer and about 70 percent PBO/poly(aromatic ether ketone)-forming monomer by weight Under a nitrogen atmosphere, 1.25 g (5.87 mmoles) of 4,6-diaminoresorcinol dihydrochloride, 3.72 g (12.6 mmoles) of 4,4'-oxybis(benzoyl chloride) and 1.65 g (6.29 mmoles) of p-diphenoxybenzene are mixed with 93.8 g of polyphosphoric acid containing about 76 percent $P_2O_5$ by weight. The mixture is stirred for 16 hours at 45° C. Three 14.7-g quantities of phosphorous pentoxide are added and stirring is continued for 8 hours at 95° C. PBO dope from Example 1(D) (14.5 g) is added and heating is continued for 64 hours at 95° C. The polymer is precipitated as described in Example 2. Its inherent viscosity in methanesulfonic acid is 8.46 dL/g.

Example 10

Synthesis of block copolymer using about 30 percent polybenzoxazole polymer and about 70 percent PBO/poly(aromatic ether ketone)-forming monomer by weight Under a nitrogen atmosphere, 1.26 g (5.91 mmoles) of 4,6-diaminoresorcinol dihydrochloride and 3.60 g (12.2 mmoles) of 4,4'-oxybis(benzoyl chloride) are mixed with 100 g of 10-1 methanesulfonic acid solution. The mixture is heated for 2 hours at 70° C. and f hours at 90° C. PBO dope of Example 1(F) (14.6 g) is added and the solution is heated for 48 hours at 90° C. p-Diphenoxybenzene (1.60 g) is added and washed down with 39.4 g of 10-1 methanesulfonic acid solution. Heating is continued for 64 hours at 50° C. The polymer is isolated as described in Example 2. It has an inherent viscosity of 15.7 dL/g.

Example 11

Synthesis of block copolymer using about 30 percent polybenzoxazole polymer and about 70 percent PBO/poly(aromatic ether ketone)-forming monomer by weight 4,6-Diaminoresorcinol dihydrochloride (1.26 g) and 3.53 g of 4,4'-oxybis(benzoyl chloride) are dissolved in 125.67 g of 10-1 methanesulfonic acid solution. The mixture is heated for about 2 hours at 70° C. and for 20 hours at 90° C. PBO dope from Example 1(E) (14.64 g) is added and stirring is continued for 44 hours at 90° C. p-Diphenoxybenzene (1.57 g) is added and washed down with 25.9 g of 10-1 methanesulfonic acid solution, and stirring is continued for 68 hours at 50° C. The polymer is isolated and has an inherent viscosity of 12.6 dL/g.

Example 12

Synthesis of block copolymer using about 30 percent polybenzoxazole polymer and about 70 percent PBO/poly(aromatic ether ketone)-forming monomer by weight Under a nitrogen atmosphere, 2.08 g of 4,6-diaminoresorcinol dihydrochloride and 6.18 g of 4,4'-oxybis(benzoyl chloride) are mixed in 129.2 g of 10-1 methanesulfonic acid solution with stirring The solution is heated for 2 hours at 70° C. and for 24 hours at 90° C. Dope from Example 1(D) (24.29 g) is added and stirring is continued for 48 hours at 90° C. The temperature is reduced to 50° C. and 2.75 g of p-diphenoxybenzene is added to the mixture and washed down with 19.7 g of 10-1 methanesulfonic acid solution. Heating and stirring are continued at 50° C. for 48 hours. The resulting polymer is isolated as described in Example 2 and has an inherent viscosity of 16.0 dL/g.

Example 13

Synthesis of block copolymer using about 30 percent polybenzoxazole polymer and about 70 percent PBO/poly(aromatic ether ketone)-forming monomer by weight 4,6-Diaminoresorcinol dihydrochloride (11.35 g) and 33.71 g of 4,4'-oxybis(benzoyl chloride) are mixed under nitrogen atmosphere with 580.75 g of 10-1 methanesulfonic acid solution. The mixture is heated with stirring for 2 hours at 70° C. and for about 24 hours at 90° C. PBO dope from Example 1(D) (132.5 g) is added to the mixture with 211.2 g of 10-1 methanesulfonic acid solution. Heating and stirring are continued for 48 hours at 90° C. The temperature is reduced to 50° C. and 15.00 g of p-diphenoxybenzene are added and washed down with 456.04 g of 10-1 methanesulfonic acid solution. Heating and stirring are continued for 72 hours at 50° C. The polymer is precipitated as previously described and has an inherent viscosity of 11.75 dL/g.

Example 14

Synthesis of block copolymer using about 30 percent polybenzoxazole polymer and about 70 percent PBO/poly(aromatic ether ketone)-forming monomer by weight 4,6-Diaminoresorcinol dihydrochloride (1.5 g) and 4.25 g of 4,4'-oxybis(benzoyl chloride) are mixed with 121.2 g of 10-1 methanesulfonic acid solution. The mixture is heated with stirring for 2 hours at 70° C. and for 24 hours at 90° C. PBO dope from Example 1(B) (17.50 g) is added and heating is continued for 24 hours at 90° C. p-Diphenoxybenzene (1.93 g) is added and the reaction is continued with stirring for 48 hours at 50° C. The block copolymer is isolated as previously described and has an inherent viscosity of 12.1 dL/g.

Example 15

Synthesis of block copolymer using about 70 percent polybenzoxazole polymer and about 30 percent PBO/poly(aromatic ether ketone)-forming monomer by weight Under a nitrogen atmosphere, 0.55 g of 4,6-diaminoresorcinol dihydrochloride and 2.16 g of 4,4'-oxybis(benzoyl chloride) are mixed with 71.2 g of 10-1 methanesulfonic acid solution. The mixture is heated with stirring for about 2 hours at 70° C. and for about 20 hours at 90° C. PBO dope from Example 1(G) (35.58 g) is added and heating is continued with stirring for 48 hours at 90° C. The temperature is reduced to 50° C. and 0.96 g of p-diphenoxybenzene is added and washed down with 31 g of 10-1 methanesulfonic acid solution. The reaction is continued for 72 hours at 50° C. The polymer is isolated as described in Example 2 and has an inherent viscosity of 17.1 dL/g.

Example 16

Synthesis of block copolymer using about 70 percent polybenzoxazole polymer and about 30 percent PBO/poly(aromatic ether ketone)-forming monomer by weight 4,6-Diaminoresorcinol dihydrochloride (0.33 g) and 1.29 g of 4,4'-oxybis(benzoyl chloride) are mixed with 70 g of 10-1 methanesulfonic acid solution. The mixture is heated for 2 hours at 70° C. and for 16 hours at 90° C. PBO dope from Example 1(F) (21.1 g) is added and heating is continued with stirring for 48 hours at 90° C. The temperature is reduced to 50° C. p-Diphenoxybenzene (0.57 g) is added and washed down with 26.7 g 10-1 methanesulfonic acid solution. Heating and stirring are continued at 50° C. for 64 hours. The polymer composition is isolated as described in Example 2 and has an inherent viscosity of 11.5 dL/g.

Example 17

Synthesis of block copolymer using about 70 percent polybenzoxazole polymer and about 30 percent PBO/poly(aromatic ether ketone)-forming monomer by weight The procedures of Example 15 is repeated using 0.71 g of 4,6-diaminoresorcinol dihydrochloride, 3.12 g of 4,4'-oxybis(benzoyl chloride), 48.6 g initial amount of 10-1 methanesulfonic acid solution, 45.00 g of PBO dope from Example 1(I), 1.39 g of p-diphenoxybenzene and 32.1 g of 10-1 methanesulfonic acid solution to wash down the p-diphenoxybenzene. The polymer composition has an inherent viscosity of 12.4 dL/g.

Example 18

Synthesis of block copolymer using about 30 percent polybenzoxazole polymer and about 70 percent PBO/poly(aromatic ether ketone)-forming monomer by weight The procedure of Example 16 is followed using 11.37 g of 4,6-diaminoresorcinol dihydrochloride, 33.90 g of 4,4'-oxybis(benzoyl chloride), 514 g of initial 10-1 methanesulfonic acid solution, 134.7 g of PBO dope from Example 1(G), 436.5 g of methanesulfonic acid solution to wash down the PBO dope, 15.06 g of p-diphenoxybenzene and 307.3 g of 10-1 methanesulfonic acid solution to wash down the p-diphenoxybenzene. The resulting polymer composition has an inherent viscosity of 14.4 dL/g.

Example 19

Synthesis of block copolymer using about 50 percent polybenzoxazole polymer and about 50 percent PBO/poly(aromatic ether ketone)-forming monomer by weight The procedure of Example 6 is followed using 1.33 g of 4,6-diaminoresorcinol dihydrochloride, 4.33 g of 4,4'-oxybis(benzoyl chloride), 61.5 g of 10-1 methanesulfonic acid solution, 36.23 g of PBO dope from Example 1(D) and 26.6 g of 10-1 methanesulfonic acid solution to wash it down, 1.93 g of p-diphenoxybenzene and 14.7 g of 10-1 methanesulfonic acid solution to wash it down. The resulting polymer composition has an inherent viscosity of 14.5 dL/g.

Example 20

Synthesis of block copolymer using about 50 percent polybenzoxazole polymer and about 50 percent PBO/poly(aromatic ether ketone)-forming monomer by weight The procedure of Example 13 is repeated using 0.53 g of 4,6-diaminoresorcinol dihydrochloride, 1.71 g of 4,4'-oxybis(benzoyl chloride) and 51.91 g initial 10-1 methanesulfonic acid solution, 14.52 g of cis-PBO dope from Example 1(G) and 0.76 g of p-diphenoxybenzene with 45.8 g 10-1 methanesulfonic acid solution to wash it down. The resulting polymer composition has an inherent viscosity of 12.3 dL/g.

Example 21

Synthesis of block copolymer using about 50 percent polybenzoxazole polymer and about 50 percent PBO/poly(aromatic ether ketone)-forming monomer by weight Under nitrogen atmosphere, 3.29 g of 4,6-diaminoresorcinol dihydrochloride and 10.71 g of 4,4'-oxybis(benzoyl chloride) are mixed with 428.4 g of 10-1 methanesulfonic acid solution. The mixture is heated with stirring for 2 hours at 70° C. and 22 hours at 90° C. PBO dope from Example 1(G) (90.77 g) is added and the reaction is continued with stirring for 48 hours at 90° C. The temperature of the mixture is reduced to 50° C. p-Diphenoxybenzene (4.76 g) is added and washed down with 181.96 g of 10-1 methanesulfonic acid solution. Heating and stirring are continued for 72 hours at 50° C. The polymer is isolated as described in Example 2 and has an inherent viscosity of 15.8 dL/g.

Example 22

Synthesis of block copolymer having cis-PBO blocks and PBO/poly(aromatic ether ketone) thermoplastic blocks wherein thermoplastic block units contain on average more than one PBO unit per aromatic ether ketone unit 4,6-Diaminoresorcinol dihydrochloride (1.14 g) and 2.54 g of 4,4'-oxybis(benzoyl chloride) are mixed under nitrogen atmosphere with 90.34 g of 10-1 methanesulfonic acid solution. The solution is heated for about 2 hours at 70° C. and about 20 hours at 90° C. PBO dope from Example 1(D) (12.86 g) are added to the mixture and heating and stirring are continued at 90° C. for about 23 hours. The temperature is reduced to 50° C. p-Diphenoxybenzene (0.752 g) is added and rinsed down with 31.87 g of 10-1 methanesulfonic acid solution. Heating and stirring for 48 hours at 50° C. The polymer composition is isolated as described in Example 2 and has an inherent viscosity of 12.05 dL/g.

Example 23

Block copolymer in which the thermoplastic block contains poly(sulfonyl-dibenzoxazole ether ketone)

Under nitrogen atmosphere, 2.17 g of 4,4'-oxybis(-benzoyl chloride) and 1.25 g of 3,3'-diamino-4,4'-di dihydrochloride monohydrate are mixed with stirring with 49.4 g of 10-1 methanesulfonic acid solution The mixture is heated for 2 hours with stirring at about 70° C. and about 16 hours at about 0° C. PBO dope from Example 1(D) (9.79 g) is added and the reaction is continued with stirring for about 48 hours at 90° C. The reaction temperature is reduced to about 50° C. p-Diphenoxybenzene (0.965 g) is added and washed down with 43.7 g of 10-1 methanesulfonic acid solution. The reaction is continued for 72 hours at 50° C. The polymer is isolated as described in Example 2 and has an inherent viscosity of 10.8 dL/g.

Example 24

Block copolymer wherein PBO units of the thermoplastic polymer contain methyl substituents The procedure of Example 16 is followed using 2.80 g of 4,4'-oxybis(benzoyl chloride), 1 g of 2-methyl-4,6-diaminoresorcinol dihydrochloride, 76 g of tial 10-1 methanesulfonic acid solution, 11.5 g of PBO dope from Example 1(D) and 1.25 g of p-diphenoxybenzene washed down with 31.5 g of 10-1 methanesulfonic acid solution. The heating for 16 hours and 48 hours is at 95° C. rather than 90° C. The resulting polymer composition has an inherent viscosity of 7.01 dL/g.

Example 25

Block copolymer wherein the thermoplastic contains both AB- and AA-BB-PBO units

3-Amino-4-hydroxybenzoic acid hydrochloride monohydrate (3.06 g) and 1.57 g of 4,6-diaminoresorcinol dihydrochloride are mixed in 110.3 g of 10-1 methanesulfonic acid solution under nitrogen atmosphere. The mixture is heated for 24 hours at 90° C. 4,4'-Oxybis(benzoic acid) (4.77 g) is added and washed down with 14.0 g of 10-1 methanesulfonic acid solution. The mixture is heated for 2 hours at 70° C. and for 4 hours at 90° C. PBO dope from Example 1(D) (23.6 g) is added and the reaction is continued for 24 hours at 90° C. The mixture is cooled to about 50° C. p-Diphenoxybenzene (2.12 g) is added and washed down with 9.7 g of 10-1 methanesulfonic acid solution. The reaction is continued with stirring for about 64 hours at 50° C. The polymer is isolated as described in Example 2 and has an inherent viscosity of 8.88 dL/g.

Example 26

Block copolymer containing polybenzoxazole block and poly(aromatic ether ketone) thermoplastic block 4,4'-Oxybis(benzoyl chloride) (3.58 g) is dissolved in 70 ml of 10-1 methanesulfonic acid solution. The mixture is stirred for 1 hour at 70° C. PBO dope from Example 1(A) (17.5 g) is added and the mixture is stirred for 17 hours at 90° C. p-Diphenoxybenzene (3.10 g) is added and rinsed and down with 13.3 g of 10-1 methanesulfonic acid solution. The mixture is stirred for 48 hours at 50° C. The polymer is isolated as described in Example 2 and has an inherent viscosity of 2.16 dL/g.

Example 27

Fiber Synthesis and Tests

Fibers are spun from dopes according to the following procedure and the conditions indicated in Table 11 hereinafter. Dope produced in the indicated Example is placed in a Teflon TM -lined extrusion vessel and degassed for about 18 hours at 0.4 in. Hg pressure and about 80° C. The extrusion vessel is fitted with a Teflon TM piston and driving mechanism and, at the bottom, a spinnerette with an aperture of 5 to 10 mil (1 mil $=10^{-3}$ in ). The entire assembly is seated over a water bath with a variable air gap (AG) between the spinnerette and the bath, as indicated in Table II hereinafter. The water temperature is maintained at 20° C. to 26° C. and the water depth at 7–8 in. The temperature of the extrusion vessel and spinnerette are controlled as shown in Table II.

Pressure (P) is applied as shown in Table II, forcing dope out through the spinnerette. The dope drops across the air gap (AG) into the bath and coagulates as a fiber, which is transferred to a nylon spool and stretched to a maximum by spin-drawing as shown in Table II. The stretched fiber is washed for at least 48 hours, air dried for 4 hours and vacuum dried at 100 for 4 hours.

Ten samples of each fiber are mounted, measured and tested according to ASTM D-3379-75 using a paper tab and epoxy mounting method. The diameter of each sample is measured three times using a Nikon-Optiphot TM microscope and calibrated lens, and an average diameter taken. The tensile strength and modulus are tested at 22° C. to 24° C. and 52 percent to 55 percent humidity using an Instron 4201 TM tensile tester. The resulting curve is analyzed and the tensile strength, tensile modulus and percent elongation to break are calculated as outlined in ASTM D-3379-75.

The results are reported in Table II below wherein:

Example is the Example previously set out in which the dope was synthesized:

AG is the air gap between the spinnerette and the water bath in inches:

Temp is the temperature of the Die and extrusion vessel in ° C;

P is the extrusion pressure in psi;

SDR is the spin draw ratio, expressed as the length of the fiber after spin-drawing divided by the length of the fiber before spin-drawing:

Diam is the average diameter of the fiber in mil.;

T.M. is the tensile modulus of the fiber in msi (1 msi = 1,000,000 psi);

T.S. is the tensile strength of the fiber in ksi (1 ksi = 1,000 psi); and

Elong. is the percent elongation of the fiber before it breaks.

TABLE II

| | | | Spun Fibers & Properties | | | | | | |
|---|---|---|---|---|---|---|---|---|---|
| Sample | Example | A.G. | Temp | P | SDR | Diam | T.M. | T.S. | Elong. |
| 1 | 6 | 2⅝ | 70 | 30 | 2.40 | 2.26 | 4.08 | 64.95 | 13.15 |
| 2 | 6 | 2⅝ | 70 | 30 | 2.28 | 2.35 | 4.20 | 72.50 | 20 |
| 3 | 6 | 1 | 45 | 60 | 2.59 | 4.21 | 3.17 | 64.338 | |
| 4 | 6 | 2⅝ | 50 | 55 | 0 | 3.48 | 3.18 | 91.22 | |
| 5 | 7 | 4¼ | 70 | 40 | 2.17 | 2.40 | 3.50 | 70.30 | 20 |
| 6 | 7 | 4¼ | 70 | 40 | 2.34 | 2.34 | 4.51 | 70.80 | 11.5 |
| 7 | 7 | 7¾ | 80 | 30 | 1.84 | 1.99 | 3.01 | 60.52 | 25+ |
| 8 | 7 | 7¾ | 80 | 30 | 1.91 | 2.03 | 2.48 | 55.65 | 25+ |
| 9 | 12 | 3¼ | 80 | 50 | 3.11 | 2.96 | 3.73 | 79.53 | 21 |
| 10 | 12 | 3¼ | 80 | 50 | 2.89 | 2.99 | 3.06 | 77.43 | 16.81 |
| 11 | 12 | 3¼ | 80 | 45 | 2.68 | 2.69 | 4.00 | 88.00 | 17.9 |
| 12 | 12 | 3¼ | 90 | 47.5 | 1.66 | 1.98 | 3.73 | 77.44 | 11 |
| 13 | 12 | 2⅝ | 50 | 60 | 1.99 | 3.95 | 2.64 | 59.11 | 29+ |
| 14 | 12 | 3¼ | 80 | 45 | 2.44 | 2.6 | 4.5 | 75.8 | 16.6 |
| 15 | 11 | 4¼ | 80 | 20 | 1.54 | 1.95 | 3.59 | 58.60 | 10.4 |
| 16 | 13 | 2⅝ | 80 | 15 | 1.96 | 1.8 | 3.29 | 55.53 | 16.4 |
| 17 | 13 | 2⅝ | 80 | 15 | 2.32 | 1.67 | 3.68 | 63.83 | 15.18 |
| 18 | 14 | 2⅝ | 50 | 60 | 1.99 | 3.76 | 3.53 | 66.97 | |
| 19 | 15 | 2¼ | 80 | 53 | 2.3 | * | * | * | * |
| 20 | 15 | 3 | 80 | 75 | 2.0 | * | * | * | * |
| 21 | 15 | 3 | 80 | 75 | 2.02 | * | * | * | * |
| 22 | 16 | 2¼ | 80 | 22.5 | 1.51 | * | * | * | * |
| 23 | 19 | 2¼ | 100 | 125 | 2.38 | 3.93 | 7.14 | 79.46 | 13.73 |
| 24 | 19 | 2¼ | 100 | 125 | 2.04 | 4.15 | 3.84 | 58.76 | 18.57 |

*not tested
-most samples did not break

Certain fibers from Table II are heat-treated by drawing under tension through an 18-inch tubular oven at the temperature, under the atmosphere, and with the residence time shown in Table III, providing the additional spin-draw ratio shown in Table III. The properties of the heat-treated fibers are tested according to the previously set out procedure. The results are reported in Table III below wherein:

Sample identifies the Sample from Table II which is treated and tested;

T identifies the temperature of the oven in ° C;

Atm identifies the atmosphere in the oven:

Res. T. identifies the residence time of the fiber in the oven in minutes:

SDR identifies the spin draw ratio of the heat treated fiber, expressed as the length of the heat-treated fiber divided by the length of the untreated fiber from Table II:

Diam. is the diameter of the heat treated fiber; and all other columns have the meaning previously assigned.

TABLE III

| | | HEAT-TREATED FIBERS & PROPERTIES | | | | | |
|---|---|---|---|---|---|---|---|
| Sample | T | Atm | Res. t | SDR | Diam | T.M. | T.S. | Elong. |
| 2 | 400 | $N^2$ | 1.98 | 1.11 | 2.22 | 7.54 | 97.73 | 9 |
| 3 | 400 | $N^2$ | 1.98 | 1.21 | 3.73 | 6.95 | 95.93 | 7.2 |
| 5 | 300 | Air | 1.11 | 1.16 | 2.14 | 6.33 | 100.1 | 5.89 |
| 5 | 300 | Air | 0.5 | 1.10 | 2.35 | 6.00 | 92.41 | 7.3 |
| 7 | 400 | Air | 0.5 | 1.30 | 1.78 | 5.51 | 85.44 | 8.2 |
| 8 | 400 | Air | 0.5 | 1.22 | 1.69 | 4.85 | 78.27 | 9.9 |
| 12 | 400 | Air | 1.49 | 1.18 | 1.96 | 4.98 | 98.73 | 19 |
| 15 | 300 | Air | 1.50 | 1.00 | 1.95 | 4.23 | 75.38 | 11.9 |
| 18 | 400 | $N^2$ | 2.55 | 1.15 | 3.35 | 5.90 | 109.66 | |
| 18 | 400 | $N^2$ | 2.55 | 1.28 | 3.24 | 6.50 | 114.79 | |
| 18 | 400 | $N^2$ | 2.55 | 1.15 | 3.3 | 7.8 | 100.29 | 10.63 |
| 19 | 400 | $N^2$ | 3 | 1.14 | 2.96 | 24.7 | 174.3 | 2.6 |
| 20 | 400 | $N^2$ | 3 | 1.25 | 3.16 | 23.7 | 140.3 | 1.68 |
| 21 | 400 | $N^2$ | 3 | 1.25 | 3.19 | 19.6 | 149.5 | 4.5 |
| 22 | 400 | Air | 4.83 | 1.31 | 1.9 | 11.7 | 125.78 | 2.2 |
| 22 | 400 | Air | 4.62 | 1.37 | 1.88 | 11.95 | 124.60 | 2.56 |
| 22 | 400 | Air | 5.15 | 1.23 | 1.75 | 12.89 | 141.0 | 2.53 |
| 23 | 400 | Air | 4.01 | 1.14 | 3.44 | 13.97 | 130 | 4.43 |

-most samples did not break

Example 28

Film Casting and Properties

A dope solution is placed in an extrusion vessel, degassed and fitted with a piston as described in Example 27. A 1½ in. die with an adjustable gap is connected to the extrusion vessel by a stainless steel line The extrusion vessel, line and die are maintained at about 80° C. The die is seated above a 6 in. stainless steel drum roller which is partially submerged in a 3 ft. water trough with water at a temperature of about 24° C. Pressure is applied to the dope, forcing it out of the die onto the drum, which rotates to bring the extruded dope into contact with the water. The coagulated dope passes through three submerged idle rollers to a submerged take-up spool. The collected film is washed under water for at least 48 hours and cut into 4 ft. lengths which are wrapped onto glass tubes. The tubes are air dried for 24 hours and dipped in water to release. The tubes are then vacuum dried at 160° C. for 4 hours. In addition, samples 33 and 34 (hereinafter in Table IV) are heat-treated for 5 minutes at 300° C. and 400° C. respectively. Samples 36, 37, 38, 39 and 41 are stretched linearly along their long axes, and have a stretch ratio of 1.49, 1.49, 1.90, 2.7 and 2.0 respectively, expressed as the length of the film after stretching divided by its length before stretching.

The dried film is cut into strips and its tensile properties are tested according to ASTM D-882-83 using the equipment and conditions described in Example 27. The results are reported in Table IV below, wherein Example sets out the Example in which the dope was prepared;

P sets out the pressure used to extrude the dope in psi;

Die gap sets out the width of the gap in the extrusion die in mil.; and all other columns have the meanings assigned in Example 27.

TABLE IV

| | FILM EXTRUSION & PROPERTIES | | | | | |
|---|---|---|---|---|---|---|
| Sample | Example | P | Die Gap | T.S. | T.M. | Elong. |
| 25 | 18 | 100 | 4 | 49 | 1.8 | 29.8 |
| 26 | 18 | 100 | 4 | 26.7 | 0.77 | 18.3 |
| 27 | 18 | 100 | 4 | 16.7 | 0.80 | 11.1 |
| 28 | 18 | 100 | 4 | 18.7 | 0.65 | 8.75 |
| 28 | 18 | 79–108 | 4 | 24.4 | 1.00 | 13 |
| 30 | 18 | 79–108 | 4 | 27.4 | 1.3 | 21 |
| 31 | 18 | 79–108 | 4 | 20.2 | 0.84 | 15.6 |
| 32 | 18 | 79–108 | 4 | 29.0 | 1.07 | 31 |
| 33 | 18 | 79–108 | 4 | 40.7 | 1.79 | 14.2 |
| 34 | 18 | 79–108 | 4 | 33.6 | 1.68 | 12.6 |
| 35 | 18 | 79–108 | 4 | 23.8 | 0.9 | 25 |
| 36 | 18 | 79–108 | 4 | 46.3 | 2.5 | 14.3 |
| 37 | 18 | 79–108 | 4 | 39.5 | 4.3 | 5 |
| 38 | 20 | 50 | 4 | 18.8 | 0.77 | 3.63 |
| 39 | 20 | 50 | 4 | 30.3 | 1.55 | 3.98 |
| 40 | 21 | 95 | 5 | 41.8 | 1.09 | 39 |
| 41 | 21 | 95 | 5 | 79.6 | 6.27 | 10.7 |

Example 30

Synthesis of block copolymer comprising 70 percent cis-PBO rigid rod polymer and 30 percent thermoplastic PBZ/poly(aromatic ether sulfone) random copolymer A mixture of 0.30 g (1.41 mmoles) of 4,6-diaminoresorcinol di(hydrogen chloride) and 1.84 g (4.35 mmoles) of 1-(4-chlorocarbonylphenoxy)-4-(4-chlorosulfonylphenoxy)benzene prepared as in Example B is stirred under nitrogen atmosphere. A 94.16-g solution containing a 10-1 mixture by weight of methanesulfonic acid and phosphorus pentoxide is added, and the mixture is warmed to 70° C. for 2 hours. The temperature is raised to 90° C. for 16 hours. A 25.00-g portion of dope is added containing polyphosphoric acid and about 14 weight percent cis-PBO polymer which is made as described in Example 1 and has an inherent viscosity of 6.2 dL/g in methanesulfonic acid at 25° C. and a concentration of 0.05 g/dL. The reaction is continued for 48 hours at 90° C., and then cooled to 50° C. A 0.57-g (2.18 mmoles) portion of 1,4-diphenoxybenzene is added, followed by 41.03 g of methanesulfonic acid solution added in two portions 30 minutes apart. The reaction is continued at 50° C. for 72 hours. A small portion of dope is placed upon a microscope slide and quenched with water and dried in air to yield a film of good strength and integrity having no visible phase separation. A small quantity of the resulting block copolymer is isolated as described in Example 2 and has an inherent viscosity of 15 dL/g in methanesulfonic acid at 25° C. and 0.05 g/dL concentration.

EXAMPLE 31

Synthesis of block copolymer comprising 70 percent cis-PBO rigid rod polymer and 30 percent thermoplastic PBZ/poly(aromatic ether sulfone) random copolymer A mixture of 0.30 g (1.41 mmoles) of 4,6-diaminoresorcinol di(hydrogen chloride) and 1.84 g (4.35 mmoles) of 1-(4-chlorocarbonylphenoxy)-4-(4-chlorosulfonylphenoxy)benzene prepared as in Example B is stirred under nitrogen atmosphere. A 134.82-g solution containing a 10-1 mixture by weight of methanesulfonic acid and phosphorus pentoxide is added, and the mixture is warmed to 70° C. for 2 hours. The temperature is raised to 90° C. for 16 hours. A 25.00-g portion of dope is added containing polyphosphoric acid and about 14 weight percent cis-PBO polymer which is made as described in Example 1 and has an inherent viscosity of 6.1 dL/g in methanesulfonic acid at 25° C. and a concentration of 0.05 g/dL. The reaction is continued for 48 hours at 90° C., and then cooled to 50° C. A 0.57-g (2.18 mmoles) portion of 1,4-diphenoxybenzene is added, followed by 88.60 g of methanesulfonic acid solution added in two portions 30 minutes apart. The reaction is continued at 50° C. for 72 hours. A small portion of dope is placed upon a microscope slide and quenched with water and dried in air to yield a film of good strength and integrity having no visible phase separation. A small quantity of the resulting block copolymer is isolated as described in Example 2 and has an inherent viscosity of 9.30 dL/g in methanesulfonic acid at 25° C. and 0.05 g/dL concentration.

EXAMPLE 32

Synthesis of block copolymer using diphenyl ether as a reagent in the place of 1,4-diphenoxybenzene.

A mixture of 0.30 g (1.41 mmoles) of 4,6-diaminoresorcinol di(hydrogen chloride) and 1.84 g (4.35 mmoles) of 1-(4-chlorocarbonylphenoxy)-4-(4-chlorosulfonylphenoxy)benzene prepared as in Example B is stirred under nitrogen atmosphere. A 99.55-g solution containing a 10-1 mixture by weight of methanesulfonic acid and phosphorus pentoxide is added, and the mixture is warmed to 70° C. for 2 hours. The temperature is raised to 90° C. for 16 hours. A 25.00-g portion of dope is added containing polyphosphoric acid and about 14 weight percent cis-PBO polymer which is made as described in Example 1 and has an inherent viscosity of 6.1 dL/g in methanesulfonic acid at 25° C. and a concentration of 0.05 g/dL. The reaction is continued for 48 hours at 90° C., and then cooled to 50° C. A 0.37-g (0.35 ml; 2.18 mmoles) portion of diphenyl ether is added, followed by 36.45 g of 10-1 methanesulfonic acid solution. The reaction is continued at 50° C. for 72 hours. A small portion of dope is placed upon a microscope slide and quenched with water and dried in air to yield a film of good strength and integrity having no visible phase separation. A small quantity of the resulting product is isolated as described in Example 2 and has an inherent viscosity of 6.65 dL/g in methanesulfonic acid at 25° C. and 0.05 g/dL concentration.

EXAMPLE 33

Synthesis of block copolymer comprising 70 percent cis-PBO rigid rod polymer and 30 percent thermoplastic PBZ/poly-aromatic ether sulfone) random copolymer A mixture of 0.30 g (1.41 mmoles) of 4,6-diaminoresorcinol di(hydrogen chloride) and 1.84 g (4.35 mmoles) of 1-(4-chlorocarbonylphenoxy)-4-(4-chlorosulfonylphenoxy)benzene prepared as in Example B is stirred under nitrogen atmosphere. A 139.14-g portion of polyphosphoric acid containing 76.7 percent $P_2O_5$ by weight is added, and the mixture is warmed to 70° C. for 2 hours. The temperature is raised to 90° C. for 16 hours, and then 55.61 g of $P_2O_5$ is added in five portions each 5 minutes apart. After 6 hours, 25.00 g of dope is added containing polyphosphoric acid (about 82.5 percent $P_2O_5$) and about 14 weight percent cis-PBO polymer which is made as described in Example 1 and has an inherent viscosity of 6 dL/g in methanesulfonic acid at 25° C. and a concentration of 0.05 g/dL. The reaction is continued for 48 hours at 90° C., and then cooled to 50° C. A 0.57-g (2.18 mmoles) portion of 1,4-diphenoxybenzene is added, followed by 28.30 g of polyphosphoric acid containing 76.7 percent $P_2O_5$ The reaction is warmed to 90° C. and continued for 72 hours. A small portion of dope is placed upon a microscope slide and quenched with water and dried in air to yield a film of good strength and integrity having no visible phase separation. A small quantity of the resulting product is isolated as described in Example 2 and has an inherent viscosity of 8.84 dL/g in methanesulfonic acid at 25° C. and 0.05 g/dL concentration.

EXAMPLE 34

Preparation of Fiber Samples from block copolymer containing 70 percent rigid rod cis-PBO and 30 percent thermoplastic cis-PBO/poly(aromatic ether sulfone) random copolymer The dope prepared in Example 33 is extruded as described in Example 27 through an aperture having 5 mil diameter under 40 psi pressure at ambient temperature across an air gap into deionized water. After soaking for 30 minutes, the fiber is drawn to 152 percent of its former length, soaked in fresh deionized water for 16 hours, dried in air for 2 hours and dried in vacuum at 100° C. for 1 hour. The drawn fiber is heat treated at 400° C. as described in Example 27 to provide an additional stretching equal to 19 percent of the initial length of the fiber.

The properties of fiber samples are tested before stretching, after stretching but before heat treatment, and after heat treatment. The tensile strength is 34 ksi before stretching, 40 ksi after stretching and 125 ksi after heat treatment. The tensile modulus is 1.4 before stretching, 3.1 after stretching and 9.1 msi after heat treatment. The elongation to break is 33 percent before stretching, 5.5 percent after stretching and 2.5 percent after heat treatment.

EXAMPLE 35

Preparation of block copolymer containing 70 percent rigid rod cis-PBO and 30 percent thermoplastic aryl-aliphatic polyamide An aryl-aliphatic polyamide terminated by active end groups is synthesized by the following procedure. A mixture of 10.06 g (47.2 mmoles) of isophthaloyl dichloride and 1.80 g (5.56 mmoles) of phenoxyphenoxybenzoyl chloride from Example C is dissolved in 100 ml of methylene chloride. A mixture of 5.81 g (50.0 mmoles) of hexamethylenediamine and 10.6 g (100 mmoles) of anhydrous sodium carbonate is dissolved in 250 ml of deionized water. The second mixture is stirred rapidly and the first mixture is added. The mixture is stirred for 10 minutes, and the resulting aryl-aliphatic polyamide is filtered. The polyamide is washed with water 5 times and dried under vacuum at 100° C. The recovered polyamide weighs 12.27 g. It has an inherent viscosity of 0.90 dL/g in m-cresol at 25° C. and a concentration of 0 4996 g/dL.

A mixture of 1.08 g (3.67 mmoles) of oxybis(4-benzoyl chloride) and 69.0 g of 10-1 methanesulfonic acid (MSA) solution is agitated under nitrogen atmosphere. The mixture is heated for 2 hours at 70° C. and for 16 hours at 90° C. A 30.0-g quantity of cis-PBO dope from Example 1(G) is added, and the reaction is continued at 90° C. for 48 hours. The temperature is lowered to 50° C., and 1.80 g of the functionally terminated polyamide is added and washed down with 22.8 g of 10-1 M solution. The reaction is continued at 50° C. for 48 hours. A 0.63-g (2.38 mmoles) quantity of p-diphenoxybenzene is added and washed down with 26.5 g of 10-1 MSA solution. The reaction is continued for 48 hours at 50° C.

The resulting block copolymer is coagulated, washed until neutral, dried, ground, rewashed and dried. A DSC analysis shows a weak glass transition temperature at about 140° C. The block copolymer has an inherent viscosity of 9.6 dL/g in MSA at 25° C. and a concentration of 0.0444 g/dL.

EXAMPLE 39

Preparation of block copolymer containing 50 percent rigid rod cis-PBO and 50 percent thermoplastic aryl-aliphatic polyamide The functionally-terminated polyamide of Example 35 is used. The process of Example 35 is repeated using 0.59 g (2.01 mmoles) of oxybis(benzoyl chloride), 55 g of initial 10-1 MSA solution, 16.43 g of cis-PBO dope containing 2.30 g (0.502 mmole) of PBO, 2.30 g (0.471 mmole) of polyamide washed down with 26.3 g of 10-1 MSA solution, and 0.27 g (1.04 mmoles) of diphenoxybenzene. The polymer has an inherent viscosity of 8.9 dL/g in MSA at 25° C. and a concentration of 0.0500 g/dL.

EXAMPLE 37

Preparation of block copolymer containing 70 percent rigid rod cis-PBO and 30 percent thermoplastic aryl-aliphatic polyamide A functionally-terminated aryl-aliphatic polyamide containing both meta and para phenylene moieties is synthesized by the following procedure. A mixture of 6.92 g (34.1 mmoles) of isophthaloyl dichloride, 2.31 g (11.4 mmoles) of terephthaloyl chloride and 2.95 g (9.09 mmoles) of phenoxyphenoxybenzoyl chloride is dissolved in 100 ml of methylene chloride. A mixture of 5.81 g (50.0 mmoles) of hexamethylenediamine and 10.6 g (100 mmoles) of anhydrous sodium carbonate is dissolved in 250 ml of deionized water. The first solution is added with rapid stirring to the second. After 10 minutes, the resulting functionally-terminated polyamide is filtered. The polyamide is washed with water in the blender and filtered 5 times. The polyamide is dried overnight. The recovered polyamide weighs 13.35 g and has an inherent viscosity of 0.77 dL/g in moresol at 25° C. and a concentration of 0.4968 g/dL.

The procedure of Example 35 is followed using 1.08 g (3.67 mmoles) of oxybis(benzoyl chloride), 71.4 g of initial 10-1 MSA solution, 30.0 g of cis-PBO dope from Example 1(G), 1.80 g of the polyamide synthesized above and washed down with 24.2 g of 10-1 MSA solution, and 0.57 g of p-diphenoxybenzene washed down with 22.7 g of 10-1 MSA solution. The resulting polymer has an inherent viscosity of 10.2 dL/g in methanesulfonic acid at 25° C. and a concentration of 0.0492 g/dL.

EXAMPLE 38

Preparation of block Copolymer containing 50 percent rigid rod cis-PBO and 50 percent thermoplastic aryl-aliphatic polyamide The process of Example 37 is repeated using 0.59 g (2.01 mmoles) of oxybis(benzoyl chloride), 50.1 g of 10-1 MSA solution, 16.43 g of cis-PBO dope from Example 1(G), 2.30 g of functionally-terminated polyamide washed down with 15.9 g of 10-1 MSA solution, and 0.20 g (0.752 mmole) of p-diphenoxybenzene washed down with 30.3 g of 10-1 MSA solution. The dope forms a clear tough film, whereas the physical mixture of polyamide and PBO precipitates as an opaque weak film. The resulting block copolymer has an inherent viscosity of 7.7 dL/g at 25° C. and a polymer concentration of 0.0468 g/dL

EXAMPLE 39

Preparation of block copolymer containing 50 percent rigid rod cis-PBO and 50 percent thermoplastic aryl-aliphatic polyamide The procedure of Example 37 is repeated. First, a polyamide is synthesized having a calculated number average molecular weight of 2417.1, by the reaction of 6.66 g (32.8 mmoles) of isophthaloyl dichloride, 2.21 g (10.9 mmoles) of terephthaloyl chloride and 4.06 g (12.5 mmoles) of phenoxyphenoxybenzoyl chloride in 100 ml of methylene chloride, with 5.81 g (50.0 mmoles) of hexamethylenediamine and 10.6 g (100 mmoles) of sodium carbonate in 250 ml of deionized water. The resulting polyamide has an inherent viscosity of 0.61 dL/g in m-cresol at a concentration of 0.5344 g/dL and a temperature of 25° C. A block copolymer is formed using 1.41 g (4.80 mmoles) of oxybis(benzoyl chloride), 72.1 g of initial 10-1 MSA solution, 21.4 g of cis-PBO/-polyphosphoric acid dope containing 3 g of cis-PBO polymer having an intrinsic viscosity of 3.6 dL/g in methanesulfonic acid, 3.00 g of polyamide washed down with 24.6 g of 10-1 MSA solution, and 0.62 g of p-diphenoxybenzene washed down with 18.9 g of 10-1 MSA solution. The resulting block copolymer has an inherent viscosity of 5.7 dL/g in methanesulfonic acid at 25° C. and a concentration of 0.0460 g/dL.

EXAMPLE 40

Preparation of block copolymer containing 50 percent rigid rod cis-PBO and 50 percent thermoplastic aryl-aliphatic polyamide The procedure of Example 39 is repeated, except that the solvent for isophthaloyl chloride, terephthaloyl chloride and phenoxyphenoxybenzoyl chloride is 40 ml of N,N-dimethylacetamide, and the hexamethylenediamine is dissolved in 50 ml of N,N-dimethylacetamide with 10.12 g of triethylamine. The mixture is kept at 0° C. for 30 minutes and allowed to warm to room temperature for about 3 hours. The resulting polymer has an inherent viscosity of 0.18 dL/g in m-cresol at 25° C. and a concentration of 0.4932 g/dL. The resulting block copolymer, synthesized using identical reagents to Example 39, has an inherent viscosity of 8.00 dL/g in methanesulfonic acid at 25° C. and a concentration of 0.0440 g/dL.

EXAMPLE 41

Preparation of block copolymer containing 5 percent rigid rod cis-PBO and 95 percent thermoplastic aryl-aliphatic polyamide The process of Example 40 is repeated using 21.72 g of isophthaloyl chloride, 7.25 g of terephthaloyl chloride and 4.64 g of phenoxyphenoxybenzoyl chloride dissolved in 150 ml of N,N-dimethylacetamide; and 17.43 g of hexamethylenediamine and 30.36 g of triethylamine dissolved in 250 ml of N,N-dimethylacetamide. The recovered polyamide weighs 34.87 g and has an inherent viscosity of 0.26 dL/g in m-cresol at 25° C. and a concentration of 0.5080 g/dL.

A mixture of 0.21 g (0.720 mmole) of oxybis(benzoyl chloride) and 92.7 g of 10-1 MSA solution is heated with stirring for 2 hours at 70° C. under nitrogen atmosphere. A 1.43-g quantity of cis-PBO dope from Example 1(L) is added, and the reaction is continued at 0° C. for 72 hours. The temperature is reduced to 50° C., and 3.80 g of functionally-terminated polyamide is added and washed down with 36.4 g of 10-1 MSA solution. The reaction is continued at 50° C. for 72 hours. The resulting block copolymer has an inherent viscosity of 2.6 dL/g in methanesulfonic acid at a temperature of 25° C. and a concentration of 0.110 g/dL.

EXAMPLE 42

Synthesis of block copolymer containing cis-PBO block and polybenzoxazole/poly(aromatic ether ketone)/polyamide terpolymer block An NN-monomer containing amide moieties is synthesized by the following process. A mixture of 2.33 g of 1,12-diaminododecane dissolved in 150 ml of N,N-dimethylacetamide is warmed to 70° C. and then cooled. At 50° C., 7.52 g of phenoxyphenoxybenzoyl chloride is added and washed down with 30 ml of N,N-dimethylacetamide. A 3.3-ml quantity of pyridine is added. The mixture is stirred at room temperature for about 16 hours. The resulting white powdery precipitate is washed with dilute acid, filtered, washed with dilute sodium bicarbonate, filtered and washed with water 3 times. It is dried at room temperature under vacuum, and has a weight of 8.2 g. It is recrystallized from about 220 ml of hot dimethylformamide and dried at room temperature under vacuum. The yield is 6.9 g.

A mixture of 0.58 g (2.7 mmoles) of 4,6-diaminoresorcinol bishydrochloride and 1.79 g (6.06 mmoles) of oxybis(benzoyl chloride) and 101.63 g of 10-1 MSA solution is heated for 2 hours at 70° C. under nitrogen atmosphere and for 20 hours at 90° C. A 10.71quantity of cis-PBO dope from Example 1(L) is added, and heating is continued at 90° C. for 48 hours. The temperature is reduced to 50° C., and 2.35 g of NN-monomer previously prepared is added. The NN-monomer is washed down with 50.7 g of 10-1 MSA solution, and heating is continued at 50° C. for 72 hours. The resulting dope can be cast and coagulated as a clear strong amber film. It has an inherent viscosity of 12.0 dL/g in methanesulfonic acid at 25° C. and a concentration of 0.048 g/dL.

EXAMPLE 43

Synthesis of block copolymer containing 90 percent rigid rod cis-PBO block and 10 percent thermoplastic PEK-PBO block Under nitrogen atmosphere, 0.11 g (0.516 mmole) of 4,6-diaminoresorcinol bishydrochloride and 0.77 g (2.61 mmoles) of oxybis(4-benzoyl chloride) are mixed with 75.0 g of 10-1 MSA solution. The mixture is stirred for 2 hours at 70° C. and for 16 hours at 90° C. A 25.7-g quantity of cis-PBO dope from Example 1(J) is added, and stirring is continued at 90° C. for 48 hours. A 0.34-g quantity of p-diphenoxybenzene is added and washed down with 32.2 g of 10-1 MSA solution. The mixture is heated at 50° C. for 72 hours. The resulting block copolymer has an inherent viscosity of 14.4 dL/g in methanesulfonic acid at 25° C. and a concentration of 0.0478 g/dL.

EXAMPLE 44 synthesis of block copolymer containing 5 percent rigid rod cis-PBO block and 95 percent thermoplastic PEK-PBO block Under nitrogen atmosphere, 1.69 g of 4,6 -diaminoresorcinol bishydrochloride and 4.72 g of oxy-bis-(4-benzoyl chloride) are mixed with 56.0 g of 10-1 MSA solution. The mixture is heated with stirring for 2 hours at 70° C. and for 24 hours at 90° C. A 2.42-g quantity of cis-PBO dope from Example 1(J) is added, stirring is continued at 90° C. for 24 hours. The temperature is lowered to 50° C. A 2.10-g quantity of p-diphenoxybenzene is added and washed down with 33.7 g of 10-1 MSA solution. The reaction is heated at 50° C. for 72 hours. The resulting polymer has an inherent viscosity of 9.02 dL/g in methanesulfonic acid at 25° C. and a concentration of 0.0528 g/dL.

EXAMPLE 45

Synthesis of block copolymer containing 70 percent rigid rod cis-PBO block and 30 percent thermoplastic PEK-PBO using monofunctional terminator A mixture of 0.39 g of 4,6-diaminoresorcinol bishydrochloride, 1.64 g of oxybis(4-benzoyl chloride) and 0.036 g of benzoic acid is dissolved in 92.0 g of 10-1 MSA solution under nitrogen atmosphere. The mixture is heated for 2 hours at 70° C. and for 20 hours at 90° C. A 25.0-g quantity of cis-PBO dope from Example 1(K) is added, and stirring is continued at 90° C. for 48 hours. The temperature is lowered to 50° C. A 0.65-g quantity of p-diphenoxybenzene is added and washed down with 48.1 g of 10-1 MSA solution. The mixture is heated with stirring under nitrogen atmosphere at 50° C. for 72 hours. The title block copolymer is recovered and has an inherent viscosity of 6.76 dL/g in methanesulfonic acid at 25° C. and a concentration of 0.0472 g/dL.

EXAMPLE 46

Synthesis of block copolymer containing cis-PBO block and PEK-PBO block in trifluoromethanesulfonic acid A mixture of 1.30 g of 4,6-diaminoresorcinol bishydrochloride, 3.65 g of 4,4'-biphenylbis(carboxylic acid chloride) and 12.5 g of $P_2O_5$ is dissolved in 100 g of trifluoromethanesulfonic acid. The mixture is heated under nitrogen atmosphere with stirring for 1 hour at room temperature, for 2 hours at 70° C. and for 16 hours at 90° C. A 14.5-g quantity of cis-PBO dope from Example 1(J) is added and stirring is continued at 90° C. for 48 hours. The temperature is lowered to 50° C. A 1.71-g quantity of p-diphenoxybenzene is added and washed down with 25.5 g of 10-1 MSA solution. The mixture is heated with at 50° C. for 72 hours. The title block copolymer is recovered and has an inherent viscosity of 2.74 dL/g in methanesulfonic acid at 25° C. and a concentration of 0.046 g/dL.

EXAMPLE 47

Synthesis of block copolymer containing rigid rod cis-PBO block and thermoplastic PEK-PBO block wherein all reagents are added at the beginning Under nitrogen atmosphere, 1.25 g of 4,6-diaminoresorcinol bishydrochloride, 3.71 g of oxybis(4-benzoyl chloride), 1.65 g of p-diphenoxybenzene, and 4.50 g of cis-PBO dope from Example 1(J) are dissolved in 100 g of 10-1 MSA solution. The mixture is heated with stirring for 16 hours at 50° C. and 37.3 g of 10-1 MSA solution is added. The temperature is raised to 95° C. and maintained there for 72 hours. The resulting polymer has an inherent viscosity of 5.32 dL/g in methanesulfonic acid at 25° C. and a concentration of 0.0480 g/dL.

EXAMPLE 48

Synthesis of block copolymer containing rigid rod cis-PBO block and thermoplastic PEK-PBO block, both blocks having pendant methyl groups 2-Methyl-4,6-diaminoresorcinol bishydrochloride is prepared from 2-methylresorcinol according to the process described in U.S. Pat. No. 4,766,244, which is incorporated herein by reference. A rigid rod random copolymer containing pendant methyl moieties is synthesized by the following procedure. Under nitrogen atmosphere, 3.52 g of 4,6-diaminoresorcinol bishydrochloride, 3.75 g of 2-methyl-4,6-diaminoresorcinol bishydrochloride, and 6.36 g of terephthaloyl chloride are dispersed in 30.0 g of polyphosphoric acid. The mixture is heated at 45° C. for 16 hours and at 95° C. for 8 hours. Two 8.4-g quantities of $P_2O_5$ are added, and heating is continued for 16 hours at 150° C. and for 24 hours The resulting random copolymer containing pendant methyl moieties has an inherent viscosity of 14.0 dL/g in methanesulfonic acid at 25° C. and a concentration of 0.0488 g/dL.

Under nitrogen atmosphere, 1.05 g of 4,6-diaminoresorcinol bishydrochloride and 3.11 g of oxybis(4 -benzoyl chloride) are dissolved in 79 g of 10-1 MSA solution. The resulting mixture is heated for 2 hours at 70° C. and for 20 hours at 90° C. A 12.21-g quantity of random copolymer containing pendant methyl moieties is added and the resulting mixture is heated for 48 hours at 90° C. A 1.38-g quantity of p-diphenoxybenzene is added and washed down with 37.2 g of 10-1 MSA solution. The resulting mixture is heated for 72 hours. The title polymer has an inherent viscosity of 8.55 dL/g in methanesulfonic acid at 25° C. and a concentration of 0.0512 g/dL.

EXAMPLE 49

Synthesis of block copolymer containing rigid rod cis-PBO block and thermoplastic polyimide/polyamide/poly(aromatic ether ketone) terpolymer blocks An NN-monomer containing imide and amide moieties is synthesized by the following procedure. Under nitrogen atmosphere, 4.37 g of trimellitic anhydride acid chloride and 7.69 g of 4-phenoxyaniline are mixed with stirring with 100 ml of N-methylpyrrolidinone. A -ml quantity of pyridine is added and the mixture is stirred overnight at room temperature. A 50-ml quantity of toluene is added, and toluene and water are azeotropically distilled off. The mixture is cooled and poured over ice water to precipitate the product. The product is collected, washed, dried, and recrystallized from a 2 mixture of hot N,N-dimethylformamide/methanol. The product conforms to the structure shown in FIG. 50.

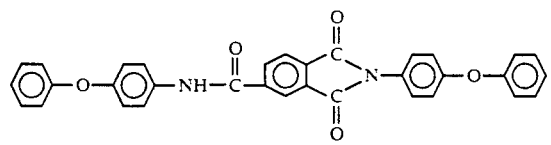

Under nitrogen atmosphere, 0.82 g of oxybis(4-benzoyl chloride) is dissolved in 100 g of 10-1 MSA solution. The mixture is heated for 2 hours at 70° C. A 25-g quantity of cis-PBO dope from Example 1(M) is added, and the reaction is continued at 90° C. for 48 hours. The temperature is reduced to 50° C., and a 1.05-g quantity of the NN-monomer illustrated in Formula 50 is added. The reaction is continued at 50° C. for 72 hours. A film which is cast from the reaction mixture, coagulated and washed with water, and soaked with dilute ammonium hydroxide, washed with water and dried is clear and amber-colored with strength.

The procedure is repeated using 1.77 g of oxybis(4-benzoyl chloride), 2.95 g of NN-monomer, 12.86 g of PBO dope and a total of 133 g of 10-1 MSA solution, to form a block copolymer containing 30 percent PBO and 70 percent thermoplastic polymer. A film is cast as previously described and analyzed by DSC. The first scan shows a broad endotherm at 130° C. and the second scan shows a sharp glass transition temperature at 221.7° C. The film removed from the DSC pan remains clear and has welded together where folded over. The polymer has an inherent viscosity of 7.29 dL/g in methanesulfonic acid at 25° C. and a concentration of 0.046 g/dL.

EXAMPLE 50 synthesis of block copolymer containing polybenzimidazole block and thermoplastic PEK/PBO block A dope containing polybenzimidazole is synthesized from 3,3′,4,4′-tetraaminobiphenyl and isophthalic acid in polyphosphoric acid according to procedures similar to those described in Example 1. Under nitrogen atmosphere, 16.67 g of the dope containing 1 g of PBI polymer, 0.79 g of 4,6-diaminoresorcinol bishydrochloride and 2.28 g of oxybis(4-benzoyl chloride) are dissolved in 38.6 g of 10-1 MSA solution. The solution is heated for 40 hours at 90° C. The temperature is reduced to 50° C. A 1.01-g quantity of p-diphenoxybenzene is added and washed down with 8.3 g of 10-1 MSA solution. The reaction is continued at 50° C. for 72 hours. A film of the title block copolymer cast from the dope and coagulated is clear gold colored and moderately strong. The film is given two DSC scans. The second shows a weak broad glass transition temperature at about 200° C. The polymer has an inherent viscosity of 4.37 dL/g in methanesulfonic acid at 25° C. and a concentration of 0.0454 g/dL.

EXAMPLE 51

Synthesis of block copolymer containing rigid rod PBT block and thermoplastic PEK/PBT block A rigid rod PBT block terminated by o-aminothiol moieties is synthesized by the following procedure. A mixture of 5.50 g of 2,5-diamino-1,4-benzenedithiol bishydrochloride, 4.33 g of terephthaloyl chloride and 22.7 g of polyphosphoric acid containing 76.4 weight percent $P_2O_5$ is heated with agitation under nitrogen atmosphere at 45° C. for 16 hours. The temperature is raised to 95° C. and two 6.3-g quantities of P are added. The reaction mixture is stirred at 95° C. for 8 hours, at 150° C. for 16 hours and at 190° C. for 24 hours The resulting polymer has an inherent viscosity of 7.49 dL/g in methanesulfonic acid at 25° C. and a concentration of 0.0502 g/dL.

Under nitrogen atmosphere, 0.73 g of 2,5-diamino-1,4-benzenedithiol bishydrochloride, 2.03 g of oxybis(4-benzoyl chloride), and 89.7 g of 10-1 MSA solution are stirred for 2 hours at 70° C. and for 16 hours at 90° C. A 17.86-g quantity of the PBT dope described previously is added and the mixture is stirred for 48 hours at 90° C. The temperature is reduced to 50° C. A 0.90-g quantity of p-diphenoxybenzene is added and washed down with 56.5 g of 10-1 MSA solution The reaction is continued at 50° C. for 72 hours. The resulting block copolymer has an inherent viscosity of 17.8 dL/g in methanesulfonic acid at 25° C. and a concentration of 0.048 g/dL.

EXAMPLE 52

Synthesis of block copolymer containing nonrigid jointed PBO sulfone block and poly(aromatic ether sulfone) thermoplastic block Under nitrogen atmosphere, a mixture of 9.43 g of 3,3′-diamino-4,4′-dihydroxydiphenylsulfone bishydrochloride monohydrate, 6.98 g of oxybis(4-benzoyl chloride), and 56.9 g of polyphosphoric acid containing 76.8 weight percent $P_2O_5$ are heated with mechanical stirring at 45° C. for 16 hours. The temperature is raised to 95° C. and three 15.2-g quantities of $P_2O_5$ are added. The reaction mixture is continued at 95° C. for 8 hours, at 150° C. for 16 hours and at 190° C. for 24 hours. The resulting polymer has an inherent viscosity of 0.45 dL/g in methanesulfonic acid at 25° C. and a concentration of 0.1936 g/dL.

Under nitrogen atmosphere, 35.0 g of the dope containing jointed PBO polymer described previously, and 0.45 g of 1-(4-carbonyl chloride-phenoxy)-4-(4-sulfonyl chloride-phenoxy)benzene synthesized as described in Example D are dissolved in 18.2 g of 10-1 MSA solution. The mixture is stirred for 48 hours at 90° C. and the temperature is lowered to 50° C. A 0.99-g quantity of chloride and 0.85 g of p-diphenoxybenzene are added and washed down with 18.3 g of trifluoromethanesulfonic acid. The reaction mixture is heated at 50° C. for 72 hours. The resulting polymer has an inherent viscosity in sulfuric acid of 0.39 dL/g at 25° C. and a concentration of 0.1952 g/dL. A film is cast from the dope and the polymer is coagulated. A first DSC scan of the film shows a complex series of peaks, and a second DSC scan shows a broad glass transition temperature centered at about 216° C. The foregoing reaction follows on average the reaction illustrated in Formula 51.

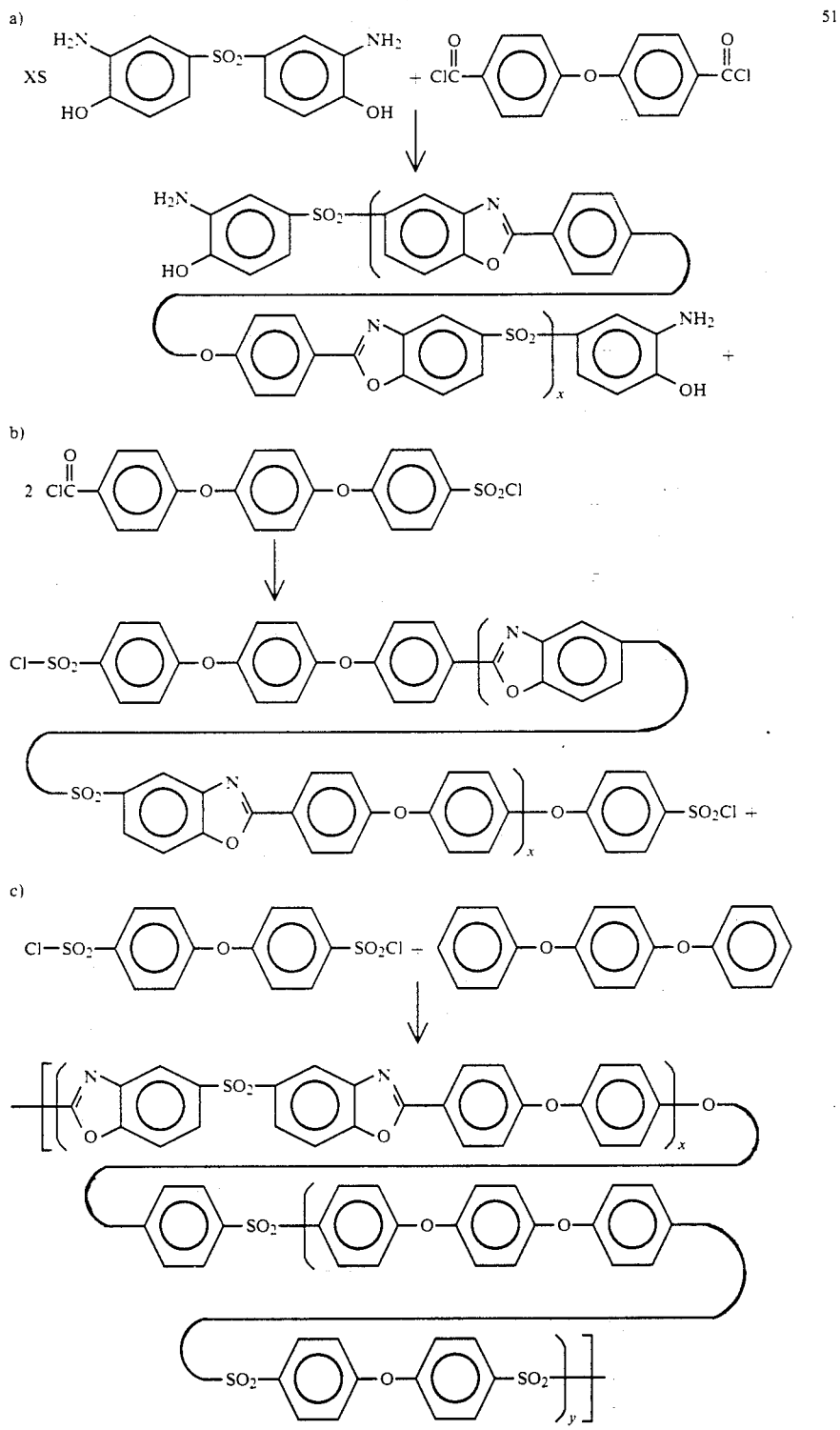

EXAMPLE 53

Synthesis of block copolymer containing cis-PBO blocks and poly-(aromatic ether ketone) blocks Under nitrogen atmosphere, 1.14 g of oxybis(4-benzoyl chloride) and 96.3 g of 10-1 MSA solution are heated for 2 hours for 70° C. The temperature is raised to 90° C. and 25 g of cis-PBO dope from Example 1(M) is added. The reaction is continued for 48 hours at 90° C., and then the mixture is cooled to 50° C. A 0.81-g quantity of p-diphenoxybenzene is added and washed down with 43.9 g of 10-1 MSA solution. The reaction is continued at 50° C. for 72 hours. The title block copolymer is recovered and has an inherent viscosity of 11.0 dL/g in methanesulfonic acid at 25° C. and a concentration of 0.0488 g/dL.

EXAMPLE 54

Synthesis of block copolymer containing 70 percent cis-PBO block and 30 percent PEK-PBO block Under nitrogen atmosphere, a mixture of 0.39 g of 4,6-diaminoresorcinol bishydrochloride, 1.54 g of oxybis(4-benzoyl chloride), and 66.5 g of 10-1 MSA solution is stirred for 2 hours at 70° C. and 22 hours at ° C. A 25.0-g quantity of cis-PBO dope from Example (J) is added and the reaction is continued at 90° C. for hours. The temperature is lowered to 50° C. A 0.69-g quantity of p-diphenoxybenzene is added and rinsed down with 49.8 g of 10-1 MSA solution. The reaction is continued at 50° C. for 72 hours. The resulting block copolymer has an inherent viscosity of 19.5 dL/g in methanesulfonic acid at 25° C. and a concentration of 0.0474 g/dL.

EXAMPLE 55

Synthesis of block copolymer containing cis-PBO blocks and thermoplastic poly(aromatic ether ketone) blocks containing perfluorocyclobutane moieties The compound 1,2-bis-(p-oxybenzoyl chloride) -perfluorocyclobutane is synthesized according to the following procedure.

(1) A mixture of 150 ml of toluene, 76.1 g of methyl 4-hydroxybenzoate, 61.72 g of potassium t-butoxide, and 300 ml of dimethyl sulfoxide is heated to distill off toluene and t-butanol. The mixture is cooled to about 75° C., and 259.83 g of 1,2--dibromo-tetrafluoroethane is added dropwise. The mixture is added to 2.5 ml of water and extracted with methylene chloride, which is water washed. The solvent is stripped off, and methyl 4-(2-bromo-1,1,2,2--tetrafluoroethoxy)benzoate is recovered.

(2) A 228-g quantity of the product of step (1) dissolved in about 200 ml of 1,4-dioxane is added dropwise to a refluxing mixture of 800 ml of dioxane and 45 g of zinc. Excess zinc is filtered off and about 1 liter of hexane is added. The organic layer is washed with water, and methyl 4-(1,2,2-trifluoroethene-oxy)benzoate is recovered.

(3) A mixture of 103.57 g of the product of step 2 and 250 ml of 1,2,4-trichlorobenzene is heated at 230° C. until the product of step 2 is substantially cyclized. The 1,2,4-trichlorobenzene is distilled off under vacuum. A 33-g quantity of the cyclized diester is hydrolyzed by reaction with 17.1 g of a 50 percent sodium hydroxide solution in 225 ml of methanol and 125 ml of water at reflux. The solution is acidified with concentrated hydrochloric acid to precipitate the diacid product, which is recrystallized from acetic acid. The diacid product is refluxed with excess thionyl chloride and a trace of N,N-dimethylformamide to generate the acid halide. The thionyl chloride is distilled off, and the title product is recrystallized from pentane. compound has the structure illustrated in Formula 52.

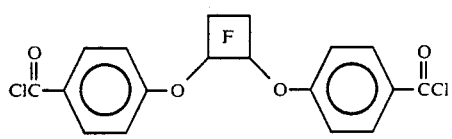

52

Under nitrogen atmosphere, 1.43 g of the perfluorocyclobutane-containing di(acid halide) compound described previously, and 100.0 g of 10-1 MSA solution are heated for 16 hours at 90° C. A 25.0-g quantity of cis-PBO dope from Example 1(M) is added and the reaction is continued for 48 hours at 90° C. The temperature is lowered to 50° C. A 0.59-g quantity of p-diphenoxybenzene is added and washed down with 40.2 g of 10-1 MSA solution. The reaction is continued at 50° C. for 72 hours. The resulting polymer has an inherent viscosity of 10.1 dL/g in methanesulfonic acid at 25° C. and a concentration of 0.0476 g/dL.

EXAMPLE 56

Synthesis of block copolymer containing rigid rod cis-PBO blocks and polyquinoxaline blocks The monomer 1,4-bis-(p-benziloxy)benzene (p-BOB) is synthesized according to the following procedure.

(a) A mixture of 25 g of 4-nitrophenylacetic acid, 40 ml of methylene chloride and 50 ml of thionyl chloride is mixed and heated to reflux under nitrogen atmosphere. After about 4 hours, when evolution of hydrogen chloride has essentially stopped, volatile components are removed by rotary evaporation and thionyl chloride is removed under vacuum. 4-Nitrophenylacetyl chloride is recovered.

(b) A mixture of 28 g of 4-nitrophenylacetoyl chloride in 100 ml of benzene is added under nitrogen atmosphere to a mixture of 20.27 g of anhydrous aluminum chloride in 150 ml of benzene. The mixture is heated at reflux under nitrogen atmosphere overnight. The reaction mixture is poured over ice and is rinsed with methylene chloride and 10 percent aqueous hydrochloric acid. Sufficient methylene chloride is added to bring the total quantity to 800 ml. The organic layer is washed with aqueous hydrochloric acid, water, dilute aqueous sodium hydroxide and more water. The organic layer is dried by magnesium sulfate and filtered. The solvent is removed by rotary evaporation, and the resulting product is recrystallized from a mixture of ethanol and benzene. The product is 4-nitrobenzyl phenyl ketone.

(c) A mixture of 6.34 g of 4-nitrobenzyl phenyl ketone and 50 ml of ethyl acetate is placed under nitrogen atmosphere. A 17.61-g quantity of copper (II) bromide and 20 ml of DMSO are added. The mixture is heated under reflux for 6 hours. The mixture is allowed to cool and ethyl acetate is removed by rotary evaporation. The residue is dissolved in a mixture of 200 ml of methylene chloride and 200 ml of 10 percent aqueous hydrochloric acid. The organic layer is washed with aqueous hydrochloric acid and water, dried over magnesium sulfate and filtered. The solvent is removed by rotary evaporation and then by storage under vacuum. The product is 4-nitrobenzil.

(d) Under nitrogen atmosphere, 0.81 g of hydroquinone and 0.91 g of potassium t-butoxide are mixed. A mixture of 10 ml of toluene and 20 ml of DMSO is added. The mixture is heated to reflux and a toluene-butanol-water azeotrope is collected. A 3.71-g quantity of 4-nitrobenzil is added and washed down with 2 ml of DMSO. The mixture is heated overnight at 125° C. The mixture is poured into water and heated with 400 ml of ethyl acetate to form a filterable precipitate. The precipitate is dissolved in methylene chloride and filtered through silica gel. It is recrystallized from a mixture of ethanol and benzene, collected by suction filtration and dried in a vacuum oven at 80° C. The product is p-BOB.

A mixture of 0.23 g of oxybis(benzoyl chloride) and 77.8 g of polyphosphoric acid (85 percent $P_2O_5$) is stirred under nitrogen atmosphere overnight at 90° C. A 0.44-g quantity of dope from Example 1(L) is added, and the mixture is heated for 1 hour at 90° C. and for 24 hours at 150° C. A 0.40-g quantity of p-BOB and a 0.27-g quantity of 3,3',4,4'-tetraaminobiphenyl are added and washed down with 3 ml of methylene chloride. The mixture is heated at 150° C. for 24 hours and at 190° C. for hours. The resulting block copolymer is coagulated with water.

EXAMPLE 57

Synthesis of block copolymer containing rigid rod cis-PBO blocks and polyquinoxaline blocks Equimolar amounts of 4-nitrobenzil and 4-phenoxyphenol are reacted in the presence of potassium t-butoxide under conditions described in Example 56 paragraph (d) to form 4-(phenoxyphenoxy)benzil. A polyquinoxaline terminated by aromatic groups which are susceptible to aromatic electrophilic substitution is synthesized by the reaction of p-BOB from Example 56, -(phenoxyphenoxy)benzil and 3,3',4,4'-tetraaminobiphenyl in m-cresol. The resulting polyquinoxaline polymer is isolated.

A mixture of cis-PBO dope from Example 1(G) and oxybis(4-benzoyl chloride) is reacted in a 10-1 MSA solution at a temperature of 90° C. under nitrogen atmosphere. The mixture is cooled to 50° C., and the polyquinoxaline polymer is added. The reaction is continued for hours at 50° C. The title block copolymer is recovered.

EXAMPLE 58

Synthesis of block copolymer containing rigid rod cis-PBO blocks and polyquinoline blocks 4,4'-Bis-(2-aminobenzoyl)-diphenyl ether (a monomer) and 4-(2-aminobenzoyl)-diphenyl ether (a terminator having an aromatic group which can undergo aromatic electrophilic substitution) are synthesized according to the procedure described in Wolfe et al., "The Synthesis and Solution Properties of Aromatic Polymers Containing 2,4-Quinoline Units in the Main Chain," 9 Macromolecules 489 (1976), which is incorporated herein by reference. The monomer and terminator are reacted with 4,4'-diacetyldiphenyl ether in a mixture of m-cresol and phosphorus pentoxide to form a functionally-terminated polyquinoline under the conditions described in the same article by Wolfe et al. The polymer is isolated.

A mixture of cis-PBO dope from Example 1(G) and oxybis(4-benzoyl chloride) is reacted in a 10-1 MSA solution at a temperature of 90° C. under nitrogen atmosphere. The mixture is cooled to 50° C., and the functionally-terminated polyquinoline polymer is added. The reaction is continued for 24 hours at 50° C. The title block copolymer is recovered.

The process is repeated using bis-(4-(2-aminobenzoyl)-phenoxy)benzene (a monomer) and 4-(2-aminobenzoyl)-1-(phenoxyphenoxy)-benzene (a terminator) prepared using the process previously described, but substituting diphenoxybenzene for diphenyl ether.

What is claimed is:

1. A thermoplastic polymer composition comprising blocks of polybenzoxazole polymer chemically linked to blocks of thermoplastic polymer which contain polyamide, polyimide, polyquinoxaline, polyquinoline, poly(aromatic ketone), poly(aromatic sulfone), poly(aromatic ether) or a copolymer of one of those polymers, wherein the thermoplastic composition has a glass transition temperature of no more than about 400° C., is not substantially phase separated, and can be heated to its glass transition temperature without substantial phase separation.

2. The thermoplastic polymer composition of claim 1 comprising no less than about 5 percent blocks of polybenzoxazole polymer and no less than about 20 percent blocks of thermoplastic polymer by weight, having a glass transition of no more than about 350° C.

3. The thermoplastic polymer composition of claim 2 having a glass transition temperature of no more than about 300° C.

4. The thermoplastic polymer composition of claim 1 which can be heated to at least about 25° C. beyond its glass transition temperature without substantial phase separation.

5. The thermoplastic polymer composition of claim 1 which comprises no more than about 70 percent polybenzoxazole polymer by weight.

6. The thermoplastic polymer composition of claim 1 which comprises no more than about 50 percent polybenzoxazole polymer by weight.

7. The thermoplastic polymer composition of claim 1 which comprises no more than about 30 percent polybenzoxazole polymer by weight.

8. The thermoplastic polymer composition of claim 1 which comprises some thermoplastic polymer which is not chemically linked to a polybenzoxazole polymer block.

9. The thermoplastic polymer composition of claim 1 wherein each block of polybenzoxazole is linked to a block of thermoplastic polymer.

10. A fiber comprising a thermoplastic polymer composition of claim 1.

11. A film comprising a thermoplastic polymer composition of claim 1.

12. A laminate structure comprising a film of claim 11.

13. A powder comprising a thermoplastic polymer composition of claim 1.

14. A dope comprising a solvent acid and a block copolymer that contains at least one block of polybenzoxazole polymer chemically linked to at least one block of thermoplastic polyamide, polyimide, polyquinoxaline, polyquinoline, poly(aromatic ketone), poly(aromatic sulfone), poly(aromatic ether) or a copolymer thereof, said dope being in a substantially isotropic state.

15. A process for making a polymer composition comprising the step of contacting a dope of claim 14 with a diluent while it is in a substantially isotropic state.

16. The composition of claim 2 wherein the thermoplastic polymer is a polyamide polymer or copolymer.

17. The composition of claim 2 wherein the thermoplastic polymer is a polyimide polymer or copolymer.

18. The composition of claim 2 wherein the thermoplastic polymer is a polyquinoxaline polymer or copolymer.

19. The composition of claim 2 wherein the thermoplastic polymer is a polyquinoline polymer or copolymer.

20. The composition of claim 2 wherein the thermoplastic polymer is a poly(aromatic ketone), poly(aromatic sulfone), poly(aromatic ether) or a copolymer of one of those polymers.

21. The composition of claim 6 wherein the thermoplastic polymer is a polybenzoxazole poly(aromatic ether) copolymer.

22. The composition of claim 2 wherein the polybenzoxazole polymer is a polybenzoxazole polymer.

23. The composition of claim 22 wherein the polybenzoxazole polymer is a rigid rod polymer.

24. The composition of claim 2 wherein the polybenzoxazole polymer is a polybenzothiazole polymer.

25. The composition of claim 24 wherein the polybenzothiazole polymer is a rigid rod polymer.

26. The composition of claim 2 wherein the polybenzoxazole polymer is polybenzimidazole polymer.

27. The composition of claim 2 wherein the average size of phase separated domains within the composition is not greater than about 1000 angstroms.

28. The composition of claim 2 wherein the average size of phase separated domains within the composition is not greater than about 500 angstroms.

29. The composition of claim 2 wherein the average size of phase separated domains within the composition is not greater than about 200 angstroms.

30. The composition of claim 2 wherein the average size of phase separated domains within the composition is not greater than about 100 angstroms.

31. The composition of claim 2 which is not optically opaque.

32. The fiber of claim 10 having a tensile strength of at least about 100 ksi.

33. The fiber of claim 10 having a tensile strength of at least about 175 ksi.

34. The fiber of claim 10 having a tensile modulus of at least about 6 Msi.

35. The fiber of claim 10 having a tensile modulus of at least about 20 Msi.

36. The film of claim 11 having a tensile strength in at least one direction of at least about 25 ksi.

37. The film of claim 11 having a tensile strength in at least one direction of at least about 80 ksi.

38. The film of claim 11 having an average tensile modulus in at least one direction of at least about 2.5 Msi.

39. The film of claim 11 having an average tensile modulus in at least one direction of at least about 6 Msi.

40. The film of claim 11 which is not optically opaque.

41. The dope of claim 14 wherein the dope contains at least about 1 weight percent polymer.

42. The dope of claim 41 wherein the block copolymer contains from about 5 to about 30 weight percent rigid rod polymer, and the dope contains no more than about 12 weight percent polymer.

43. The dope of claim 41 wherein the block copolymer contains from about 30 to about 50 weight percent rigid rod polymer, and the dope contains no more than about 8 weight percent polymer.

44. The dope of claim 41 wherein the dope contains no more than about 6 weight percent polymer.

45. The dope of claim 14 wherein the solvent acid contains polyphosphoric acid.

46. The dope of claim 14 wherein the solvent acid contains methanesulfonic acid.

47. The dope of claim 14, wherein the dope does not exhibit substantial birefringence when viewed under a microscope under cross-polar conditions.

48. The process of claim 15 wherein the diluent is an aqueous diluent.

* * * * *